(12) United States Patent
Stevenson et al.

(10) Patent No.: US 10,563,106 B2
(45) Date of Patent: Feb. 18, 2020

(54) SHAPED ABRASIVE PARTICLES AND METHODS OF FORMING SAME

(71) Applicant: SAINT-GOBAIN CERAMICS & PLASTICS, INC., Worcester, MA (US)

(72) Inventors: Adam J. Stevenson, Le Thor (FR); Amin M'Barki, Cavaillon (FR); David F. Louapre, Paris (FR); Doruk O. Yener, Bedford, MA (US); Jennifer H. Czerepinski, Framingham, MA (US); Nabil Nahas, Boston, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/679,427

(22) Filed: Aug. 17, 2017

(65) Prior Publication Data
US 2017/0342303 A1 Nov. 30, 2017

Related U.S. Application Data

(63) Continuation of application No. 14/502,562, filed on Sep. 30, 2014, now Pat. No. 9,783,718.

(60) Provisional application No. 61/884,474, filed on Sep. 30, 2013.

(51) Int. Cl.
*C09K 3/14* (2006.01)
(52) U.S. Cl.
CPC .................. *C09K 3/1409* (2013.01)
(58) Field of Classification Search
None
See application file for complete search history.

(56) References Cited

U.S. PATENT DOCUMENTS

| 345,604 A | 7/1886 | Semper |
| 1,910,444 A | 5/1933 | Nicholson |
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |

(Continued)

FOREIGN PATENT DOCUMENTS

| CA | 743715 A | 10/1966 |
| CA | 2423788 A1 | 7/2002 |

(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.

(Continued)

*Primary Examiner* — Colleen P Dunn
*Assistant Examiner* — Ross J Christie
(74) *Attorney, Agent, or Firm* — Abel Schillinger, LLP; Adrian Lawrence

(57) ABSTRACT

A method of forming a shaped abrasive particle having a body formed by an additive manufacturing process.

20 Claims, 12 Drawing Sheets

(56) References Cited

U.S. PATENT DOCUMENTS

| | | |
|---|---|---|
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |

(56) References Cited

U.S. PATENT DOCUMENTS

| | | |
|---|---|---|
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A * | 6/2000 | Erickson ............... B24D 3/06 51/309 |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |

(56) References Cited

U.S. PATENT DOCUMENTS

| | | |
|---|---|---|
| 6,888,360 B1 | 5/2005 | Connell et al. |
| 6,893,489 B2 | 5/2005 | Lem |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0176793 A1 | 11/2002 | Moussa |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0099708 A1 | 5/2003 | Rowe |
| 2003/0109371 A1 | 6/2003 | Pujari et al. |
| 2003/0110707 A1 | 6/2003 | Rosenflanz et al. |
| 2003/0116747 A1 | 6/2003 | Lem |
| 2003/0126800 A1 | 7/2003 | Seth et al. |
| 2004/0003895 A1 | 1/2004 | Amano et al. |
| 2004/0018107 A1 | 1/2004 | Khoshnevis |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0168507 A1 | 8/2005 | Ide |
| 2005/0205836 A1* | 9/2005 | Yoshizawa ............ B24B 37/044 252/79.1 |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0006334 A1 | 1/2008 | Davidson |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1* | 7/2009 | Culler ................. B01J 2/22 51/296 |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1* | 6/2010 | Culler .................. B24D 11/00 51/309 |
| 2010/0151196 A1* | 6/2010 | Adefris .............. C09K 3/1409 51/309 |
| 2010/0151201 A1* | 6/2010 | Erickson ............. C09K 3/1409 51/309 |
| 2010/0173167 A1 | 7/2010 | Vissing |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0321448 A1 | 12/2010 | Buestgens |
| 2011/0008604 A1 | 1/2011 | Boylan |
| 2011/0111563 A1 | 5/2011 | Yanagi et al. |

(56) References Cited

U.S. PATENT DOCUMENTS

| | | |
|---|---|---|
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1* | 9/2012 | Adefris ............... B24D 3/00 51/309 |
| 2012/0231711 A1 | 9/2012 | Keipert et al. |
| 2012/0308837 A1 | 12/2012 | Schlechtriemen et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 10/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2018/0086957 A1 | 3/2018 | Sahlin et al. |

FOREIGN PATENT DOCUMENTS

| | | |
|---|---|---|
| CH | 685051 A5 | 3/1995 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2692821 A1 * | 2/2014 ......... C04B 35/1115 |
| EP | 2719752 A1 | 4/2014 |
| EP | 2720676 A1 | 4/2014 |

(56) References Cited

FOREIGN PATENT DOCUMENTS

| | | |
|---|---|---|
| EP | 2012972 B1 | 6/2014 |
| FR | 2354373 A1 | 1/1978 |
| GB | 986847 A | 3/1965 |
| GB | 1466054 | 3/1977 |
| JP | 53064890 A | 6/1978 |
| JP | 60-006356 U | 1/1985 |
| JP | S6136112 A | 2/1986 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002028865 A | 1/2002 |
| JP | 2002-038131 A | 2/2002 |
| JP | 2002210659 A | 7/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008017305 A | 1/2008 |
| JP | 2008132560 A | 6/2008 |
| JP | 2008194761 A | 8/2008 |
| JP | 2008531305 A | 8/2008 |
| JP | 5238725 B2 | 7/2013 |
| JP | 5238726 B2 | 7/2013 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 1997014536 A1 | 4/1997 |
| WO | 1999006500 A1 | 2/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 2002097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |

(56) References Cited

FOREIGN PATENT DOCUMENTS

| | | |
|---|---|---|
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2016/105543 A9 | 9/2017 |
| WO | 2017/151498 A1 | 9/2017 |
| WO | 2018/010730 A2 | 1/2018 |
| WO | 2018/026669 A1 | 2/2018 |
| WO | 2018/057465 A1 | 3/2018 |
| WO | 2018/057558 A1 | 3/2018 |
| WO | 2018/063902 A1 | 4/2018 |
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
WINTER Catalogue No. 5, Dressing tools, WINTER diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
Dow Machine Tool Accessories, Grinding & Surface Finishing, www.1mta.com, Nov. 2014, 72 pages.
International Search Report for Application No. PCT/US2014/058378, filed Sep. 30, 2014, 1 page, dated Jan. 29, 2015.
European Search Report from EP 14 84 7751, dated Mar. 29, 2017, 1 page.
Lewis et al.; "Direct Ink Writing of Three-Dimensional Ceramic Structures;" J. Am. Ceram. Soc.; vol. 89; No. 12; pp. 3599-3609; Dec. 2006.
S. Kumar et al.; "Composites by rapid prototyping technology;" Materials and Design 31 (2010; available online Aug. 6, 2009) pp. 850-856.
Kahl, F. (2018). "A Few Ways to Improve 3D Printing Interfaces." [online] Available at: https://www.3ders.org/articles/20130330-a-few-ways-to-improve-3d-printinginterfaces. html, Mar. 30, 2013 [Accessed Oct. 15, 2018].

\* cited by examiner

SHAPED ABRASIVE PARTICLES AND METHODS OF FORMING SAME

CROSS-REFERENCE TO RELATED APPLICATION(S)

The present application is a continuation of U.S. Non-Provisional patent application Ser. No. 14/502,562, entitled "Shaped Abrasive Particles and Methods of Forming Same," by Adam J. Stevenson et al., filed Sep. 30, 2014, which claims priority under 35 U.S.C. § 119(e) to U.S. Patent Application No. 61/884,474 entitled "Shaped Abrasive Particles and Methods of Forming Same," by Doruk O. Yener, filed Sep. 30, 2013, which are assigned to the current assignee hereof and incorporated herein by reference in their entireties.

BACKGROUND

Field of the Disclosure

The following is directed to shaped abrasive particles and, more particularly, to a process of forming shaped abrasive particles using an additive manufacturing process.

Description of the Related Art

Abrasive articles incorporating ceramic articles such as abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies have been employed to produce abrasive particles having a specified shape, including fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

Rudimentary molding processes have been disclosed as potentially useful in forming limited shaped abrasive particles, such as those disclosed in U.S. Pat. Nos. 5,201,916, 5,366,523, 5,584,896, and U.S. Pat. Publs. 2010/0151195, 2010/0151196. Other processes of forming shaped abrasive particles have been disclosed, see for example, U.S. Pat. Nos. 6,054,093, 6,228,134, 5,009,676, 5,090,968, and 5,409,645.

The industry continues to demand improved abrasive materials and abrasive articles including shaped abrasive particles.

SUMMARY

According to one aspect, a method of forming a shaped abrasive particle includes having a body formed by an additive manufacturing process.

According to a second aspect, a method includes forming a body of a shaped abrasive particle according to a digital model.

In yet another aspect, a method of forming a fixed abrasive includes forming a plurality of shaped abrasive particles on a substrate, wherein each of the shaped abrasive particles of the plurality of shaped abrasive particles have a body formed by an additive manufacturing process.

According to another aspect, a shaped abrasive particle includes a body having at least one major surface having a self-similar feature.

For still another aspect, a shaped abrasive particle has a body having at least one peripheral ridge extending around at least a portion of a side surface of the body.

In one aspect, a shaped abrasive particle has a body having at least one major surface defining a concave stepped surface.

For another aspect, a shaped abrasive particle has a body having at least one transverse ridge extending along at least two surfaces and an adjoining edge between the at least two surfaces.

According to one aspect, a shaped abrasive particle includes a body having a corner including a plurality of microprotrusions extending from the corner.

For still another aspect, a shaped abrasive particle has a body including a surface comprising a scalloped topography.

According to another aspect, a method of forming a shaped abrasive particle includes using a low pressure injection molding process.

BRIEF DESCRIPTION OF THE DRAWINGS

The present disclosure may be better understood, and its numerous features and advantages made apparent to those skilled in the art, by referencing the accompanying drawings. Embodiments are illustrated by way of example and are not limited in the accompanying figures.

Figure 1A:
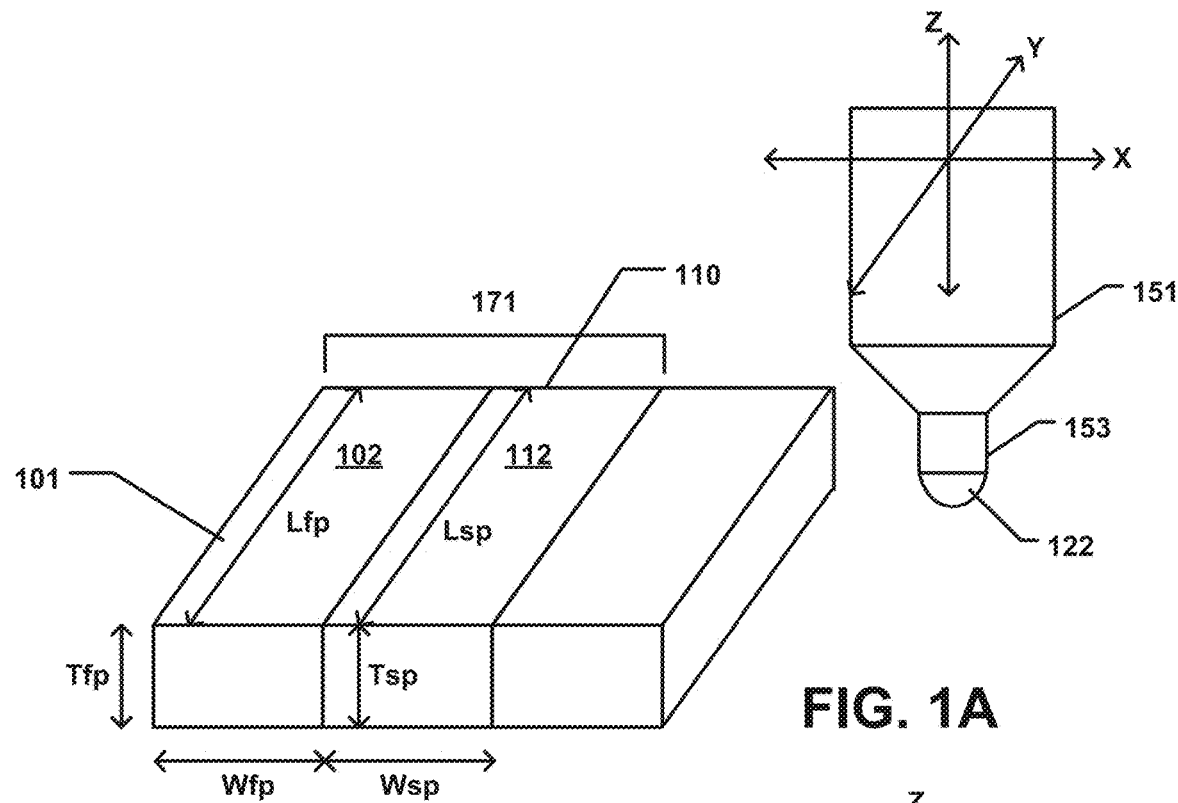
FIG. 1A includes a perspective view illustration of a method of forming a portion of a shaped abrasive particle in accordance with an embodiment.

The use of the same reference symbols in different drawings indicates similar or identical items. Further, skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following is generally directed to a method of forming a shaped abrasive particle utilizing an additive manufacturing process. The shaped abrasive particles can be used in a variety of industries including, but not limited to, automotive, medical, construction, foundry, aerospace, abrasives, and the like. Such shaped abrasive particles may be utilized as free abrasive particles or incorporated into fixed abrasive articles including, for example, coated abrasive articles, bonded abrasive articles, and the like. Various other uses may be derived for the shaped abrasive particles.

In accordance with one aspect, the shaped abrasive particles of the embodiments herein can be formed to have a body formed by an additive manufacturing process. As used herein, an "additive manufacturing process" includes a process, wherein the body of the shaped abrasive particle can be formed by compiling a plurality of portions together in a particular orientation with respect to each other such that, when the plurality is compiled, each of the discrete portions can define at least a portion of the shape of the body. Moreover, in particular instances, the additive manufacturing process can be a template-free process, wherein the material being manipulated to form discrete portions, and ultimately the body itself, need not be placed within a template (e.g., a mold). Rather, the material being manipulated can be deposited in discrete portions, wherein each of the discrete portions has a controlled dimension such that when the plurality is compiled, the body also has a controlled dimension. Therefore, unlike typical molding operations, additive manufacturing processes of the embodiments herein may not necessarily need to incorporate a template that is configured to contain the material being manipulated to form the body.

In particular instances, an additive manufacturing process that is used to form a shaped abrasive particle can be a prototype printing process. In more particular instances, the process of forming the shaped abrasive particle can include a prototype printing of a body of the shaped abrasive particle, where the shaped abrasive particle includes a shaped abrasive particle or a precursor shaped abrasive particle. In other instances, the additive manufacturing process may include or be considered a laminated object manufacturing process. In the laminated object manufacturing process, individual layers may be formed discretely and joined together to form the body of the shaped abrasive particle.

In accordance with an embodiment, the method of forming a shaped abrasive particle having a body formed by an additive manufacturing process can include deposition of a first print material as a first portion of the body at a first time, and deposition of a second print material as a second portion of the body distinct from the first portion at a second time. It will be understood that the first time can be the same as, or different from, the second time. More particularly, the first print material in some instances may include a solid material, a powder, a solution, a mixture, a liquid, a slurry, a gel, a binder, and any combination thereof. In one particular instance, the first print material can include a sol gel material. For example, the first print material can include a mixture, where the mixture can be a gel formed of a powder material and a liquid, and where the gel can be characterized as a shape-stable material having the ability to substantially hold a given shape even in the green (i.e., unfired) state. In accordance with an embodiment, the gel can be formed of the powder material as an integrated network of discrete particles. In particular instances, the mixture can include a sol-gel material, which may have one or more particulate materials forming a matrix of the mixture. The particulate materials can include any of the materials noted herein, such as the ceramic materials.

The first print material may have a certain content of solid material, liquid material, and additives such that it has suitable rheological characteristics for use with the process detailed herein. That is, in certain instances, the first print material can have a certain viscosity, and more particularly, suitable rheological characteristics that form a dimensionally-stable phase of material that can be formed through the process as noted herein. A dimensionally-stable phase of material can be a material that can be formed to have a particular shape and substantially maintain the shape for at least a portion of the processing subsequent to forming. In certain instances, the shape may be retained throughout subsequent processing, such that the shape initially provided in the forming process is present in the finally-formed object.

The print material, including any print material of the embodiments herein can be a mixture and may have a particular content of an inorganic material, which may be a solid powder material or particulate, such as a ceramic powder material. In accordance with an embodiment, the print material can include a mixture that may include an inorganic material having suitable rheological characteristics that facilitate formation of the body including a shaped abrasive particle. For example, in one embodiment, the first print material can have a solids content of at least about 25 wt %, such as at least about 35 wt %, at least about 36 wt %, or even at least about 38 wt % for the total weight of the mixture. Still, in at least one non-limiting embodiment, the solids content of the first print material can be not greater than about 75 wt %, such as not greater than about 70 wt %, not greater than about 65 wt %, not greater than about 55 wt %, not greater than about 45 wt %, not greater than about 44 wt %, or not greater than about 42 wt %. It will be appreciated that the content of the solids materials in the first print material can be within a range between any of the minimum and maximum percentages noted above, including for example within a range of at least about 25 wt % and not greater than about 70 wt %, the least about 35 wt % and not greater than about 55 wt %, or even at least about 36 wt % and not greater than about 45 wt %.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the print material, including any of the print materials of the embodiments herein, may be in the form of a mixture, may have a particular content of liquid material. Some suitable liquids may include water. In accordance with one embodiment, the first print material can be formed to have a liquid content less than the solids content of the mixture. In more particular instances, the first print material can have a liquid content of at least about 25 wt % for the total weight of the mixture. In other instances, the amount of liquid within the first print material can be greater, such as at least about 35 wt %, at least about 45 wt %, at least about 50 wt %, or even at least about 58 wt %. Still, in at least one non-limiting embodiment, the liquid content of the first print material can be not greater than about 75 wt %, such as not greater than about 70 wt %, not greater than about 65 wt %, not greater than about 62 wt %, or even not greater than about 60 wt %. It will be appreciated that the content of the liquid in the first print material can be within a range between any of the minimum and maximum percentages noted above.

Furthermore, to facilitate processing and forming shaped abrasive particles according to embodiments herein, the first print material, can have a particular storage modulus. For example, the first print material can have a storage modulus of at least about $1 \times 10^4$ Pa, such as at least about $4 \times 10^4$ Pa, or even at least about $5 \times 10^4$ Pa. However, in at least one non-limiting embodiment, the first print material may have a storage modulus of not greater than about $1 \times 10^7$ Pa, such as not greater than about $2 \times 10^6$ Pa. It will be appreciated that the storage modulus of the first print material can be within a range between any of the minimum and maximum values noted above.

The storage modulus can be measured via a parallel plate system using ARES or AR-G2 rotational rheometers, with Peltier plate temperature control systems. For testing, the first print material can be extruded within a gap between two plates that are set to be approximately 8 mm apart from each other. After extruding the first print material into the gap, the distance between the two plates defining the gap is reduced to 2 mm until the first print material completely fills the gap between the plates. After wiping away excess material, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

The print material, which may include a mixture, can be formed to have a particular viscosity to facilitate formation of the body of the shaped abrasive particle having the features of the embodiments herein. For example, the mixture can have a viscosity of at least about $4 \times 10^3$ Pa s, such as at least about $5 \times 10^3$ Pa s, at least about $6 \times 10^3$ Pa s, at least about $7 \times 10^3$ Pa s, at least about $7.5 \times 10^3$ Pa s. In another non-limiting embodiment, the mixture can have a viscosity of not greater than about $20 \times 10^3$ Pa s, such as not greater than about $18 \times 10^3$ Pa s, not greater than about $15 \times 10^3$ Pa s, not greater than about $12 \times 10^3$ Pa s. Still, it will be appreciated that the mixture can have a viscosity within a range including any of the minimum and maximum values noted above, including but not limited to, at least about $4 \times 10^3$ Pa s and not greater than about $20 \times 10^3$ Pa s, such as at least about $5 \times 10^3$ Pa s and not greater than about $18 \times 10^3$ Pa s, at least about $6 \times 10^3$ Pa s and not greater than about $15 \times 10^3$ Pa s. The viscosity can be measured in the same manner as the storage modulus as described above.

Moreover, the first print material, which may be in the form of a mixture, may be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a first print material that can be distinct from slurries used in conventional forming operations. For example, the content of organic materials within the first print material and, in particular, any of the organic additives noted above, may be a minor amount as compared to other components within the mixture. In at least one embodiment, the first print material can be formed to have not greater than about 30 wt % organic material for the total weight of the first print material. In other instances, the amount of organic materials may be less, such as not greater than about 15 wt %, not greater than about 10 wt %, or even not greater than about 5 wt %. Still, in at least one non-limiting embodiment, the amount of organic materials within the first print material can be at least about 0.01 wt %, such as at least about 0.5 wt % for the total weight of the first print material. It will be appreciated that the amount of organic materials in the first print material can be within a range between any of the minimum and maximum values noted above.

Moreover, the first print material can be formed to have a particular content of acid or base, distinct from the liquid content, to facilitate processing and formation of shaped abrasive articles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the first print material can have a pH of less than about 5, and more particularly, can have a pH within a range between about 2 and about 4.

FIG. 1A includes a perspective view illustration of a process of forming a shaped abrasive particle via an additive manufacturing process in accordance with an embodiment. As illustrated, the additive manufacturing process may utilize a deposition assembly 151 configured to have multi-axial movement in at least the X-direction, the Y-direction, and Z-direction for controlled deposition of a print material 122. In particular instances, the deposition assembly 151 can have a deposition head 153 configured to provide controlled delivery of a print material to a particular position. Notably, the deposition assembly 151 may provide controlled deposition of a first print material as a first portion of the body at a first time and deposition of a second print material as a second portion of the body that is distinct from the first portion at the second time. Such a process can facilitate the controlled deposition of discrete portions such that the discrete portions are deposited in precise locations with respect to each other and can facilitate formation of a body of a shaped abrasive particle having suitable shape, dimensions, and performance.

In particular instances, the deposition assembly 151 can be configured to deposit a first print material 102 as a first portion 101 of the body of the shaped abrasive particle. In particular, the first portion 101 can define a fraction of the total volume of the body of the shaped abrasive particle. In particular instances, the first portion 101 can have a first portion length (Lfp), a first portion width (Wfp), and a first portion thickness (Tfp). According to one embodiment, Lfp may be greater than or equal to Wfp, Lfp may be greater than or equal to Tfp, and Wfp may be greater than or equal to Tfp. In particular instances, the length of the first portion may define the largest dimension of the first portion 101, and the width of the first portion 101 may define a dimension extending in a direction generally perpendicular to the length (Lfp) and may define the second largest dimension of the first portion 101. Moreover, in some embodiments, the thickness (Tfp) of the first portion 101 may define the smallest dimension of the first portion 101, and may define a dimension extending in a direction perpendicular to either or both of the length (Lfp) and the width (Wfp). It will be appreciated, however, that the first portion 101 can have various shapes as will be defined further herein.

In accordance with an embodiment, the first portion 101 can have a primary aspect ratio (Lfp:Wfp) to facilitate suitable forming of the body of the shaped abrasive particle. For example, the first portion 101 may have a primary aspect ratio (Lfp:Wfp) of at least about 1:1. In other embodiments, the first portion 101 may have a primary aspect ratio that is about 2:1, such as at least about 3:1, at least about 5:1, or even at least about 10:1. Still, in one non-limiting embodiment, the first portion 101 may have a primary aspect ratio of not greater than about 1000:1.

Furthermore, the first portion 101 may be formed to have a particular secondary aspect ratio, such that the body of the shaped abrasive particle has a desirable shape. For example, the first portion 101 can have a secondary aspect ratio (Lfp:Tfp) of at least about 1:1. In other embodiments, the first portion 101 may have a secondary aspect ratio that is at least about 2:1, such as at least about 3:1, at least about 5:1, or even at least about 10:1. Still, in one non-limiting embodiment, the secondary aspect ratio of the first portion 101 may be not greater than about 1000:1.

In yet another embodiment, the first portion 101 may be formed to have a particular tertiary aspect ratio (Wfp:Tfp) to facilitate suitable forming of the body of the shaped abrasive particle. For example, the first portion 101 may have a tertiary aspect ratio (Wfp:Tfp) of at least about 1:1. In other instances, the first portion 101 may have a tertiary aspect ratio of at least about 2:1, such as at least about 3:1, at least about 5:1, or even at least about 10:1. In still another non-limiting embodiment, the first portion 101 can have a tertiary aspect ratio of not greater than about 1000:1.

The dimensions of the first portion 101 of the body of the shaped abrasive particle may be formed to have a particular value to facilitate formation of the body having suitable shape and dimensions. Any of the foregoing dimensions (e.g., Lfp, Wfp, Tfp) of the first portion 101 can have an average dimension of not greater than about 2 mm. In other instances, the average dimension of any one of the first portion length (Lfp), first portion width (Wfp), or first portion thickness (Tfp) can have an average dimension of not greater than about 1 mm, such as not greater than about 900 microns, not greater than about 800 microns, not great than about 700 microns, not greater than about 600 microns, not greater than about 500 microns, not greater than about 400 microns, not greater than about 300 microns, not greater than about 200 microns, not greater than about 150 microns, not greater than about 140 microns, not greater than about 130 microns, not greater than about 120 microns, not greater than about 110 microns, not greater than about 100 microns, not greater than about 90 microns, not greater than about 80 microns, not greater than about 70 microns, not greater than about 60 microns, or even not greater than about 50 microns. Still, in another non-limiting embodiment, any one of the first portion length (Lfp), the first portion width (Wfp), or the first portion thickness (Tfp) can have an average dimension that is at least about 0.01 microns, such as at least about 0.1 microns, or even at least about 1 micron. It will be appreciated that any one of the first portion length, first portion width, or first portion thickness can have an average dimension within a range between any of the minimum and maximum values noted above.

In another embodiment, the first portion 101 may be deposited to have a particular cross-sectional shape. Deposition of the first portion 101 with a particular cross-sectional shape can facilitate formation of a body of a shaped abrasive particle having a particular, desirable cross-sectional shape and three-dimensional shape. In accordance with an embodiment, the first portion 101 can have substantially any contemplated cross-sectional shape. More particularly, the first portion 101 can have a cross-sectional shape in a plane defined by the first portion length (Lfp) and first portion width (Wfp), such as triangular, quadrilateral, rectangular, trapezoidal, pentagonal, hexagonal, heptagonal, octagonal, ellipsoids, a Greek alphabet letter, a Latin alphabet character, a Russian alphabet character, a Kanji character, irregular shaped contours, and any combination thereof. Furthermore, the first portion 101 may be formed to have a particular cross-sectional shape in a plane defined by the first portion length (Lfp) and first portion thickness (Tfp). Such cross-sectional shape can include a shape selected from the group of triangular, quadrilateral, rectangular, trapezoidal, pentagonal, hexagonal, heptagonal, octagonal, ellipsoids, a Greek alphabet letter, a Latin alphabet character, a Russian alphabet character, a Kanji character, irregular shaped contours, and any combination thereof.

In at least one embodiment, the first portion 101 may be deposited in the form of a layer. In yet another embodiment, the first portion may be deposited (as shown in FIG. 1A) as an elongated structure, where the length is significantly greater than the thickness or the width. In yet another embodiment, the first portion 101 may deposited as a discrete droplet. More particularly, the deposition process may be conducted such that it includes depositing a plurality of discrete droplets of a predetermined volume of the first print material 102 to form the first portion 101. For example, the first portion 101 may be made up of a plurality of first sub-portions that are deposited in a controlled manner to define the dimensions of the first portion 101.

As further illustrated in FIG. 1A, the process of forming a shaped abrasive particle according to an additive manufacturing process also can include controlled deposition of a second portion 110 including a second print material 112. In an embodiment, the second print material 112 can include a solid, a solution, a mixture, a liquid, a slurry, a gel, a binder, and a combination thereof. In a particular embodiment, the second print material 112 can be the same as, or different from, the first print material. For example, the second print material 112 can include a sol gel material as described above. The deposition assembly 151 can deposit the second portion 110 in any suitable location including a particular location relative to the first portion 101. For example, as illustrated in FIG. 1A, the second portion 110 may be deposited in a position to abut at least a portion of the first portion 101. Such controlled multi-axial movement of the deposition assembly 151 can facilitate both precise deposition of discrete portions including, for example, the first portion 101 and the second portion 110, as well as controlled and precise deposition of a plurality of portions (and sub-portions) with respect to each other, thus facilitating the compilation of a plurality of portions to form the body of the shaped abrasive particle.

As illustrated, the deposition assembly 151 can be configured to deposit the second print material 112 as the second portion 110 of the body of the shaped abrasive particle. In particular, the second portion 110 can define a fraction of the total volume of the body of the shaped abrasive particle. In particular instances, the second portion 110 can have a second portion length (Lsp), a second portion width (Wsp), and a second portion thickness (Tsp). Notably, according to one aspect, Lsp can be greater than or equal to Wsp, Lsp can be greater than or equal to Tsp, and Wsp can be greater than or equal to Tsp. In particular instances, the length (Lsp) of the second portion 110 may define the largest dimension of the second portion 110, and the width (Wsp) of the second portion 110 may define a dimension extending in a direction generally perpendicular to the length (Lsp) and may define the second largest dimension in accordance with an embodiment. Finally, in some embodiments, the thickness (Tsp) of the second portion 110 may define generally the smallest dimension of the second portion 110, and may define a dimension extending in a direction perpendicular to either or both of the length (Lsp) and the width (Wsp). It will be appreciated, however, that the second portion 110 can have various shapes as will be defined further herein.

In accordance with an embodiment, the second portion 110 can have a primary aspect ratio (Lsp:Wsp) that can facilitate formation of a body have a suitable shape and dimensions. For example, the second portion 110 can have a primary aspect ratio (Lsp:Wsp) of at least about 1:1. In other embodiments, the second portion 110 may have a primary aspect ratio that is about 2:1, such as at least about 3:1, at least about 5:1, or even at least about 10:1. Still, in one non-limiting embodiment, the second portion 110 may have a primary aspect ratio of not greater than about 1000:1.

Furthermore, the second portion 110 may be formed to have a particular secondary aspect ratio, such that the formed body of the shaped abrasive particle has a desirable shape. For example, the second portion 110 can have a secondary aspect ratio (Lsp:Tsp) of at least about 1:1. In other embodiments, the second portion 110 may have a secondary aspect ratio that is at least about 2:1, such as at least about 3:1, at least about 5:1, or even at least about 10:1. Still, in one non-limiting embodiment, the secondary aspect ratio of the second portion 110 may be not greater than about 1000:1.

In yet another embodiment, the second portion 110 may be formed to have a particular tertiary aspect ratio (Wsp:Tsp) that can facilitate formation of a body have a suitable shape and dimensions. For example, the second portion 110 can have a tertiary aspect ratio (Wsp:Tsp) of at least about 1:1. In other instances, the second portion 110 may have a tertiary aspect ratio of at least about 2:1, such as at least about 3:1, at least about 5:1, or even at least about 10:1. In still another non-limiting embodiment, the second portion 110 can have a tertiary aspect ratio of not greater than about 1000:1.

The dimensions of the second portion 110 of the body of the shaped abrasive particle may be formed to have a particular value. Any of the foregoing dimensions (e.g., Lsp, Wsp, Tsp) of the second portion 110 can have an average dimension of not greater than about 2 mm. In other instances, the average dimension of any one of the second portion length (Lsp), second portion width (Wsp), or second portion thickness (Tsp) can have an average dimension of not greater than about 1 mm, such as not greater than about 900 microns, not greater than about 800 microns, not great than about 700 microns, not greater than about 600 microns, not greater than about 500 microns, not greater than about 400 microns, not greater than about 300 microns, not greater than about 200 microns, not greater than about 150 microns, not greater than about 140 microns, not greater than about 130 microns, not greater than about 120 microns, not greater than about 110 microns, not greater than about 100 microns, not greater than about 90 microns, not greater than about 80 microns, not greater than about 70 microns, not greater than about 60 microns, or even not greater than about 50 microns. Still, in another non-limiting embodiment, any one of the second portion length (Lsp), the second portion width (Wsp), or the second portion thickness (Tsp) can have an average dimension that is at least about 0.01 microns, such as at least about 0.1 microns, or even at least about 1 micron. It will be appreciated that any one of the second portion length, second portion width, or second portion thickness can have an average dimension within a range between any of the minimum and maximum values noted above.

In another embodiment, the second portion 110 may be deposited to have a particular cross-sectional shape. Deposition of the second portion 110 with a particular cross-sectional shape can facilitate formation of a body of a shaped abrasive particle having a particular, desirable cross-sectional shape and three-dimensional shape. In accordance with an embodiment, the second portion 110 can have substantially any contemplated cross-sectional shape. More particularly, the second portion 110 can have a cross-sectional shape in a plane defined by the second portion length (Lsp) and second portion width (Wsp), which may be viewed top-down, where the shape is selected from the group of triangular, quadrilateral, rectangular, trapezoidal, pentagonal, hexagonal, heptagonal, octagonal, ellipsoids, a Greek alphabet letter, a Latin alphabet character, a Russian alphabet character, a Kanji character, complex polygonal shapes, irregular shaped contours, and any combination thereof. Furthermore, the second portion 110 may be formed to have a particular cross-sectional shape in a plane defined by the second portion length (Lsp) and second portion thickness (Tsp), which may be evident in a side-view. Such cross-sectional shape can include a shape selected from the group of triangular, quadrilateral, rectangular, trapezoidal, pentagonal, hexagonal, heptagonal, octagonal, ellipsoids, a Greek alphabet letter, a Latin alphabet character, a Russian alphabet character, a Kanji character, complex polygonal shapes, irregular shaped contours, and any combination thereof. Moreover, the second portion 110 may be formed to have a particular cross-sectional shape in a plane defined by the second portion width (Wsp) and second portion thickness (Tsp), which may be evident in a side-view. Such cross-sectional shape can include a shape selected from the group of triangular, quadrilateral, rectangular, trapezoidal, pentagonal, hexagonal, heptagonal, octagonal, ellipsoids, a Greek alphabet letter, a Latin alphabet character, a Russian alphabet character, a Kanji character, complex polygonal shapes, irregular shaped contours, and any combination thereof.

In at least one embodiment, the second portion 110 may be deposited in the form of a layer. In yet another embodiment, the second portion may be deposited (as shown in FIG. 1A) as an elongated structure, where the length is significantly greater than the thickness or the width. In yet another embodiment, the second portion 110 may be deposited as a discrete droplet. More particularly, the deposition process may be conducted such that it includes depositing a plurality of discrete droplets of a predetermined volume of the second print material 112 to form the second portion 110. For example, the second portion 110 may be made up of a plurality of second sub-portions that are deposited in a controlled manner to define the dimensions of the second portion 110.

As further illustrated in FIG. 1A, the first portion 101 can have substantially the same cross-sectional shape as the cross-sectional shape of the second portion 110. However, it will be appreciated that in other embodiments, a plurality of portions may be deposited such that each of the portions can have a different cross-sectional shape with respect to each other. For example, in at least one embodiment, the first portion 101 can be deposited with a first cross-sectional shape with respect to any two dimensions (e.g., length, width, and thickness) of the body of the first portion that can be different than a cross-sectional shape of the second portion 110 with respect to any two dimensions (e.g., length, width, thickness) defining the body of the second portion 110.

In accordance with some embodiments, the first print material 102 can have a first composition and the second print material 112 can have a second composition. In some instances, the first composition can be substantially the same as the second composition. For example, the first composition and second composition can be essentially the same with respect to each other, such that only a content of impurity materials present in small amounts (e.g., such as less than about 0.1%) may constitute a difference between the first composition and the second composition. Alternatively, in another embodiment, the first composition and second composition can be significantly different with respect to each other.

In at least one embodiment, the first composition can include a material such as an organic material, inorganic material, and a combination thereof. More particularly, the first composition may include a ceramic, a glass, a metal, a polymer, or any combination thereof. In at least one embodiment, the first composition may include a material such as an oxide, a carbide, a nitride, a boride, an oxycarbide, an oxynitride, an oxyboride, and any combination thereof. Notably, in one embodiment, the first composition can include alumina. More particularly, the first composition may include an alumina-based material, such as a hydrated alumina material including, for example, boehmite.

In at least one embodiment, the second composition can include a material such as an organic material, inorganic material, and a combination thereof. More particularly, the second composition may include a ceramic, a glass, a metal, a polymer, or any combination thereof. In at least one embodiment, the second composition may include a material such as an oxide, a carbide, a nitride, a boride, an oxycarbide, an oxynitride, an oxyboride, and any combination thereof. Notably, in one embodiment, the second composition can include alumina. More particularly, the first composition may include an alumina-based material, such as a hydrated alumina material including, for example, boehmite.

In certain instances, the process of depositing a first print material and second print material (e.g., the first print material 110 and the second print material 112) can be conducted such that the first print material is deposited at a first time and the second print material is deposited at a second time and the first time and second time are discrete in different time intervals. In such embodiments, the deposition process can be an intermittent process, wherein the deposition process includes the formation of discrete portions during discrete durations of time. In an intermittent process, at least a portion of time passes between the formation of the first portion and the formation of the second portion, wherein there may be no deposition of material.

Still, in other instances, it will be appreciated that the deposition process may be a continuous process. In continuous processes, the deposition process may not necessarily include the deposition of discrete first and second portions at different time intervals. Instead, the deposition process may utilize a continuous extrusion process in which print material can be extruded while the deposition assembly 151 is moving. Moreover, the deposition assembly 151 may be capable of changing the dimension of the portion during the continuous deposition process, thereby facilitating the formation of one or more portions with a variable dimensions (e.g., cross-sectional and three-dimensional dimensions) to facilitate the formation of a body of a shaped abrasive particle having a desirable two-dimensional and three-dimensional shape.

In accordance with another aspect of forming a body of a shaped abrasive particle via an additive manufacturing process, the process can include preferentially modifying one of the first portion 101 and the second portion 110 to join the first portion 101 and the second portion 110 and form a subsection 171 of the body. In a particular embodiment, the process of modifying can include changing a phase of at least one of the first print material 102 and the second print material 112. For example, modifying can include heating at least one of the first portion 101 and the second portion 110. More particularly, heating can include joining a part of the first portion 101 to the second portion 110, such as by fusing at least a part of the first portion 101 to the second portion 110. Heating also may be accomplished utilizing various techniques including, for example, convection, conduction, and radiation techniques. In one particular embodiment, the process of heating at least one of the first portion 101 and second portion 110 can include impinging electromagnetic radiation on at least a portion of the first portion 110 and/or second portion 110 to facilitate joining a portion of the first portion 101 to the second portion 110. Suitable types of electromagnetic radiation may be supplied by use of a laser. Still, it will be appreciated that in other instances, the process of heating can include impinging electromagnetic radiation on at least a portion of the second portion to facilitate joining any one of the first portion and second portion.

In other instances, the process of modifying a portion of the body also can include melting, selective laser melting, sintering, selective sintering, direct metal laser sintering, selective laser sintering, particle beam modification, electron beam melting, fused deposition modeling, curing, and any combination thereof. Any of the foregoing processes can be used on a part or all of any of one or more of the portions to modify the portions.

In another aspect of forming a body of a shaped abrasive particle via an additive manufacturing process, the process of forming a body of a shaped abrasive particle can be conducted according to a digital model. The process of forming a body according to a digital model can include measuring at least a portion of the body and comparing it to a corresponding dimension of the digital model. The process of comparing can be conducted during the forming process or after the forming process is completed for a portion or the entire body. It will be appreciated that the provision of a digital model can facilitate the control of and the deposition process conducted by the deposition assembly 151.

In particular instances, the process of forming a body according to a digital model can further include creating a plurality of digital cross-sections of the digital model. Creation of the plurality of digital cross-sections can facilitate, for example, controlled deposition of one or more portions of the body. For example, in one instance, the process can include depositing a first portion of the body at a first time, where the first portion corresponds to a first cross-section of a plurality of cross-sections of the digital model. Furthermore, the process can include depositing a second portion of the body distinct from the first portion at a second time that is different than the first time. The second portion can correspond to a second cross-section of the plurality of cross-sections of the digital model. Accordingly, it will be appreciated that the plurality of digital cross-sections can be a guide for depositing the plurality of discrete portions, where a single digital cross-section can facilitate the deposition of a discrete first portion and a second digital cross-section can facilitate the deposition of a second discrete portion. Each of the portions may be deposited, and while the deposition assembly 151 is depositing and forming each of the portions, the dimensions of the portions can be measured and compared to a digital model. More particularly, the deposition assembly 151 may be adapted to alter the deposition process based on the comparison of the dimensions of the deposited portion to a corresponding digital model portion.

It also will be appreciated that an additive manufacturing process can include a process of compiling discrete portions including, for example, the first portion 101 and second portion 110, to form a subsection 171. Furthermore, the process may include compiling a plurality of subsections to form the body of the shaped abrasive particle.

In accordance with yet another embodiment, the process of forming the shaped abrasive particle can include a subtractive process. Notably, the subtractive process may be conducted after completing at least some of the additive manufacturing process. More particularly, the subtractive process may be conducted after total completion of the additive manufacturing process. In at least one embodiment, the subtractive process can be conducted after forming a body of a precursor shaped abrasive particle. In certain instances, the subtractive process can include removing at least a portion of the material used to form the precursor shaped abrasive particle. Certain suitable subtractive processes may include, for example, forming at least one opening within a portion of the body, forming at least one aperture that extends through an entire portion of the body, and heating the body to remove a portion of the body, such as by volatilizing at least a portion of the body.

Figure 6:
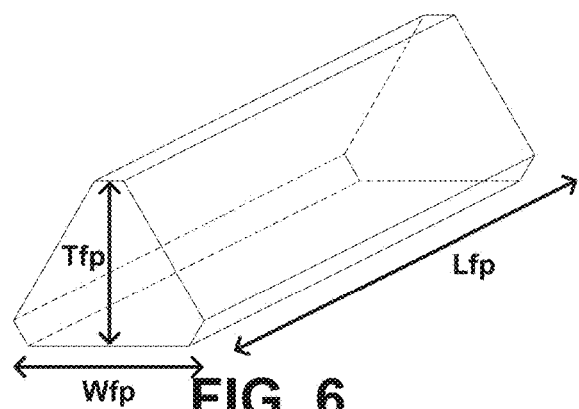
FIGS. 6-19 include illustrations of shaped abrasive particles according to an embodiment.
Figure 7:
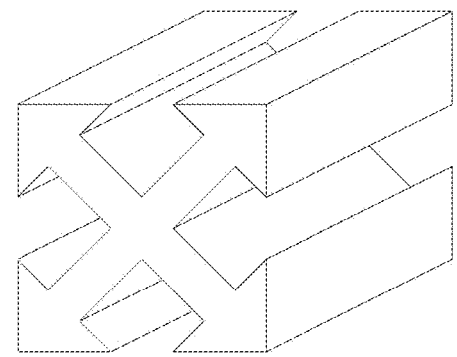
Figure 8:
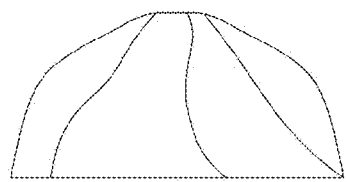
Figure 9:
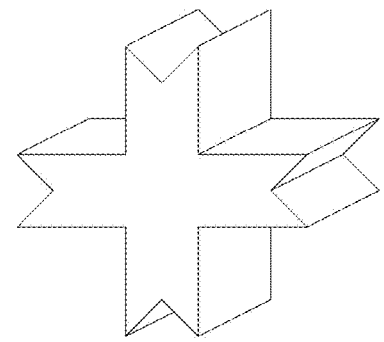
Figure 10:
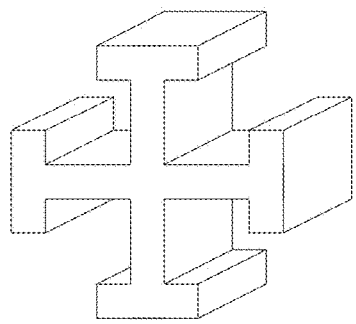
Figure 11:
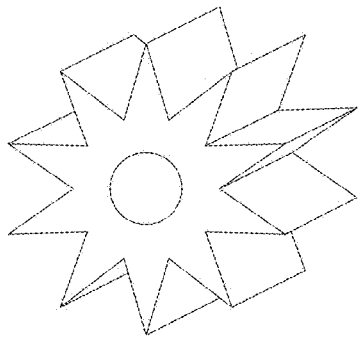
Figure 12:
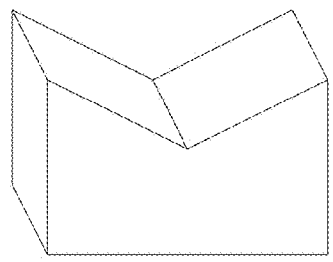
Figure 13:
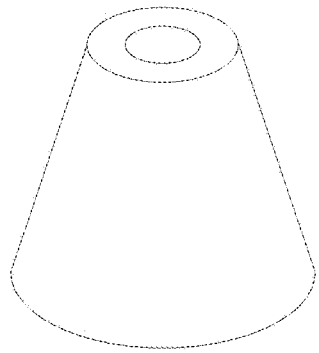
Figure 14:
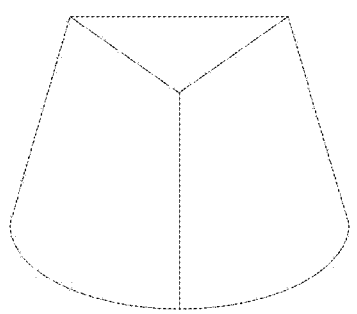
Figure 15:
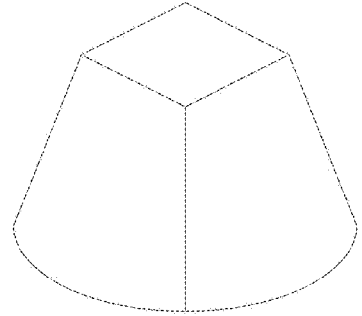
Figure 16:
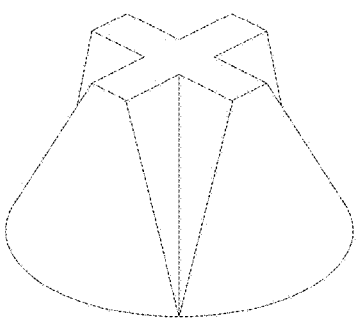
Figure 17:
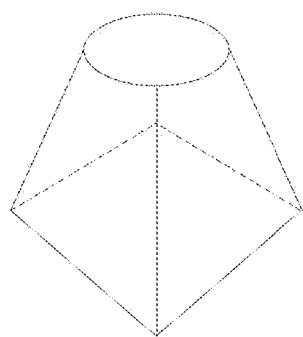

The body of a shaped abrasive particle that has been formed by an additive manufacturing process can include a variety of suitable dimensions. In particular instances, the body can have a body length (Lb), a body width (Wb), and a body thickness (Tb), such as shown in FIG. 6. In one non-limiting embodiment, the length of the body may define the largest dimension of the shaped abrasive particle and the width of the body may define a dimension extending in a direction generally perpendicular to the length and may define the second largest dimension in accordance with an embodiment. Moreover, in some embodiments, the thickness of the body may define the smallest dimension of the shaped abrasive particle, and may define a dimension extending in a direction perpendicular to either or both of the length and the width. In some instances, Lb may be greater than or equal to Wb, and Lb may be greater than or equal to Tb. Yet, in other designs of the shaped abrasive particles, Wb may be greater than or equal to Tb. It will be appreciated, however, that the body can have various shapes as will be defined further herein.

Moreover, reference herein to any dimensional characteristic (e.g., Lb, Wb, Tb) can be reference to a dimension of a single shaped abrasive particle of a batch, a median value, or an average value derived from analysis of a suitable sampling of shaped abrasive particles from a batch. Unless stated explicitly, reference herein to a dimensional characteristic can be considered reference to a median value that is a based on a statistically significant value derived from a sample size of a suitable number of articles from a batch of articles. Notably, for certain embodiments herein, the sample size can include at least 10 randomly selected articles from a batch of articles. A batch of articles may be a group of articles that are collected from a single process run. Additionally or alternatively, a batch of articles may include an amount of shaped abrasive particles suitable for forming a commercial grade abrasive product, such as at least about 20 lbs. of particles.

In accordance with an embodiment, the body can have a primary aspect ratio (Lb:Wb) of at least about 1:1. In other embodiments, the body may have a primary aspect ratio that is about 2:1, such as at least about 3:1, at least about 5:1, or even at least about 10:1. Still, in one non-limiting embodiment, the body may have a primary aspect ratio of not greater than about 1000:1.

Furthermore, the body may be formed to have a particular secondary aspect ratio, such that the shaped abrasive particle has a desirable shape. For example, the body can have a secondary aspect ratio (Lb:Tb) of at least about 1:1. In other embodiments, the body may have a secondary aspect ratio that is at least about 2:1, such as at least about 3:1, at least about 5:1, or even at least about 10:1. Still, in one non-limiting embodiment, the secondary aspect ratio of the body may be not greater than about 1000:1.

In yet another embodiment, the body may be formed to have a particular tertiary aspect ratio (Wb:Tb) of at least about 1:1. In other instances, the body may have a tertiary aspect ratio of at least about 2:1, such as at least about 3:1, at least about 5:1, or even at least about 10:1. In still another non-limiting embodiment, the body can have a tertiary aspect ratio of not greater than 1000:1.

The dimensions of the body of the shaped abrasive particle may be formed to have a particular value. Any of the foregoing dimensions (e.g., Lb, Wb, Tb) of the body can have an average dimension of at least about 0.1 microns. In other instances, the average dimension of any one of the body length (Lb), body width (Wb), or body thickness (Tb) can have an average dimension of at least about 1 micron, at least about 10 microns, at least about 50 microns, at least about 100 microns, at least about 150 microns, at least about 200 microns, at least about 400 microns, at least about 600 microns, at least about 800 microns, at least about 1 mm. Still, in another non-limiting embodiment, any one of the body length (Lb), the body width (Wb), or the body thickness (Tb) can have an average dimension that is not greater than about 20 mm, not greater than about 18 mm, not greater than about 16 mm, not greater than about 14 mm, not greater than about 12 mm, not greater than about 10 mm, not greater than about 8 mm, not greater than about 6 mm, or even not greater than about 4 mm. It will be appreciated that any one of the dimensions can have an average dimension within a range between any of the minimum and maximum values noted above.

In another embodiment, the body may be formed to have a particular, desirable cross-sectional shape. For example, the body can have a cross-sectional shape in a plane defined by the body length (Lb) and body width (Wb), where the shape is selected from the group of triangular, quadrilateral, rectangular, trapezoidal, pentagonal, hexagonal, heptagonal, octagonal, ellipsoids, a Greek alphabet letter, a Latin alphabet character, a Russian alphabet character, a Kanji character, complex polygonal shapes, irregular shaped contours, and any combination thereof. Furthermore, the body may be formed to have a particular cross-sectional shape in a plane defined by the body length (Lb) and the body thickness (Tb). Such cross-sectional shape also can include a shape selected from the group of triangular, quadrilateral, rectangular, trapezoidal, pentagonal, hexagonal, heptagonal, octagonal, ellipsoids, a Greek alphabet letter, a Latin alphabet character, a Russian alphabet character, a Kanji character, complex polygonal shapes, irregular shaped contours, and any combination thereof.

The body also may be formed to have a particular, desirable three-dimensional shape. For example, the body can have a three-dimensional shape selected from the group consisting of a polyhedron, a pyramid, an ellipsoid, a sphere, a prism, a cylinder, a cone, a tetrahedron, a cube, a cuboid, a rhombohedrun, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof. A monostatic shape is a shape with a single stable resting position. Accordingly, shaped abrasive particles having a monostatic shape can be applied to a substrate and consistently be oriented in the same position, as they have only one stable resting position. For example, shaped abrasive particles having a monostaic shape may be suitable when applying the particles to a backing via gravity coating, which may be used in the formation of a coated abrasive product. More particularly, the shaped abrasive particles may be mono-monostatic shapes, which describe three dimensional objects having a shape with only one unstable point of balance. According to one particular embodiment, the shaped abrasive particle may have the shape of a gömböc. In another embodiment, the shaped abrasive particle is a monostatic polyhedron with at least four surfaces.

The additive manufacturing process according to the embodiments herein also may be used to form a plurality of shaped abrasive particles, where each of the shaped abrasive particles of the plurality of shaped abrasive particles have a body having a body length (Lb) a body width (Wb), and a body thickness (Tb) as described above. In accordance with an embodiment, the plurality of shaped abrasive particles can have at least one of a body length variation of not greater than about 50%, a body width variation of not greater than about 50%, and a body thickness variation of not greater than about 50%.

The body length variation may be described as a standard deviation of body length for a suitable sampling from a plurality of shaped abrasive particles, which can include a plurality of shaped abrasive particles. In an embodiment, the body length variation may be not greater than about 40%, such as not greater than about 30%, not greater than about 20%, not greater than about 10%, or even not greater than about 5%.

Like the body length variation, the body width variation may be a measure of the standard deviation of the width of the body for a suitable sampling of shaped abrasive particles from the plurality of shaped abrasive particles. In accordance with an embodiment, the body width variation may be not greater than about 40%, such as not greater than about 30%, and not greater than about 20%, not greater than about 10%, or even not greater than about 5%.

Furthermore, the body thickness variation may be a standard deviation of body thickness for a suitable sampling of shaped abrasive particles from the plurality of shaped abrasive particles. In accordance with one embodiment, the body thickness variation for the plurality of shaped abrasive particles may be not greater than about 40%, such as not greater than about 30%, not greater than about 20%, not greater than about 10%, or even not greater than about 5%.

In accordance with an embodiment the additive manufacturing process can include forming a body of a shaped abrasive particle by shaping a raw material without the use of a production tool. It will be appreciated that a production tool may refer to a mold or screen having one or more openings configured to contain and form the raw material into the desired final shaped abrasive particle. In accordance with another embodiment, the additive manufacturing process can include forming a body of a shaped abrasive particle by depositing a plurality of discrete portions of raw material in a controlled, non-random manner relative to each other. Still, in at least one embodiment, the additive manufacturing process can include depositing a plurality of portions of the body in a controlled, non-random manner relative to each other into a production tool. That is, in certain instances the additive manufacturing process can include use of a production tool. In at least one manner, the additive manufacturing process is distinct from conventional screen printing and molding processes as the production tool can be filled with a plurality of discrete portions that are placed into the production tool in a controlled-nonrandom manner.

Reference herein to formation of a shape abrasive particle will be understood to include formation of a precursor shaped abrasive particle. That is the additive manufacturing process may form a precursor shaped abrasive particle, which may be a green body or unfinished body that can undergo further processing to form the final shaped abrasive particle. In certain forming processes, the precursor shaped abrasive particle may have essentially the same shape of the final shaped abrasive particle.

In accordance with another embodiment, the additive manufacturing process can include processes such as light photopolymerization, laser powder forming, powder bed fusion, selective laser centering, micro-laser sintering, material extrusion, robocasting, material jetting, sheet lamination, and a combination thereof. In one particular embodiment, the light photopolymerization process can include stereolithography. Stereolithography can include a process wherein at least one layer of a slurry containing a polymer material can be polymerized during the forming process to form a shaped abrasive particle. More particularly, the stereolithography process can include provision of a mixture, such as a slurry containing a powder raw material and a carrier, and a polymer material that is configured to be polymerized during the forming process of forming the shaped abrasive particle.

In another embodiment the additive manufacturing process can include a laser powder forming process. Laser powder forming can include deposition of a raw material on a target, such as substrate and an impinging radiation, such as from a laser source, at the target and raw material to melt the raw material and form the raw material into at least a portion of a shaped abrasive particle. Notably, the laser powder forming process can include a change of phase of the raw material from a solid state to a liquid state such that a melt is formed prior to formation of at least a portion of the shaped abrasive particle.

The laser powder forming process can utilize a raw material selected from the group of materials such as a metal, a metal alloy, a glass, a ceramic, a polymer, and a combination thereof. In at least one particular embodiment, the shaped abrasive particle formed by the laser powder forming process can include a material such as a metal, a metal alloy, a glass, a ceramic, a ceramic precursor, a polymer, and a combination thereof. The shaped abrasive particles in one embodiment formed by a laser powder forming process can consist essentially of a glass material comprising oxide.

In another instance, the additive manufacturing process can include a selective laser sintering process. Selective laser sintering can include a process wherein radiation is directed to a target. The radiation may be supplied from a laser source. The radiation can be impinged on a target that includes a raw material, and the radiation can change at least a portion of the raw material into a portion of a shaped abrasive particle. In more particular instances, the selective laser sintering process can include impinging radiation from a laser source onto a portion of a bed of raw material and converting a portion of the bed of raw material into a shaped abrasive particle. For example, a portion of the bed of raw material impinged by the radiation can be converted in a manner such that it may undergo a phase change, while other portions of the raw material not subject to the radiation may maintain their original state. In accordance with an embodiment, changing at least a portion of the raw material can include a change in a crystalline structure of the raw material. For example, the bed of raw material may include a boehmite material that is changed by the radiation into an alternative form of alumina, including for example, alpha alumina. In yet another embodiment, changing at least a portion of the raw material can include changing a phases of the raw material, such as changing the raw material subject to the radiation from a solid phase to a liquid phase.

The raw material used in the selective laser sintering operation can include a metal, a metal alloy, a glass, a ceramic, a ceramic precursor, a polymer, and a combination thereof. In one particular embodiment, the raw material can include an oxide material, such as alumina or boehmite. Moreover, the shaped abrasive particle formed by the selective laser sintering process can include a metal, a metal alloy, a glass, a ceramic, a ceramic precursor, a polymer, and a combination thereof. In one particular embodiment, the shaped abrasive particle formed according to the selective laser sintering process can include an oxide material, such as alumina or boehmite.

And yet another embodiment the additive manufacturing process can include material jetting. A material jetting process can include deposition of discrete droplets of raw material onto a target and coalescence of the discrete droplets into at least a portion of the body of the shape abrasive particle.

According to one alternative process, the shaped abrasive particles can be formed using a low pressure injection molding process. Unlike certain conventional injection molding processes, a molding material, which can include any of the properties of the print material of the embodiments herein directed to an additive manufacturing process, can be injected into a mold in a controlled manner. In particular, during the process, the mold material can be injected into the mold under laminar flow conditions as opposed to turbulent flow conditions. The laminar flow conditions allow for controlled placement of the mold material into the mold according to a filling procedure, which may include selective placement of the mold material into portions of the mold in a particular sequence for a controlled filling procedure. The injection molding process may be combined with one or more processes described herein.

In accordance with one particular embodiment, the additive manufacturing process for forming the shaped abrasive particle can include robocasting. In certain instances, robocasting can include the deposition of a raw material onto a target in the form of discrete portions that are distinct from each other. The portions may be later coalesced through subsequent processing to form the shape abrasive particles. The raw material may be deposited from a nozzle onto a target or substrate in a controlled manner to form the body of the shaped abrasive particle.

In accordance with an embodiment, the process of forming the body via robocasting can include controlling at least one process parameter from the group consisting of a nozzle tip length; a nozzle width; a nozzle aspect ratio, a deposition pressure, a relationship between nozzle width and deposition pressure, a deposition rate, a deposition volume, a relationship between deposition rate and deposition position, a relationship between deposition pressure and deposition position, a shutoff distance, premove delay, a dispense gap, a filling pattern of the print material, a dynamic yield stress ($\sigma d$) of a print material, a static yield stress ($\sigma s$) of a print material, a yield stress ratio (ad/as) of a print material, and a combination thereof.

Figure 1B:
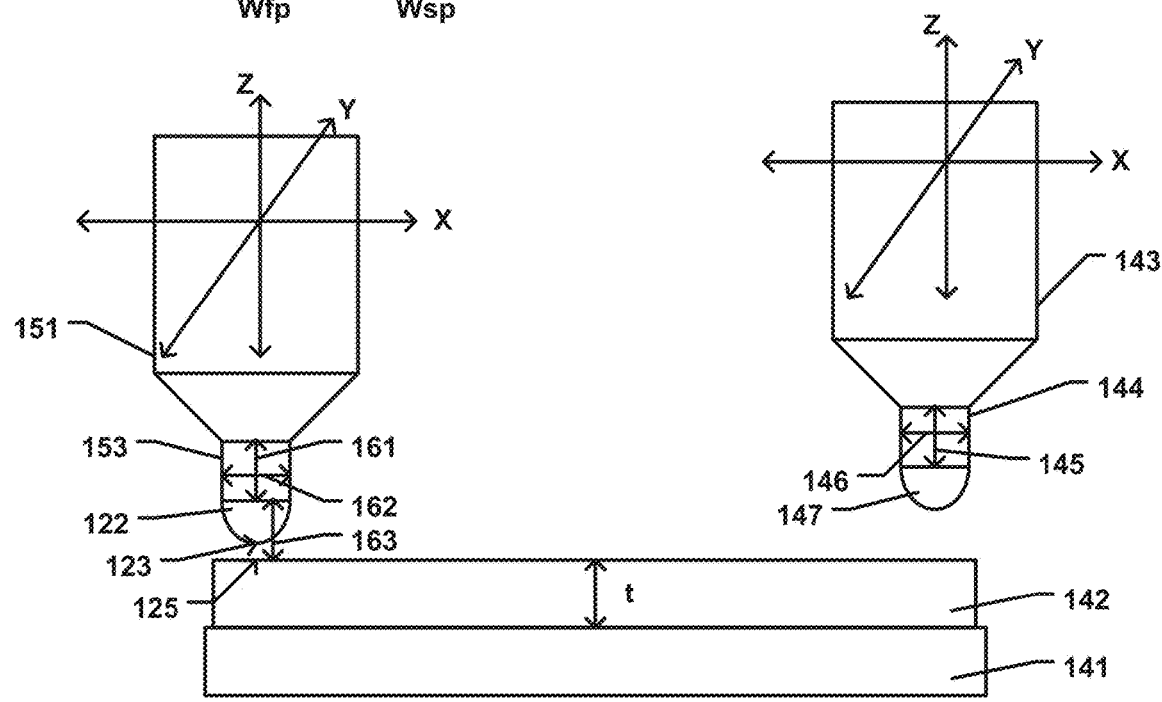
FIG. 1B includes an illustration of a system and method of forming a portion of a shaped abrasive particle in accordance with an embodiment.

In particular instances, the process of forming the body can include deposition or depositing a first print material as the first port portion of the body the first time and depositing a second print material as a second portion of the body distinct from the first portion and the second time. FIG. 1B includes an illustration of a portion of a system and method of forming a shaped abrasive particle according to an embodiment. As illustrated, the first deposition assembly 151 can be configured to deposit a first print material 122 and form at least the first portion 141 or the second portion 142. Certain processes may utilize a second deposition assembly 143 configured to deposit a second print material 147 from a second deposition head (i.e., second nozzle) 144 onto a target to form the first portion 141 or the second portion 142. In accordance with an embodiment, depositing the first material 122 can include forming the first portion 141 (e.g., in the form of a layer) at a first time and depositing the second print material 147 as the second portion 142 (e.g., in the form of a layer) overlying the first portion 141.

In accordance with one embodiment, the first portion 141 can have a first characteristic selected from the group of hardness, porosity, composition, and a combination thereof. Moreover, in another embodiment, the second portion 142 can have a second characteristic selected from the group of hardness, porosity, composition, and a combination thereof. In at least one embodiment, the first characteristic can be different from the second characteristic.

In certain instances, the first print material 122 can have a first composition and the second print material 147 can have a second composition. The first composition and second composition can be significantly different compared to each other. For example, the first and second compositions can differ from each other in terms of primary compositional species, which are distinct from trace amount species that are otherwise undetectable. In particular instances, the first and second compositions can be different from each other based on a difference of at least 2% of one of the primary compositional species in the first and second compositions.

In another embodiment, the second composition can have a different porosity relative to the porosity of the first composition. For example, in one embodiment, the first portion 141 may have a first porosity that is different than a second porosity of the second portion 142. More particularly, the first portion can have a first porosity that is greater than the second porosity of the second portion 142. According to at least one embodiment, the body can be formed to have selective porosity in particular portions, which may be suitable to facilitate certain the mechanical properties and abrasive capabilities of the shaped abrasive particle. In certain instances, the body can be formed with one or more portions (e.g., layers) having a select porosity to control the fracture mechanics of the shape abrasive particle.

Any another embodiment, the first print material 122 and the second print material 137 can be deposited in different regions within the body. For example, referring to FIG. 1, the first portion 141 can include the first print material 122 and the second portion 142 can include the second print material 147. Controlled deposition of the first print material 122 and second print material 137 may be suitable to control the mechanical properties and abrasive characteristics of the shaped abrasive particle. For example, controlled deposition of the first print material 122 and second print material 137 may be suitable to form a shaped abrasive particle having a controlled fracturing behavior. For example, the first print material 122 can have a first composition and the second print material 147 can have a second composition, and the forming process can include selective deposition of the first and second compositions with respect to each other within the body to affect the fracturing behavior of the shaped abrasive particles. For example, in one particular embodiment, the first print material 122 and the second print material 147 can be deposited in alternative layers with respect to each other within a region of the body to form a composite body, which may configured to control a self-sharpening behavior of the body.

In another embodiment, the first portion 141 can have a first hardness that is distinct from a second hardness associated with the second portion 142. For example: one embodiment, the first portion 141 and the second portion 142 can have a difference in hardness relative to each other. In certain instances, the first hardness of the first portion 141 can be greater than the second hardness of the second portion 142. In one particular instance, the first portion 141 and second portion 42 can be deposited in a particular arrangement relative to each other, which may facilitate improved fracturing behavior and performance of the shaped abrasive particle.

In yet another embodiment, the first print material 122 and second print material 147 can be deposited in different regions of the body to form a composite body including a controlled arrangement of the regions relative to an intended orientation of the shaped abrasive particle in a fixed abrasive article. For example, the first print material 122 and second print material 147 can be arranged within the body such that when the shaped abrasive particle is deployed within a fixed abrasive article (e.g., bonded abrasive, coated abrasive, nonwoven abrasive, etc.) the first print material 122 and the second print material 147 are arranged relative to the intended orientation of the particle in the fixed abrasive. Control of the orientation of the first print material 122 and the second print material 147 within the body of the shaped abrasive particle and relative to the intended orientation of the body in the fixed abrasive may facilitate improved performance of the shaped abrasive particle and the fixed abrasive article.

In certain instances, the forming process can include depositing the first portion 141 having a first volume that is different than a second volume associated with the second portion 142. For example, as illustrated in FIG. 1B, the first portion 141 can have a first volume that is different than a volume of the second portion 142. More particularly, in certain instances, the first portion 141 can have a first volume that can be greater than the second volume of the second portion 142. According to one particular embodiment, the volume of the portions can decrease as the forming process continues, such that the volume of portions formed subsequent to the initial portion decreases relative to the volume of the initial portion.

In accordance with an embodiment, the process of controlled deposition of the first portion and second portion may be suitable to control the size of certain features of the body of the shaped abrasive particle. For example, in at least one embodiment, the first portion 141 can have a first volume that is greater than a second volume of the second portion 142. In such instances, the first portion 141 may define a central region of the body and the second portion 142 may define at least a portion of a corner of the body. More particularly, the first portion 141 may define a central region of the body and the second portion 142 may define an edge of the body. Notably, it will be appreciated that for certain shaped abrasive particles, it may be desirable to form certain portions of the body using smaller portions, such as the edges and the corners, such that these portions of the body have smaller features and can act as sharp edges or sharp corners. Accordingly, the forming process can include controlled volume deposition at certain portions of the body to facilitate control of the shape and size of certain features, which may facilitate improved performance of the shaped abrasive particle.

As further illustrated in FIG. 1B, the process of forming can include utilization of a first deposition assembly 151, a first deposition head 153, and a first print material 122, that may be deposited from the first deposition assembly 151. As noted in the embodiments herein, the utilization of a second deposition assembly 143 may facilitate the selective deposition of a second print material 147, which may be distinct in various manners from the first print material 122 associated with the first deposition assembly 151. For example, in at least one embodiment, the first portion 141 may be formed by one of the first deposition assembly 151 or the second deposition assembly 143. As described in embodiments herein, the process of forming the body can include depositing at least a first print material 122, from the first deposition head 153 (i.e., nozzle 153) onto a target, wherein the movement of the nozzle may be controlled by a computer program.

As will be appreciated, in certain forming processes, such as the forming process illustrated in FIGS. 1A and 1B, the process of forming can include controlling a three-dimensional movement of the nozzle configured for deposition of a print material relative to a target. In certain instances, controlling three-dimensional movement can include control of the nozzle in an X-axis, Y-axis, the Z-axis. Furthermore, as illustrated in FIG. 1B, the process may utilize a plurality of nozzles, wherein each nozzle of the plurality of nozzles can be configured to deposit a print material. The process can include control of each of the nozzle the plurality of nozzles and a three-dimensional movement, such as control of the nozzles in an X-axis, Y-axis, and the Z-axis.

In particular instances, the process of forming a body of the shaped abrasive particle having the features described herein may be facilitated by utilization of a nozzle 153 having a particular width 162. For example, the nozzle 153 can have a width 162 that may be not greater than about 200 microns, such as not greater than about 150 microns, not greater than about 120 microns, not greater than about 100 microns, not greater than about 90 microns, not greater than about 85 microns, not greater than about 80 microns, not greater than about 75 microns, not greater than about 70 microns, not greater than about 65 microns, not greater than about 60 microns, not greater than about 55 microns, not greater than about 50 microns, not greater than about 45 microns, not greater than about 40 microns, not greater than about 35 microns, not greater than about 30 microns, not greater than about 25 microns, not greater than about 20 microns. Still, in at least one non-limiting embodiment, the nozzle 153 may have a width 162 of at least about 0.1 microns, such as at least about 1 microns, or even at least about 10 microns. It will be appreciated that the nozzle 153 can have a width 162 within a range between any of the minimum and maximum values noted above, including for example, within a range between at least about 0.1 microns and not greater than about 500 microns, such as within a range between at least about 0.1 microns and not greater than about 100 microns, or even within a range between at least about 0.1 microns and not greater than about 80 microns.

It will be appreciated that reference herein to a nozzle width 162 can include reference to an interior opening within the nozzle 153. For example, referring briefly to FIG. 1E, an illustration of an end of a nozzle according to an embodiment is provided. As illustrated, the nozzle 153 can have an opening 155 defining a passage through which the print material can flow and be deposited. The opening 155 can have various two-dimensional shapes, including for example polygon and ellipsoidal. In accordance with one embodiment as illustrated in FIG. 1E, the opening 155 can have a circular two-dimensional shape, and thus the diameter 156 defines the width. As such, reference herein to the width of the nozzle 153, will be understood to be reference to the width or diameter of the opening 155 depending upon the two-dimensional shape of the opening 155.

In yet another embodiment, the nozzle 153 can have a tip length 161 defining a longest dimension of the nozzle 153. Control of the tip length 161 of the nozzle 153 may facilitate improved deposition of the print material, and ultimately formation of features of the body of the shaped abrasive particle. In accordance with an embodiment, the nozzle can have a tip length 161 of not greater than about 10 mm, such not greater than about 8 mm, not greater than about 6 mm, not greater than about 5 mm, or even not greater than about 4 mm. Still, and another non-limiting embodiment, the nozzle 153 can have a tip length 161 of at least about 0.1 mm, such as at least about 0.2 mm, at least about 0.5 mm, or even at least about 1 mm. It will be appreciated that the tip length 161 of the nozzle 153 can be within a range between any of the minimum maximum values noted above, including for example, a tip length 161 of at least about 0.1 mm and not greater than about 10 mm, such as at least about 0.1 mm and not greater than about 5 mm, or even at least about 0.2 mm and not greater than about 4 mm.

In accordance with one embodiment, the nozzle aspect ratio value (width/tip length) of the nozzle 153 may be controlled to facilitate improved deposition and formation of features of the body of the shaped abrasive particles. For example, the nozzle 153 can have a nozzle aspect ratio value (width/tip length) of not greater than about 0.8, such as not greater than about 0.6, not greater than about 0.5, or even not greater than about 0.4. Still, and another non-limiting embodiment, the nozzle 153 may have a nozzle aspect ratio value of at least about 0.001, such as at least about 0.005, or even at least about 0.008. It will be appreciated that the nozzle 153 can have a nozzle aspect ratio value within a range between any of the minimum and maximum values noted above, including for example, at least about 0.001 and not greater than about 0.8, such as at least about 0.005 and not greater than about 0.5, or even at least about 0.008 and not greater than about 0.4. It will also be appreciated that the second deposition head (i.e., second nozzle 144) associated with the second deposition assembly 143 can have any of the features described in accordance with the first deposition assembly 151.

In accordance with an embodiment, the process of forming can include controlling a deposition pressure to facilitate suitable deposition of the first print material and facilitating formation of a body having suitable features for use as a shaped abrasive particle. For example, in at least one embodiment, the deposition pressure can be not greater than about greater than about 5 MPa, such as not greater than about 4.5 MPa, not greater than about 4 MPa, not greater than about 3.5 MPa, not greater than about 3 MPa, not greater than about 2.5 MPa, not greater than about 2 MPa, not greater than about 1.8 MPa, not greater than about 1.5 MPa, not greater than about 1.3 MPa, not greater than about 1 MPa, not greater than about 0.9 MPa, not greater than about 0.8 MPa, or even not greater than about 0.7 MPa. Still, in at least one non-limiting embodiment, the deposition pressure can be at least about 0.005 MPa, such as at least about 0.01 MPa, at least about 0.05 MPa, at least about 0.08 MPa, or even at least about 0.1 MPa. It will be appreciated that the deposition pressure may be within a range between any of the minimum and maximum values noted above, including for example a deposition pressure or at least about 0.05 MPa and not greater than about 5 MPa, such as at least about 0.01 MPa and not greater than about 2 MPa, or even at least about 0.05 MPa and not greater than about 1.5 MPa.

In certain instances, the process of forming the body can include can include controlling the relationship between the nozzle width 162 and the deposition pressure to define a first forming factor (width/deposition pressure) having a value of at least about 0.2 microns/MPa, such as at least about 1 micron/MPa, at least about 2 microns/MPa, at least about 4 microns/MPa, at least about 6 microns/MPa, at least about 8 microns/MPa, at least about 10 microns/MPa, at least about 12 microns/MPa, at least about 14 microns/MPa, or even at least about 16 microns/MPa. Still, in at least one non-limiting embodiment, the first forming factor can have a value of not greater than about $1 \times 10^5$ microns/MPa, such as not greater than about $1 \times 10^4$ microns/MPa, not greater than about 8000 microns/MPa, not greater than about 6000 microns/MPa, not greater than about 5000 microns/MPa, not greater than about 4000 microns/MPa, not greater than about 3000 microns/MPa, not greater than about 2000 microns/MPa, not greater than about 1000 microns/MPa, not greater than about 500 microns/MPa, not greater than about 200 microns/MPa, or even not greater than about 100 microns/MPa. It will be appreciated that the first forming factor can be within a range between any of the minimum and maximum values noted above, including for example, at least about at least about 0.2 microns/MPa and not greater than about $1 \times 10^5$ microns/MPa, such as at least about 1 micron/MPa and not greater than about 6000 microns/MPa, or even at least about 2 microns/MPa and not greater than about 1000 microns/MPa.

In yet another embodiment, the process of forming the body can include control of the deposition rate that defines the rate at which the nozzle is moved. Suitable control the deposition rate can facilitate suitable formation of the features of the shaped abrasive particles according to the embodiments herein. For example, the forming process can include moving the nozzle a particular deposition rate, such as at least about 0.01 mm/s, at least about 0.05 mm/s, at least about 0.08 mm/s, at least about 0.1 mm/s, at least about 0.3 mm/s, at least about 0.5 mm/s, at least about 0.8 mm/s, at least about 1 mm/s, at least about 1.5 mm/s, at least about 2 mm/s, at least about 2.5 mm/s, at least about 3 mm/s. Still, in another non-limiting embodiment, the process of forming can include moving the nozzle at a deposition rate of not greater about 50 mm/s, such as not great about 30 mm/s, or even not greater than about 20 mm/s. It will be appreciated that the process of forming can include a deposition rate within a range between any of the minimum and maximum values noted above, including for example a deposition rate of at least about 0.01 mm/s and not greater than about 50 mm/s, such as at least about 0.1 mm/s and not greater than about 30 mm/s, or even at least about 1 mm/s and not greater than about 20 mm/s.

In accordance with a particular embodiment, the process of forming can include controlling a deposition volume of one or more print materials to form particular portions of the body of the shaped abrasive particle. For example, the process of forming can include controlling the deposition volume by changing the deposition volume of the print material, depending upon a portion of the body being formed. In at least one embodiment, the forming process can include depositing a smaller volume of material in a region defining a corner of the body as compared to the volume of material deposited in the region defining a major surface of the body. Such deposition procedures may be particularly suitable in the formation of sharp edges or corners which may be particularly suitable for the shaped abrasive particles of the embodiments herein.

The process of depositing controlled volumes can include controlling deposition volume by controlling at least one of a deposition pressure and the deposition rate of the nozzle. Particularly, the process of controlling deposition volume can include controlling a width, length, and height of the portion (e.g., the first portion 141) of the body formed at a first time. Moreover, controlling the deposition volume can further include controlling the width of the deposition nozzle used to form the particular portion. For example, a nozzle having a smaller width may be used to deposit the print material associated with certain portions of the body (e.g., corners or edges) while a nozzle having a greater nozzle width may be used to deposit a print material associated with other portions, such as the major faces or interior portions of the body.

In still another instance, the process of forming can include controlling the relationship between the deposition rate and the deposition position. In one embodiment, controlling the relationship between deposition rate and deposition position can include changing the deposition rate depending upon the deposition position. More particularly, controlling the relationship between deposition rate and deposition position can include varying the deposition rate to change the size of features in the body. For example, in one embodiment, controlling the relationship between deposition rate and deposition position can include decreasing the deposition rate at a deposition position associated with the corner or edge of the body of the shaped abrasive particle relative to a deposition rate associated with a deposition position at a major surface or an interior portion of the body.

In yet another embodiment, the process of forming can include controlling the relationship between deposition pressure and deposition position. In at least one embodiment, the process of controlling the relationship between deposition pressure and the deposition position can include changing the deposition pressure depending upon the deposition position. In another embodiment, the process of controlling the relationship between the deposition pressure and deposition position can include varying the deposition pressure depending on the deposition pressure to change the features in the body. Particularly, in certain instances, the process of controlling the relationship between the deposition pressure and deposition position can include decreasing the deposition pressure at a deposition position associated with a corner or edge of the body of the shaped abrasive particle relative to a deposition pressure associated with a deposition position at a major surface or interior portion of the body.

In still another embodiment, the process of forming the body can include controlling a premove delay between the initial deposition of the print material from the deposition assembly and the movement of the deposition assembly, including for example, movement of the nozzle from which the print material can be deposited. For example, the premove delay may facilitate suitable formation of the features of the shaped abrasive particle, including those that may utilize certain deposition patterns, such as an outside-in and in-side out filling process. The delay between the initiation of the deposition process and the movement of the deposition assembly can facilitate ensuring that the In at least one embodiment, the process of forming the body can include utilizing a premove delay greater than about 0 seconds, such as at least about 0.1 seconds, or even at least about 0.5 seconds. In still another embodiment, the premove delay may be not greater than about 10 seconds, such as not greater about 8 seconds, not greater than about 6 seconds, or even not greater than about 4 seconds. It will be appreciated that the premove delay may be within a range between any of the minimum maximum values noted above, including for example, at least about 0.1 seconds and not greater than about 10 second, at least about 0.5 seconds and not greater than about 6 seconds.

For at least one embodiment, the process of forming the body can include controlling a shut off distance defining a distance the deposition assembly travels between the time at which pressure is no longer applied to the print material and the print material stops depositing from the deposition assembly. Control of the shutoff distance can facilitate formation of the features of the shaped abrasive particles of the embodiments herein. The shutoff distance can be less than a dispense gap. In other instances, the shutoff distance can be greater than the dispense gap. According to another embodiment, the shutoff distance can be substantially the same as the dispense gap, such that the value of the dispense gape and the value of the shutoff distance do not vary from each other by more than 5%. In certain instances, the shutoff distance can be not greater than about 2 mm, not greater than about 1 mm, not greater than about 0.5 mm, not greater than about 0.2 mm, or even not greater than about 0.1 mm. In at least one non-limiting embodiment, the shutoff distance can be at least about 0.001 mm. It will be appreciated that the shutoff distance may be within a range between any of the minimum maximum values noted above, including for example, at least about 0.001 mm and not greater than about 1 mm, at least about 0.001 mm and not greater than about 0.2 mm.

The process of forming the body of the shaped abrasive particle can further include controlling a dispense gap 163. The dispense gap 163 may define a distance between the end of the nozzle 153 and a target 125, which may be a surface of a substrate or surface of another portion of where the print material is intended to be deposited. It has been noted that control of the dispense gap 163 can facilitate suitable formation of a shaped abrasive particle. In accordance with an embodiment, the dispense gap 163 can have a particular relationship relative to the width 162 of the nozzle 153. For example, the dispense gap 163 can be not greater than about 10W, wherein "W" represents the width 162 of the nozzle 153. In another embodiment, the dispense gap 163 can be not greater than about 9W, such as not greater than about 8W, not greater than about 7W, not greater than about 6W, not greater than about 5W, not greater than about 4W, not greater than about 3W, not greater than about 2W, or even not greater than about 1W. Still, and another in embodiment, the dispense gap 163 can be at least about 0.001W, such as at least about 0.005W, we least about 0.01W, or even at least about 0.1W. It will be appreciated that the dispense gap 163 can have a value within a range between any of the minimum and maximum values noted above, including for example, at least we spoke 0.001W and not greater than about 10W, at least about 0.05W and not greater than about 5W, or even at least about 0.01W and not greater than about 2W. It will be appreciated that the second deposition assembly 143 and nozzle 144 can be controlled such that the dispense gap associated with the use of the nozzle 144 can have the same features as noted above.

In accordance with another embodiment, the dispense gap 163 may have a particular relationship relative to the thickness "t", wherein "t" represents the average thickness of the portion of the body formed by the print material using the nozzle. For example, the dispense gap 163 associated with the nozzle 153 can be controlled relative to the average thickness "t" of the second portion 142 as formed by the nozzle 153. In accordance with an embodiment, the dispense gap 163 can be not greater about 10t, such as not greater than about 9t, not greater about 8t, not greater than about 7t, not greater than about 6t, not greater than about 5t, not greater than about 4t, not greater than about 3t, not greater than about 2t, or even not greater than about 1t. Still, and another non-limiting embodiment, the dispense gap 163 can be at least about 0.001t, such as at least about 0.05t, or even at least about 0.01t. It will be appreciated that the dispense gap 163 can have a value within a range between any of the minimum and maximum values noted above, including for example, at least about 0.001t and not greater than about 10t, such as at least about 0.05t and not greater than about 5t, or even at least about 0.01t and not greater than about 2t.

In at least one embodiment, the process of forming the body can include controlling the dispense gap 163 by varying the dispense gap 163 such that the first print material 122 contacts the target at a suitable distance upon exiting the end of the nozzle 153. For example, the first print material 122 may exit the end of the nozzle 153 and the terminal and 123 of the first print material 122 may contact the target 125. In particular instances, controlling the dispense gap 163 can include controlling the height of the end of the nozzle 153 above the target 125, such that print material can contact the target upon exiting the nozzle 153 without forming a free droplet in the space between the end of the nozzle 153 and the target 125. It is been noted that for certain types of print material, including those suitable for forming the shaped abrasive particle, the deposition process should be conducted to avoid the formation of free droplets, and during deposition a connection is maintained between the target 125 and the end of the nozzle 153 by the first print material 122.

Furthermore, suitable formation of the body of the shaped abrasive particle can include controlling the dispense gap by varying the Z-directional distance between the end of the nozzle 153 and the target 125 based upon at least one of the parameters of the group including nozzle tip length 161, the nozzle width 162, the deposition pressure, the deposition rate, the deposition volume, the deposition position, the filling pattern of the print material, the dynamic yield stress of the print material, the static yield stress of the print material, the yield stress ratio of the print material, the viscosity of the print material, and a combination thereof. According to one embodiment, the process of forming the body can include controlling the dispense gap 163 by varying the dispense gap based upon the deposition pressure. In other instances, the process s of forming the body can include controlling the dispense gap 163 by varying the dispense gap 163 based upon the deposition position. In still other embodiments, the process of forming may include varying the dispense gap 163 depending on the deposition position, and more particularly, based on the resolution of the feature desired at the particular deposition position. For example, if the material is to be deposited at a position representing a corner or edge of the body of the shaped abrasive particle, the dispense gap 163 may be adjusted, and may be different compared to a dispense gap 163 used to form a major surface or interior portion of the body of the shaped abrasive particle. Furthermore, the process of controlling the dispense gap 163 can include varying the dispense gap 163 to control the volume of material deposited at a deposition position, which may be suitable for formation of certain features of the body, including for example, a corner, an edge, a major surface, or interior portion of the body.

In accordance with an embodiment, the process of forming the body of the shaped abrasive particle using the additive manufacturing process can include controlling a filling pattern that defines the order of forming the portions of the body. The filling pattern and particular process associated with the filling pattern can be selected to form a suitable shaped abrasive particle and may facilitate improved performance of the shaped abrasive particle and fixed abrasives incorporating the shaped abrasive particle. As noted in the embodiments herein, the first portion 141 may be formed into a two-dimensional or three-dimensional shape depending upon the desired shape of the first portion 141 and the final shape of the shaped abrasive particle. Any one of the portions of the shaped abrasive particle (e.g., the first portion 141) can be formed in a particular order defined by a filling pattern. The filling pattern can define a deposition process including but not limited to an outside-in filling process, an inside-out filling process, a side-to-side filling process, a bottom-up filling process, and a combination thereof.

Figure 1C:
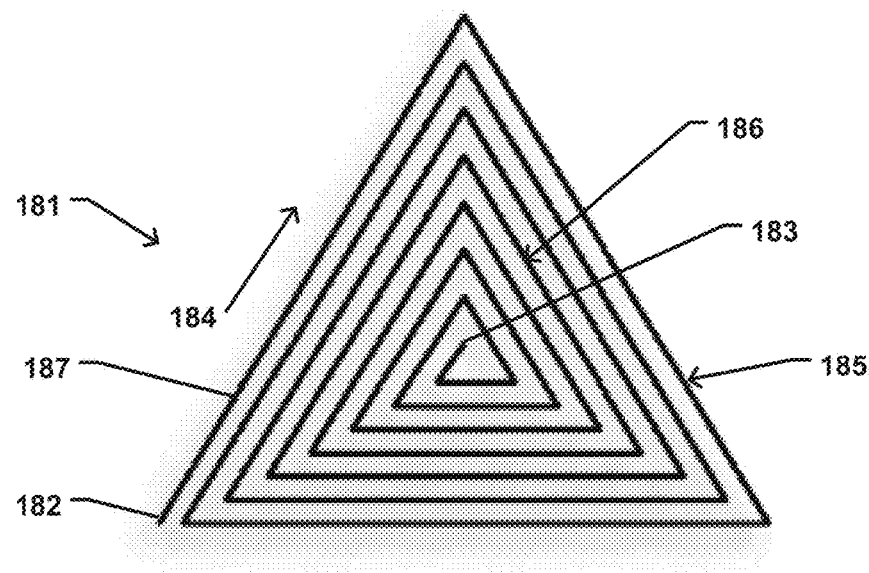
FIG. 1C includes an illustration of a filling pattern according to an embodiment.

For example, referring to FIG. 1C, a top-down view of a filling pattern for forming a portion of a shaped abrasive particle according to an embodiment is provided. As illustrated, the first portion 181 can be in the form of a layer and may be formed by initiating deposition of the print material at the position 182. The deposition assembly and the process of depositing the print material may traverse along the path 187 in the direction 184 from the position 182 to the position 183, where the deposition process is stopped and the first portion 181 is completed. Such a filling pattern can be an outside-in filling process. The outside-in filling process can be characterized by a process that initially forms at least a portion of an outer periphery 185 of the first portion 181 and subsequently forms the interior portion 186.

In another embodiment, an inside-out filling process may be utilized that can include a process of depositing the print material to initially form an interior region of a portion and subsequently forming the peripheral regions of the portion. For example, referring again to FIG. 1C, a filling pattern using an inside-out filling process can be undertaken in the opposite direction of the outside-in filling process. The inside-out filling process can initiate deposition at the position 183 and traverse along the path 187 in the direction opposite the direction 184 to the position 182 where the deposition process can be stopped and the first portion 181 is formed. In such an embodiment, the interior portion 186 of the first portion 181 is formed first and the outer periphery 185 of the first portion 181 is formed subsequent to and around the interior portion 186.

Figure 1D:
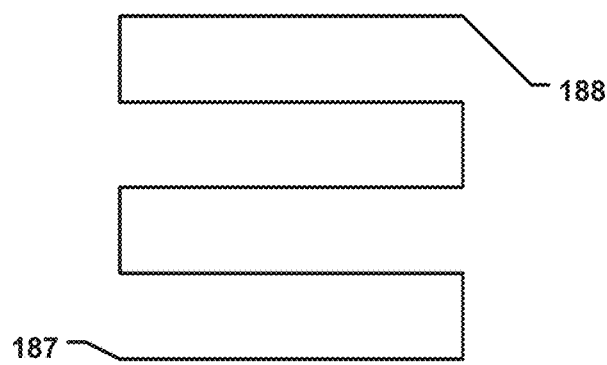
FIG. 1D includes an illustration of filling pattern according to an embodiment.
Figure 1E:
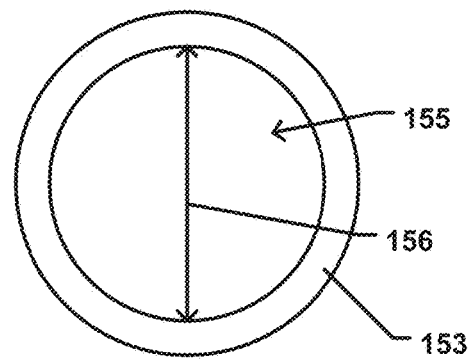
FIG. 1E includes an illustration of an end of a nozzle according to an embodiment.

Referring to FIG. 1D, a side-to-side filling process is illustrated according to an embodiment. In a side-to-side filling process, the deposition assembly can initiate deposition of the print material at position 187, and move laterally back and forth depositing the print material and stopping at position 188 to form a first portion.

FIG. 1D can also represent an embodiment of a bottom-up filling process in another embodiment. It will be appreciated that for a bottom-up filling process, the print material can be deposited in a pattern that is based upon formation of one or more overlying layers. For example, in a bottom-up filling process, the deposition assembly may initiate deposition of the print material at position 187 and move back and forth building the structure upon itself in a vertical direction and ending the deposition process at position 188.

The process of forming the body can include controlling a filling pattern such that a first portion of the body formed at a first time can be formed using a first filling pattern, and a second portion of the body formed a second time, which is distinct from the first time, can be formed using a second filling pattern that is distinct from the first filling pattern. For example, in one particular embodiment, the filling pattern used to form the body can include forming a first portion by an outside-in filling process and a second portion by an inside-out filling process. More particularly, referring again to FIG. 1C, a first portion 181 in the form of a first layer can be formed by an outside-in forming process and subsequently a second portion can be formed over the first portion 181. The second portion can be in the form of a layer overlying the first portion 181, and the second portion can be formed by an inside-out filling process, wherein deposition can be initiated at a position directly above position 183 and concluded at a position directly above position 182.

According to a particular embodiment, the print material, which can include a mixture, can have a particular dynamic yield stress ($\sigma d$) that may facilitate suitable formation of the body of the shaped abrasive particle. For example, the print material may have a dynamic yield stress ($\sigma d$) of at least about 100 Pa, at least about 120 Pa, at least about 140 Pa, at least about 160 Pa, at least about 180 Pa, at least about 200 Pa. Still, in another non-limiting embodiment, the print material may have a dynamic yield stress($\sigma d$) of not greater than about 1500 Pa, not greater than about 1300 Pa, not greater than about 1200 Pa, not greater than about 1100 Pa, not greater than about 1000 Pa. It will be appreciated that the print material can have a dynamic yield stress ($\sigma d$) within a range between any of the minimum maximum values above, including for example, at least about 100 Pa and not greater than about 1500 Pa, at least about 160 Pa and not greater than about 1200 Pa, or even at least about 200 Pa, and not greater than about 1200 Pa.

The process of forming the body can include controlling at least one process parameter such as the dispense gap, the nozzle tip length, the nozzle width, the deposition pressure, the deposition rate, the deposition volume, the deposition position, and the filling pattern of the print material based on the dynamic yield stress ($\sigma d$) of the print material. It will be appreciated that the process can include controlling a combination of the foregoing process parameters based on the dynamic yield stress. Control of one or more process parameters based on the dynamic yield stress may facilitate improved formation of a shaped abrasive particle.

In another embodiment, the print material, which may include a mixture, may have a particular static yield stress ($\sigma s$) that may facilitate suitable formation of the body of the shaped abrasive particle. For example, the may have a static yield stress ($\sigma s$) of at least about 180 Pa, such as at least about 200 Pa, at least about 250 Pa, at least about 300 Pa, at least about 350 Pa, at least about 400 Pa, at least about 450 Pa, at least about 500 Pa, at least about 550 Pa, at least about 600 Pa. In another non-limiting embodiment, the static yield stress ($\sigma s$) can be not greater than about 20,000 Pa, such as not greater than about 18,000 Pa, not greater than about 15,000 Pa, not greater than about 5000 Pa, not greater than about 1000 Pa. It will be appreciated that the print material can have a static yield stress ($\sigma s$) within a range between any of the minimum and maximum values noted above, including for example, at least about 180 Pa and not greater than about 20,000 Pa, at least about 400 Pa and not greater than about 18,000 Pa, or even at least about 500 Pa and not greater than about 5000 Pa.

The process of forming the body can include controlling at least one process parameter such as the dispense gap, the nozzle tip length, the nozzle width, the deposition pressure, the deposition rate, the deposition volume, the deposition position, and the filling pattern of the print material based on the static yield stress ($\sigma s$) of the print material. It will be appreciated that the process can include controlling a combination of the foregoing process parameters based on the static yield stress. Control of one or more process parameters based on the static yield stress may facilitate improved formation of a shaped abrasive particle.

In certain instances, the process of forming the body of the shaped abrasive particle can include forming a print material having a particular relationship between the static yield stress (σs) and the dynamic yield stress (σd). In one embodiment, the print material may be formed such that the static yield stress is different than the dynamic yield stress. More particularly, the print material may be formed such that it is a shear-thinning print material configured to be suitably extruded from the nozzle and yet have control dimensional stability to avoid significant movement (e.g., slumping) once deposited on the target.

In one embodiment, the print material, which may include a mixture, can have a static yield stress that is greater than the dynamic yield stress that may facilitate formation of the shaped abrasive particle. More particularly, the print material may be formed such that it has a particular yield stress ratio (ad/as), such as not greater than about 1, not greater than about 0.99, not greater about 0.97, not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, or even not greater than about 0.5. Still, in one non-limiting embodiment, the yield stress ratio (ad/as) can be at least about 0.01, such as at least about 0.05, at least about 0.08, at least about 0.1, at least about 0.15, at least about 0.2, at least about 0.25, at least about 0.3, at least about 0.35, at least about 0.4, or even at least about 0.45, or even at least 0.5. It will be appreciated that the print material can have a yield stress ratio within a range between any of the minimum and maximum values noted above, including for example, a yield stress ratio of not greater than one and at least about 0.01, such as not greater than about 0.97 and at least about 0.1, or even not greater than about 0.8 and at least about 0.2.

The process of forming the body can include controlling at least one process parameter such as the dispense gap, the nozzle tip length, the nozzle width, the deposition pressure, the deposition rate, the deposition volume, the deposition position, and the filling pattern of the print material based on the yield stress ratio (ad/as) of the print material. It will be appreciated that the process can include controlling a combination of the foregoing process parameters based on the yield stress ratio (ad/as). Control of one or more process parameters based on the yield stress ratio (ad/as) may facilitate improved formation of a shaped abrasive particle.

In yet another embodiment, the print material may be formed to have a particular viscosity to facilitate formation of the body of the shaped abrasive particle having the features of the embodiments herein. For example, the print material can have a viscosity of at least about $4 \times 10^3$ Pa s, such as at least about $5 \times 10^3$ Pa s, at least about $6 \times 10^3$ Pa s, at least about $7 \times 10^3$ Pa s, at least about $7.5 \times 10^3$ Pa s. In another non-limiting embodiment, the print material can have a viscosity of not greater than about $20 \times 10^3$ Pa s, such as not greater than about $18 \times 10^3$ Pa s, not greater than about $15 \times 10^3$ Pa s, or even not greater than about $12 \times 10^3$ Pa s. Still, it will be appreciated that the print material can have a viscosity within a range including any of the minimum and maximum values noted above, including but not limited to, at least about $4 \times 10^3$ Pa s and not greater than about $20 \times 10^3$ Pa s, such as at least about $5 \times 10^3$ Pa s and not greater than about $18 \times 10^3$ Pa s, at least about $6 \times 10^3$ Pa s and not greater than about $15 \times 10^3$ Pa s. For those print materials that are shear-thinning or otherwise non-Newtonian materials, the above viscosity values may be an apparent viscosity. The viscosity can be measured by incrementally decreasing a shear rate from 100 s to 2 s without pre-shearing the print material using a parallel plate rheometer.

The process of forming the body can include controlling at least one process parameter such as the dispense gap, the nozzle tip length, the nozzle width, the deposition pressure, the deposition rate, the deposition volume, the deposition position, and the filling pattern of the print material based on the viscosity of the print material. It will be appreciated that the process can include controlling a combination of the foregoing process parameters based on the viscosity. Control of one or more process parameters based on the viscosity may facilitate improved formation of a shaped abrasive particle.

It will be appreciated that any of the forming processes herein can be combined with other processes, including conventional processes of printing, spraying, deposition, casting, molding, and the like. In certain instances, the additive manufacturing process may be used to form a preform of the body of the shaped abrasive particle. The preform can be a skeleton of the body, such as an outer portion or an inner portion that is first created, and processed further through one or more other processes to create the shaped abrasive particle. For example, in at least one embodiment, an additive manufacturing process may be used to form an exterior portion of the body, such as the peripheral walls of the body. After forming the exterior portion, a subsequent operation may be utilized to form an interior portion of the body, including for example, a separate forming process (e.g., a filling process) using the same material or a different material used in the additive manufacturing process used to form the exterior portion. One suitable forming process to form the interior portion can include a spraying process or printing process. The two step process of forming the different portions of the body may facilitate efficient processing over a process relying only on an additive manufacturing process to form the entire body of the shaped abrasive particle. It will be appreciated that the above example is non-limiting and other two-step processes including the additive manufacturing process may be used. It is envisioned that one may form an interior portion of the body using the additive manufacturing process and forming an exterior portion of the body using a different process than the additive manufacturing process.

The shaped abrasive particle formed by an additive manufacturing process as defined herein can include a variety of other suitable dimensions and features. In an embodiment, the body of the shaped abrasive particle includes a first major surface, a second major surface, and at least one side surface extending between the first major surface and the second major surface.

Figure 3:
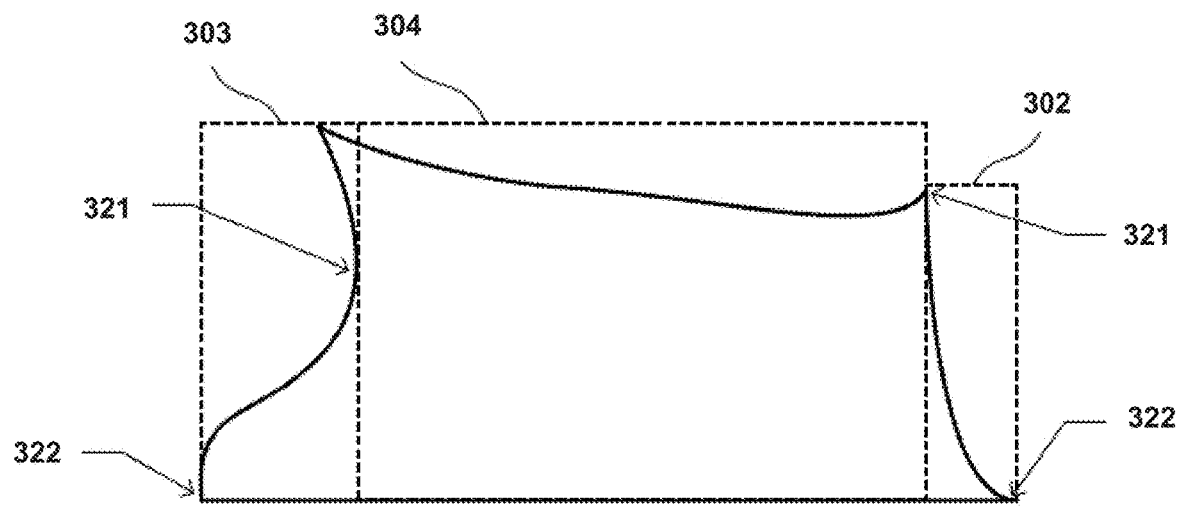
FIG. 3 includes a side view of a shaped abrasive particle and percentage flashing according to an embodiment.

The bodies of the shaped abrasive particles can have a percent flashing that may facilitate improved performance. Notably, the flashing defines an area of the body as viewed along one side, wherein the flashing extends from a side surface of the body 301 within the boxes 302 and 303, as illustrated in FIG. 3. The flashing can represent tapered regions proximate to the upper surface 303 and bottom surface 304 of the body 301. The flashing can be measured as the percentage of area of the body 301 along the side surface contained within a box extending between an innermost point of the side surface (e.g., 321) and an outermost point (e.g., 322) on the side surface of the body 301. In one particular instance, the body 301 can have a particular content of flashing, which can be the percentage of area of the body 301 contained within the boxes 302 and 303 compared to the total area of the body 301 contained within boxes 302, 303, and 304. The flashing can represent tapered regions proximate to first and second major surfaces of the body. The flashing can be measured as the percentage of area of the body along the side surface contained within a box extending between an innermost point of the side surface and an outermost point on the side surface of the body.

In one particular instance, the body can have a particular content of flashing, which can be the percentage of area of the body within the tapered regions compared to the total area of the body. According to one embodiment, the percent flashing (f) of the body can be at least about 1%. In another embodiment, the percent flashing can be greater, such as at least about 2%, at least about 3%, at least about 5%, at least about 8%, at least about 10%, at least about 12%, such as at least about 15%, at least about 18%, or even at least about 20%. Still, in a non-limiting embodiment, the percent flashing of the body 301 can be controlled and may be not greater than about 45%, such as not greater than about 40%, not greater than about 35%, not greater than about 30%, not greater than about 25%, not greater than about 20%, not greater than about 18%, not greater than about 15%, not greater than about 12%, not greater than about 10%, not greater than about 8%, not greater than about 6%, or even not greater than about 4%. In a particular embodiment, the body can be essentially free of flashing. It will be appreciated that the percent flashing of the body can be within a range between any of the above minimum and maximum percentages. Moreover, it will be appreciated that the above flashing percentages can be representative of an average flashing percentage or a median flashing percentage for a batch of shaped abrasive particles.

The shaped abrasive particles of the embodiments herein can be formed such that the body includes a crystalline material, and more particularly, a polycrystalline material. Notably, the polycrystalline material can include grains. In one embodiment, the body can be essentially free of an organic material including, for example, a binder. More particularly, the body can consist essentially of a polycrystalline material.

In one aspect, the body of the shaped abrasive particle can be an agglomerate including a plurality of particles, grit, and/or grains bonded to each other to form the body. Suitable grains can include nitrides, oxides, carbides, borides, oxynitrides, oxyborides, diamond, and a combination thereof. In particular instances, the grains can include an oxide compound or complex, such as aluminum oxide, zirconium oxide, titanium oxide, yttrium oxide, chromium oxide, strontium oxide, silicon oxide, and a combination thereof. In one particular instance, the ceramic article is formed such that the grains forming the body include alumina, and more particularly, may consist essentially of alumina. In another instance, the body of the ceramic article can consist essentially of alumina. Moreover, in particular instances, the body of the shaped abrasive particle can be formed from a seeded sol gel.

In an embodiment, the body can include a polycrystalline material. The grains (e.g., crystallites) contained within the body may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron. Still, the average grain size of the grains contained within the body can be at least about 0.01 microns, such as at least about 0.05 microns, such as at least about 0.08 microns, at least about 0.1 microns, or even at least about 0.5 microns. It will be appreciated that the grains can have an average grain size within a range between any of the minimum and maximum values noted above.

In accordance with certain embodiments, the shaped abrasive particle can be a composite article including at least two different types of grains within the body. It will be appreciated that different types of grains are grains having different compositions with regard to each other. For example, the body can be formed such that it includes at least two different types of grains, wherein the two different types of grains can be nitrides, oxides, carbides, borides, oxynitrides, oxyborides, diamond, and a combination thereof.

In some embodiments, the body of the ceramic article can include a variety of suitable additives. For example, the additive can include an oxide. In a particular embodiment, the additive can include a metal element, such as a rare-earth element. In another particular embodiment, the additive can include a dopant material. For example, the dopant material can include an element or compound selected from the group consisting of an alkali element, an alkaline earth element, a rare-earth element, a transition metal element, and a combination thereof. In yet another embodiment, the dopant material can include an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof.

According to a particular embodiment, the forming process can form precursor shaped abrasive particles. The precursor shaped abrasive particles may undergo further processing to form shaped abrasive particles. Such further processing can include, but need not be limited to, drying, heating, evolving, volatilizing, sintering, doping, drying, curing, reacting, radiating, mixing, stirring, agitating, calcining, comminuting, sieving, sorting, shaping, and a combination thereof.

Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above. Furthermore, the drying process may be conducted for a particular duration. For example, the drying process may be not greater than about six hours.

The process of forming the precursor shaped abrasive particle to a finally-formed shaped abrasive particle may further comprise a sintering process. Sintering of the precursor shaped abrasive particle may be utilized to densify the article, which is generally in a green state as the precursor shaped abrasive particle. In a particular instance, the sintering process can facilitate the formation of a high-temperature phase of the ceramic material. For example, in one embodiment, the precursor shaped abrasive particle may be sintered such that a high-temperature phase of the material is formed, including for example, alpha alumina. According to one particular embodiment, the shaped abrasive particle can be a shaped abrasive particle having at least about 90 wt % alpha alumina for the total weight of the particle. In a more particular instance, the content of alpha alumina may be greater such that the shaped abrasive particle may consist essentially of alpha alumina.

In accordance with another aspect, a method of forming a fixed abrasive article including shaped abrasive particles formed through the additive manufacturing process can also be accomplished. For example, the process of forming a fixed abrasive article can include forming a plurality of shaped abrasive particles on a substrate, where each of the shaped abrasive particles of the plurality of shaped abrasive particles have a body formed by an additive manufacturing process. It will be appreciated that the fixed abrasive article may include a bonded abrasive article, a coated abrasive article, and the like. It will further be appreciated that the substrate can include, for example, a backing.

In at least one embodiment, the forming process can be conducted such that the shaped abrasive particles are formed directly overlying the substrate. For example, in accordance with an embodiment, a perspective view illustration of a fixed abrasive article including shaped abrasive particles overlying the substrate is provided in FIG. 2. As illustrated, the fixed abrasive article 200 can include a first shaped abrasive particle 201 overlying a substrate 204 and a second shaped abrasive particle 211 overlying the substrate 204.

It will be appreciated that the process of forming a shaped abrasive particle as part of a fixed abrasive article can include any of the processes described herein in other embodiments. For example, as indicated herein, the body of each of the shaped abrasive particles 201 and 211 of the plurality of shaped abrasive particles can be formed according to a digital model. As further illustrated, and described herein, each of the shaped abrasive particles 201 and 211 can have bodies formed from a plurality of portions 203, which may be discrete from each other, or may have undergone further processing (e.g., modifying) to join the portions together to form each of the bodies of the shaped abrasive particles 201 and 211.

As described in the embodiments herein, the additive manufacturing process of forming the body according to a digital model can include depositing a first print material as a first portion of the body of each of the shaped abrasive particles of the plurality of shaped abrasive particles at a first time. Furthermore, the process can include depositing a second print material as a second portion of the body of each of the shaped abrasive particles of the plurality of shaped abrasive particles at a second time that is different than the first time. In a particular embodiment, the additive manufacturing process also can include preferentially modifying one of the first portion and the second portion to join the first portion and the second portion and form a subsection of the body of the shaped abrasive particle.

In accordance with a particular embodiment, the forming process can be conducted directly on at least a portion of a bonding layer 231, which may be overlying the substrate. The bonding layer 231 can include a material such as an inorganic material, a vitreous material, a crystalline material, an organic material, a resin material, a metal material, a metal alloy, and a combination thereof. The bonding layer may be a continuous layer or material or may be a discontinuous layer of material having discrete bonding regions separated by gaps, wherein essentially no bonding material is present. The process of forming can include selectively forming shaped abrasive particles in regions corresponding to the discrete bonding regions, such that each discrete bonding region has one or more shaped abrasive particles contained therein.

Figure 2:
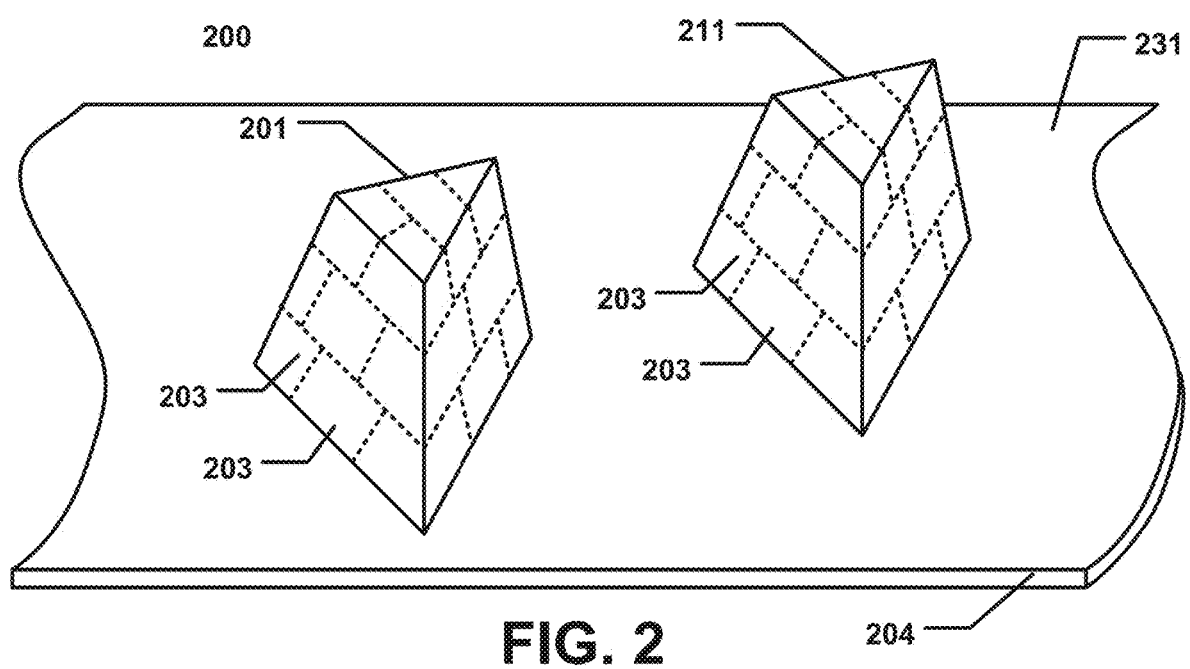
FIG. 2 includes a perspective view illustration of an abrasive article including shaped abrasive particles according to an embodiment.

In some embodiments of the forming process, the substrate 204 may be translated through a forming zone. In the forming zone, at least one shaped abrasive particle of the plurality of shaped abrasive particles can be formed overlying the substrate. In particular instances, the translation of the substrate 204 can include a stepped translation process, wherein the substrate 204 may be translated a certain distance and stopped to allow the formation of the shaped abrasive particle to occur. After a shaped abrasive particle is suitably formed overlying the substrate 204, the stepped translation process can continue by translating the substrate 204 in a desirable direction by a known distance again and stopping again to facilitate the formation of another shaped abrasive particle at a particular location on substrate 204. In one embodiment, as shown in FIG. 2, the substrate 204 may be translated to a first position defined by the position of the shaped abrasive particle 211, wherein at a first time the shaped abrasive particle 211 can be formed by an additive manufacturing process. After suitable formation of the shaped abrasive particle 211, the substrate 204 may be translated in a direction to a position identified by the position of the shaped abrasive particle 201 overlying the substrate 204. At that point, the substrate 204 may be stopped to allow the formation of the shaped abrasive particle 201 at the location provided in FIG. 2.

As such, a plurality of shaped abrasive particles can be formed at predetermined locations on the substrate 204. Notably, in certain instances, the formation of the fixed abrasive article 200 can be conducted such that each of the shaped abrasive particles can be placed on the backing, and such placement can be conducted simultaneously with the formation of the body of each of the shaped abrasive particles.

Furthermore, it will be appreciated that such a process of forming a fixed abrasive article also can include orienting each of the shaped abrasive particles of the plurality of the shaped abrasive particles relative to the substrate. Such orienting can facilitate the controlled orientation of each of the shaped abrasive particles relative to each other as well as relative to the substrate 204. For example, the process of forming the body of a shaped abrasive particle can be conducted simultaneously with the process of orienting the shaped abrasive particle relative to the substrate 204.

In more particular instances, each shaped abrasive particle may be formed in a manner such that it has a controlled orientation with respect to a vertical orientation, a rotational orientation, a flat orientation, or a side orientation. In the flat orientation, a bottom surface of a shaped abrasive particle can be closest to a surface of the substrate 204 (e.g., a backing) and an upper surface of the shaped abrasive particle can be directed away from the substrate 204 and configured to conduct initial engagement with a workpiece. Note herein that vertical orientation can refers to the orientation of the particles as viewed in a plane perpendicular to the belt, whereas rotational orientation refers to the orientation of a shaped abrasive particle as viewed in a plane parallel to the belt.

Figure 4:
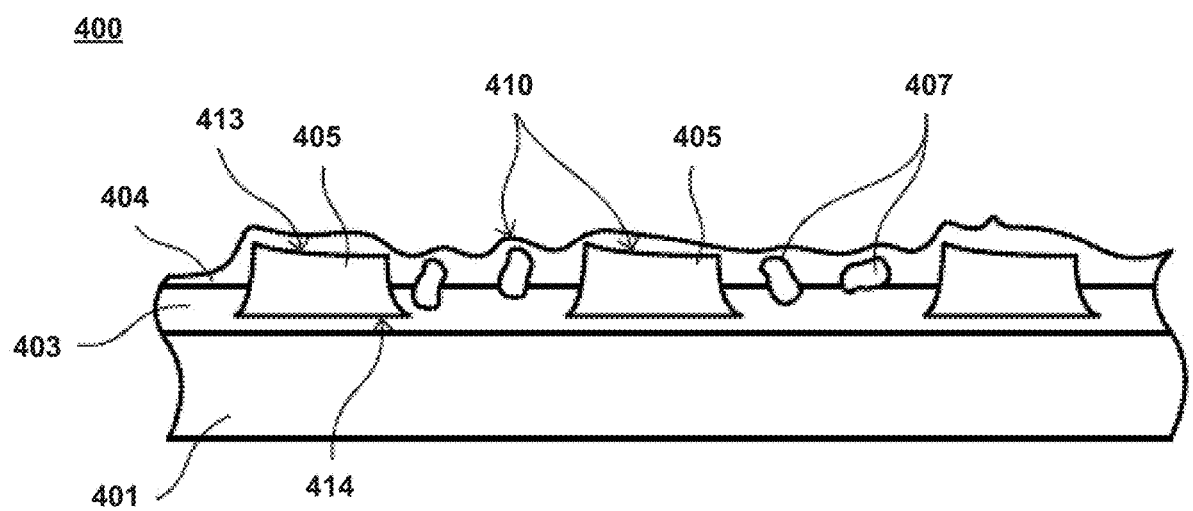
FIG. 4 includes a cross-sectional illustration of a portion of a coated abrasive article according to an embodiment.

Turning briefly to FIG. 4, a coated abrasive article is illustrated including shaped abrasive particles in a particular orientation relative to the substrate. For example, the coated abrasive article 400 can include a substrate 401 (i.e., a backing) and at least one adhesive layer overlying a surface of the substrate 401. The adhesive layer can include a make coat 403 and/or a size coat 404. The coated abrasive 400 can include abrasive particulate material 410, which can include shaped abrasive particles 405 of the embodiments herein and a second type of abrasive particulate material 407 in the form of diluent abrasive particles having a random shape, which may not necessarily be shaped abrasive particles. The make coat 403 can be overlying the surface of the substrate 401 and surrounding at least a portion of the shaped abrasive particles 405 and second type of abrasive particulate material 407. The size coat 404 can be overlying and bonded to the shaped abrasive particles 405 and second type of abrasive particulate material 407 and the make coat 403.

According to one embodiment, the shaped abrasive particles 405 herein can be oriented in a predetermined orientation relative to each other and the substrate 401. As illustrated in FIG. 4, the shaped abrasive particles 405 can be oriented in a flat orientation relative to the substrate 401. In the flat orientation, the bottom surface 414 of the shaped abrasive particles can be closest to a surface of the substrate 401 (i.e., the backing) and the upper surface 413 of the shaped abrasive particles 405 can be directed away from the substrate 401 and configured to conduct initial engagement with a workpiece.

Figure 5:
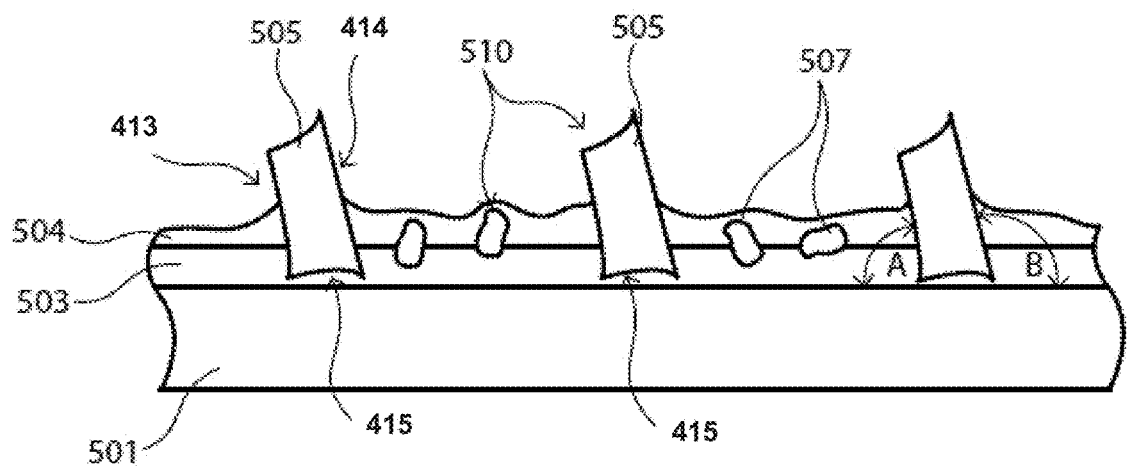
FIG. 5 includes a cross-sectional illustration of a portion of a coated abrasive article according to an embodiment.

According to another embodiment, the shaped abrasive particles 505 can be placed on a substrate 501 in a predetermined side orientation, such as that shown in FIG. 5. In particular instances, a majority of the shaped abrasive particles 505 of the total content of shaped abrasive particles 505 on the abrasive article 500 can have a predetermined side orientation. In the side orientation, the bottom surface 414 of the shaped abrasive particles 505 can be spaced away and angled relative to the surface of the substrate 501. In particular instances, the bottom surface 414 can form an obtuse angle (A) relative to the surface of the substrate 501. Moreover, the upper surface 513 can be spaced away and angled relative to the surface of the substrate 501, which in particular instances, may define a generally acute angle (B). In a side orientation, a side surface 416 of the shaped abrasive particle can be closest to the surface of the substrate 501, and more particularly, may be in direct contact with a surface of the substrate 501.

According to another embodiment, one or more shaped abrasive particles can be placed on a substrate in a predetermined side orientation. In particular instances, a majority of the shaped abrasive particles of the plurality of shaped abrasive particles on the abrasive article can have a predetermined side orientation. In the side orientation, a bottom surface of the shaped abrasive particle can be spaced away and angled relative to the surface of the substrate 204. In particular instances, the bottom surface can form an obtuse angle relative to the surface of the substrate 204. Moreover, the upper surface of the shaped abrasive particle is spaced away and angled relative to the surface of the substrate 204, which in particular instances, may define a generally acute angle. In a side orientation, one or more side surfaces of the shaped abrasive particle can be closest to the surface of the substrate 204, and more particularly, may be in direct contact with a surface of the substrate 204.

For certain fixed abrasive articles herein, at least about 55% of the plurality of shaped abrasive particles on the fixed abrasive article 200 can be oriented in a side orientation. Still, the percentage may be greater, such as at least about 60%, at least about 65%, at least about 70%, at least about 75%, at least about 77%, at least about 80%, at least about 81%, or even at least about 82%. And for one non-limiting embodiment, a fixed abrasive article 200 may be formed using the shaped abrasive particles herein, wherein not greater than about 99% of the plurality of shaped abrasive particles are oriented in a side orientation.

Furthermore, the abrasive articles made with the shaped abrasive particles formed by the additive manufacturing processes described herein can utilize various contents of the shaped abrasive particles. For example, the fixed abrasive articles can be coated abrasive articles including a single layer of the shaped abrasive particles in an open coat configuration or a closed coat configuration. For example, the plurality of shaped abrasive particles can define an open coat abrasive product having a coating density of shaped abrasive particles of not greater than about 70 particles/cm$^2$. In other instances, the density of shaped abrasive particles per square centimeter of the open coat abrasive article may be not greater than about 65 particles/cm$^2$, such as not greater than about 60 particles/cm$^2$, not greater than about 55 particles/cm$^2$, or even not greater than about 50 particles/cm$^2$. Still, in one non-limiting embodiment, the density of the open coat coated abrasive using the shaped abrasive particles herein can be at least about 5 particles/cm$^2$, or even at least about 10 particles/cm$^2$. It will be appreciated that the density of shaped abrasive particles per square centimeter of an open coat coated abrasive article can be within a range between any of the above minimum and maximum values.

In an alternative embodiment, the plurality of shaped abrasive particles can define a closed coat abrasive product having a coating density of shaped abrasive particles of at least about 75 particles/cm$^2$, such as at least about 80 particles/cm$^2$, at least about 85 particles/cm$^2$, at least about 90 particles/cm$^2$, at least about 100 particles/cm$^2$. Still, in one non-limiting embodiment, the density of the closed coat coated abrasive using the shaped abrasive particle herein can be not greater than about 500 particles/cm$^2$. It will be appreciated that the density of shaped abrasive particles per square centimeter of the closed coat abrasive article can be within a range between any of the above minimum and maximum values.

The substrate of the fixed abrasive articles described herein can include a variety of suitable materials, including an organic material such as polymers, an inorganic material, such as metal, glass, ceramic, and a combination thereof. In certain instances, the substrate can include a woven material. However, the substrate may be made of a non-woven material. In another embodiment, the substrate can include a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea formaldehyde resin, polyester, polyurethane, polypropylene, polyimides, and a combination thereof.

In certain situations, the shaped abrasive particles may be placed on a first substrate, which facilitates further processing of the shaped abrasive particles, such as drying, heating, and sintering. The substrate may be a permanent article. However, in other instances, the substrate may be a sacrificial article, that can be partially or completely destroyed during further processing of the shaped abrasive particles. The first substrate may be combined with a second substrate after processing of the shaped abrasive particles, for later forming the abrasive article. For example, in instances using a permanent first substrate, the first substrate may be combined with the second substrate to form a composite substrate that is used in the finally-formed fixed abrasive article. In still other instances where a sacrificial substrate is used, the placement and orientation of the shaped abrasive particles on the first substrate may be substantially maintained through the forming process, even though the first substrate is partially or completely removed. The finally-formed shaped abrasive particles may be combined with a second substrate while maintaining their placement and orientation to facilitate formation of the finally-formed abrasive article.

In some embodiments, the substrate of the fixed abrasive articles also can include a suitable additive or additives. For example, the substrate can include an additive chosen from the group consisting of catalysts, coupling agents, curants, anti-static agents, suspending agents, anti-loading agents, lubricants, wetting agents, dyes, fillers, viscosity modifiers, dispersants, defoamers, and grinding agents.

The fixed abrasive articles described herein, in addition to including a substrate (e.g., a backing), can include at least one adhesive layer, such as a bonding layer, overlying a surface of the substrate. The adhesive layer can include a make coat. A polymer formulation may be used to form any of a variety of layers of the abrasive article such as, for example, a frontfill, a pre-size, the make coat, the size coat, and/or a supersize coat. When used to form the frontfill, the polymer formulation generally includes a polymer resin, fibrillated fibers (preferably in the form of pulp), filler material, and other optional additives. Suitable formulations for some frontfill embodiments can include material such as a phenolic resin, wollastonite filler, defoamer, surfactant, a fibrillated fiber, and a balance of water. Suitable polymeric resin materials include curable resins selected from thermally curable resins including phenolic resins, urea/formaldehyde resins, phenolic/latex resins, as well as combinations of such resins. Other suitable polymeric resin materials may also include radiation curable resins, such as those resins curable using electron beam, UV radiation, or visible light, such as epoxy resins, acrylated oligomers of acrylated epoxy resins, polyester resins, acrylated urethanes and polyester acrylates and acrylated monomers including monoacrylated, multiacrylated monomers. The formulation can also comprise a nonreactive thermoplastic resin binder which can enhance the self-sharpening characteristics of the deposited abrasive composites by enhancing the erodability. Examples of such thermoplastic resin include polypropylene glycol, polyethylene glycol, and polyoxypropylene-polyoxyethene block copolymer, etc. Use of a frontfill on the substrate can improve the uniformity of the surface, for suitable application of the make coat and improved application and orientation of shaped abrasive particles in a predetermined orientation.

The abrasive article also can include abrasive particulate material, which can include shaped abrasive particles of the embodiments herein and a second type of abrasive particulate material in the form of diluent abrasive particles having a random shape, which may not necessarily be shaped abrasive particles. In an embodiment, the make coat can be overlying the surface of the substrate and surrounding at least a portion of the shaped abrasive particles and second type of abrasive particulate material. In another embodiment, the make coat can be bonded directly to at least a portion of the substrate. The make coat can include a variety of suitable materials including, for example, an organic material, a polymeric material, or a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

The adhesive layer also can include a size coat. The size coat can be overlying at least a portion of the plurality of shaped abrasive particles described herein, as well as any second type of abrasive particulate material and the make coat. The size coat also can be bonded directly to at least a portion of the plurality of shaped abrasive particles. Like the make coat, the size coat can include a variety of suitable materials including, for example, an organic material, a polymeric material, or a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

The fixed abrasive articles, including the shaped abrasive particles and the additive manufacturing processes used to form the shaped abrasive particles as described herein represent a departure from and improvement over conventional fixed abrasive articles. While many processes of forming shaped abrasive particles, including shaped abrasive particles, rely primarily on templating and/or substractive processes (e.g., molding, screen printing, etc.), the processes disclosed in the embodiments herein include a forming process for forming shaped abrasive particles using an additive manufacturing process. Moreover, the processes may further utility a digital model, which can be used to analyze, compare, and adapt the forming process, which may facilitate improved dimensional uniformity, shape, placement, and ultimately performance of the article utilizing the shaped abrasive particles.

While it will be appreciated that the shaped abrasive particles of the embodiments can have any suitable shape, FIGS. 6 through 19 provide illustrations of some exemplary, non-limiting shaped abrasive particles that may be made according to the embodiments herein.

Figure 18:
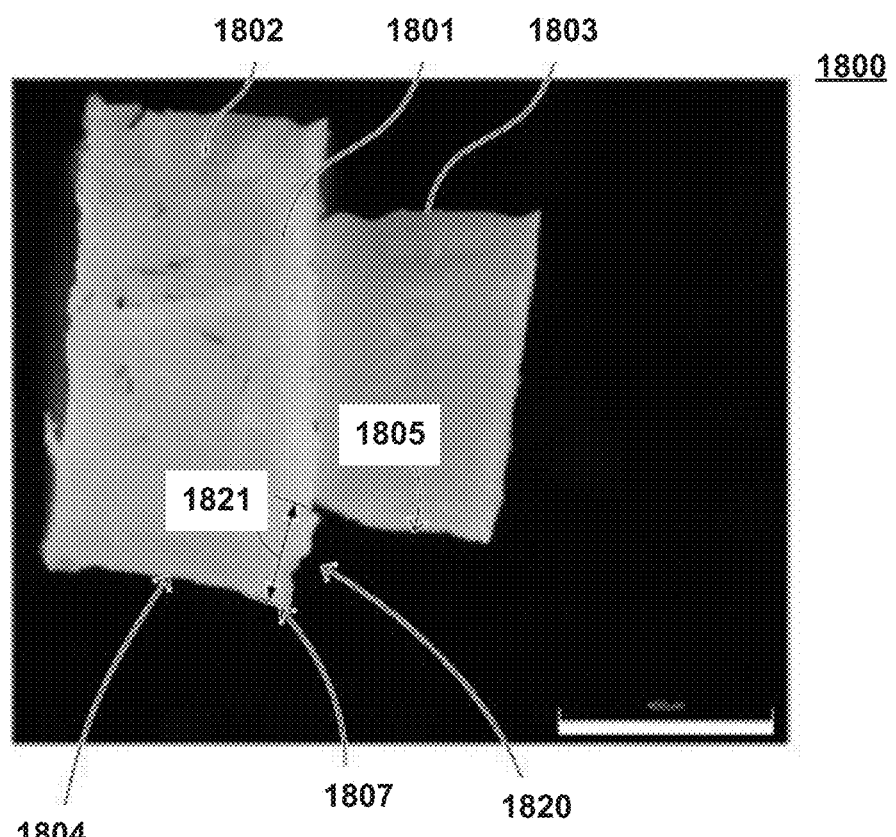

In particular, in one embodiment provided in FIG. 18, the shaped abrasive particle 1800 can include a body 1801 including a first layer 1802 and a second layer 1803 overlying the first layer 1802. According to an embodiment, the body 1801 can have layers 1802 and 1803 that are arranged in a stepped configuration relative to each other. A stepped configuration can be characterized by at least one plateau region 1820 on a surface 1810 of the first layer 1802 between a side surface 1804 of the first layer 1802 and a side surface 61805 of the second layer 1803. The size and shape of the plateau region 1820 may be controlled or predetermined by one or more processing parameters and may facilitate an improved deployment of the abrasive particles into an abrasive article and performance of the abrasive article.

Figure 19:
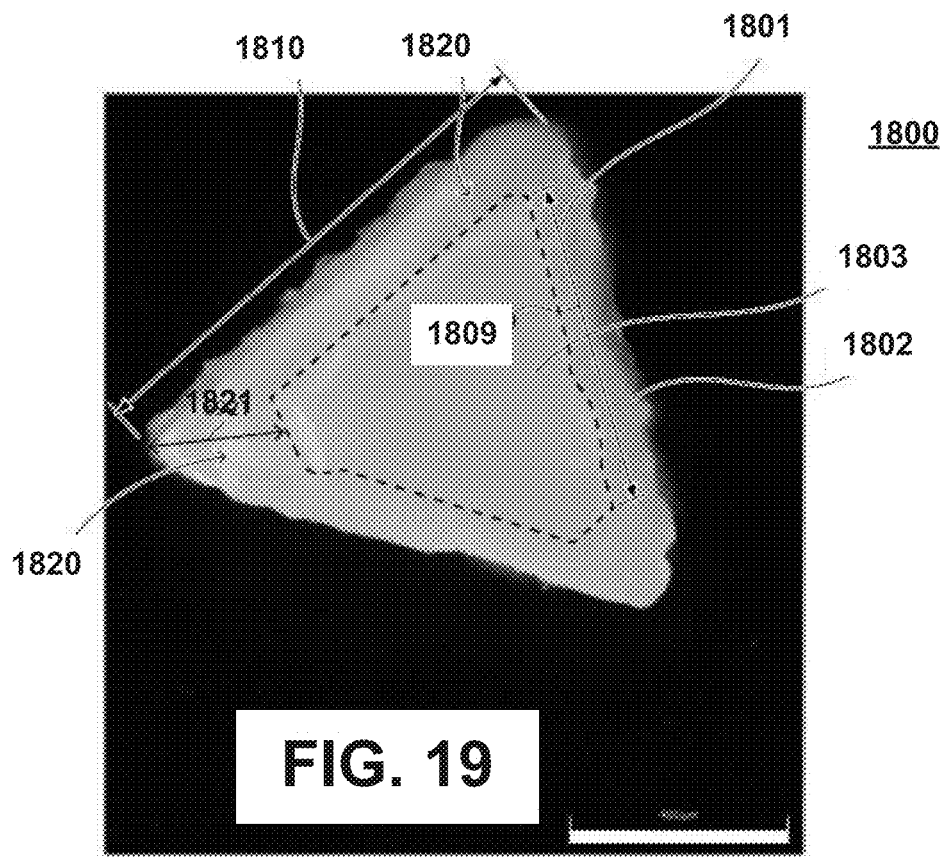

In one embodiment, the plateau region 1802 can have a lateral distance 1821, which can be defined as the greatest distance between an edge 1807 between the upper surface 1810 of the first layer 1802 and a side surface 1804 of the first layer to the side surface 1805 of the second layer. Analysis of the lateral distance 1821 may be facilitated by a top-view image of the body 1801, such as shown in FIG. 19. As illustrated, the lateral distance 1821 can be the greatest distance of the plateau region 1802. In one embodiment, the lateral distance 1821 may have a length that is less than the length 1810 of the first layer 1802 (i.e., larger layer). In particular, the lateral distance 1821 can be not greater than about 90%, such as not greater than about 80%, not greater than about 70%, not greater than about 60%, not greater than about 50%, not greater than about 40%, not greater than about 30%, or even not greater than about 20% of the length 1810 of the first layer 1802 of the body 1801. Still, in one non-limiting embodiment, the lateral distance 1821 can have a length that is at least about 2%, at least about 5%, at least about 8%, at least about 10%, at least about 20%, at least about 25%, at least about 30%, or even at least about 50% of the length of the first layer 1802 of the body 1801. It will be appreciated that the lateral distance 1821 can have a length within a range between any of the minimum and maximum percentages noted above.

The second layer 1803 can have a particular length 1809, which is the longest dimension of a side, such as shown in FIG. 19, relative to a length 1810 of the first layer 1802 that may facilitate improved deployment of the abrasive particles into an abrasive article and/or performance of the abrasive article. For example, the length 1809 of the second layer 1803 can be not greater than about 90%, such as not greater than about 80%, not greater than about 70%, not greater than about 60%, not greater than about 50%, not greater than about 40%, not greater than about 30%, or even not greater than about 20% of the length 1810 of the first layer 1802 of the body 1801. Still, in one non-limiting embodiment, the second layer 1803 can have a length 1809 that can be at least about 2%, at least about 10%, at least about 20%, at least about 30%, at least about 40%, at least about 50%, at least about 60%, or even at least about 70% of the length 1810 of the first layer 1802 of the body 1801. It will be appreciated that the length 1809 of the second layer 1803 relative to the length 1810 of the first layer 1802 can be within a range between any of the minimum and maximum percentages noted above.

The foregoing shaped abrasive particle of FIGS. 18 and 19 can be formed using the additive manufacturing process according to the embodiments herein. Moreover, it is contemplated that the organization of the layers can be different than as illustrated. The body may include any combination of layers of different dimensions and/or shapes in any organization relative to each other.

Moreover, coated abrasive articles have been described in detail herein, but it will be appreciated that the shaped abrasive particles of the embodiments may be employed in bonded abrasive articles. Bonded abrasive articles can take various shapes including wheels, discs, cups, segments, and the like generally consisting of composites having abrasive grains contained within a three-dimensional bond matrix. Additionally, the bonded abrasive tools can include some volume percentage of porosity.

Some suitable materials for use as the bond material can include metal materials, polymer materials (e.g., resin), vitreous or amorphous phase materials, crystalline phase materials, and a combination thereof.

Bonded abrasive articles are typically formed from an initial mixture including the bond material or a precursor of the bond material, the abrasive particles (e.g., shaped abrasive particles, diluent particles, combination of different types of abrasive particles, etc.), and fillers (e.g., active fillers, grinding aids, pore formers, mixing aids, reinforcing agents, etc.). The mixture can be formed into a green body (i.e., unfinished body) using various techniques, including but not limited to, molding, pressing, extruding, depositing, casting, infiltrating, and a combination thereof. The green body may undergo further processing to aid formation of the final-formed bonded abrasive body. The processing may depend on the composition of the mixture, but can include processes such as drying, curing, radiating, heating, crystallizing, re-crystallizing, sintering, pressing, decomposition, dissolution, and a combination thereof.

The final-formed bonded abraisve article may have various contents of the components (i.e., abrasive particles, bond material, filler, and porosity) depending on the intended end use. For example, in certain instances, the final-formed bonded abrasive article can have a porosity of at least about 5 vol % of the total volume of the bonded abrasive article. In other embodiments, the porosity can be greater, such as on the order of at least about 15 vol %, at least 25 vol %, at least about 25 vol %, at least about 50 vol %, or even at least about 60 vol %. Particular embodiments may utilize a range of porosity between about 5 vol % and about 75 vol % of the total volume of the bonded abrasive article.

Moreover, the final-formed bonded abrasive may have a content of bond material of at least about 10 vol % for the total volume of the bonded abrasive body. In other instances, the body can include at least about 30 vol %, such as at least about 40 vol %, at least about 50 vol % or even at least about 60 vol % bond material for the total volume of the body of the bonded abrasive article. Certain embodiments may utilize a range of bond material between about 10 vol % and about 90 vol %, such as between about 10 vol % and about 80 vol %, or even between about 20 vol % and about 70 vol % of the total volume of the bonded abrasive article.

The final-formed bonded abrasive may have a content of abrasive particles of at least about 10 vol % for the total volume of the bonded abrasive body. In other instances, the body can include at least about 30 vol %, such as at least about 40 vol %, at least about 50 vol % or even at least about 60 vol % abrasive particles for the total volume of the body of the bonded abrasive article. In other examples, the abrasive article may utilize a range of abrasive particles between about 10 vol % and about 90 vol %, such as between about 10 vol % and about 80 vol %, or even between about 20 vol % and about 70 vol % of the total volume of the bonded abrasive article.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Figure 20:
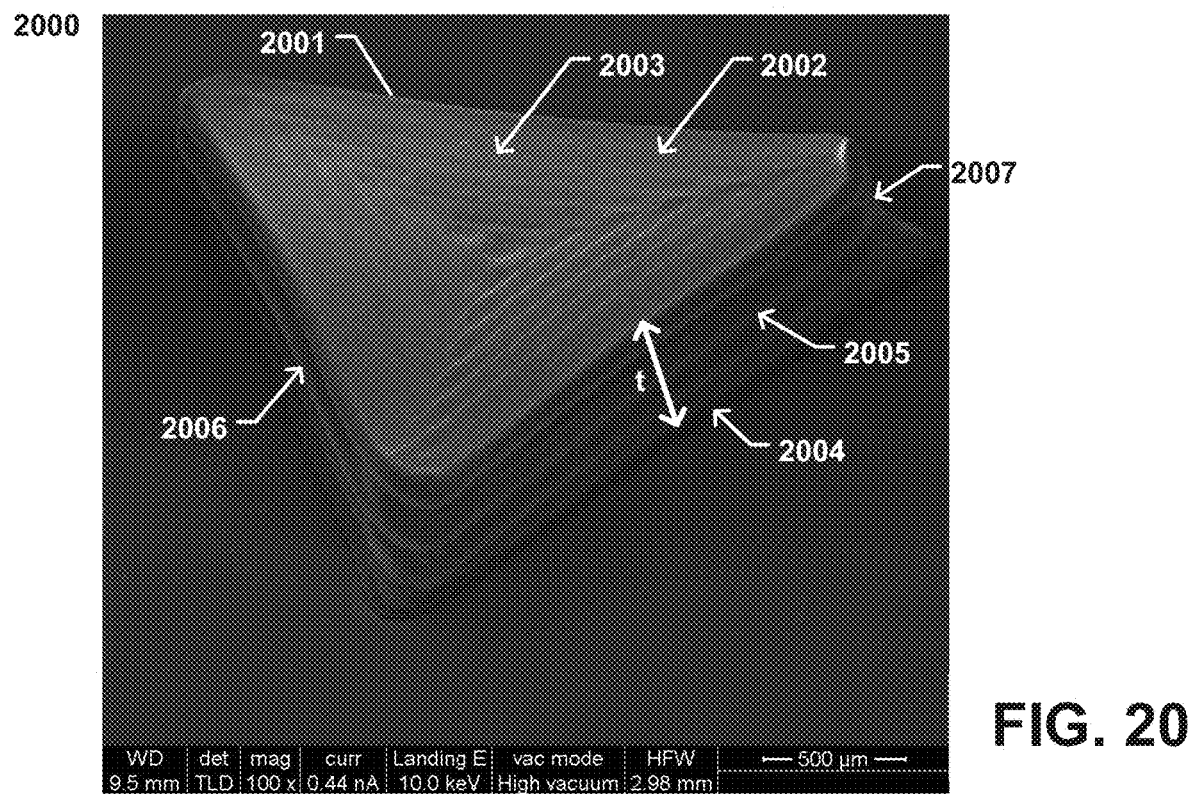
FIG. 20 includes a perspective view illustration of a shaped abrasive particle according to an embodiment.
Figure 21:
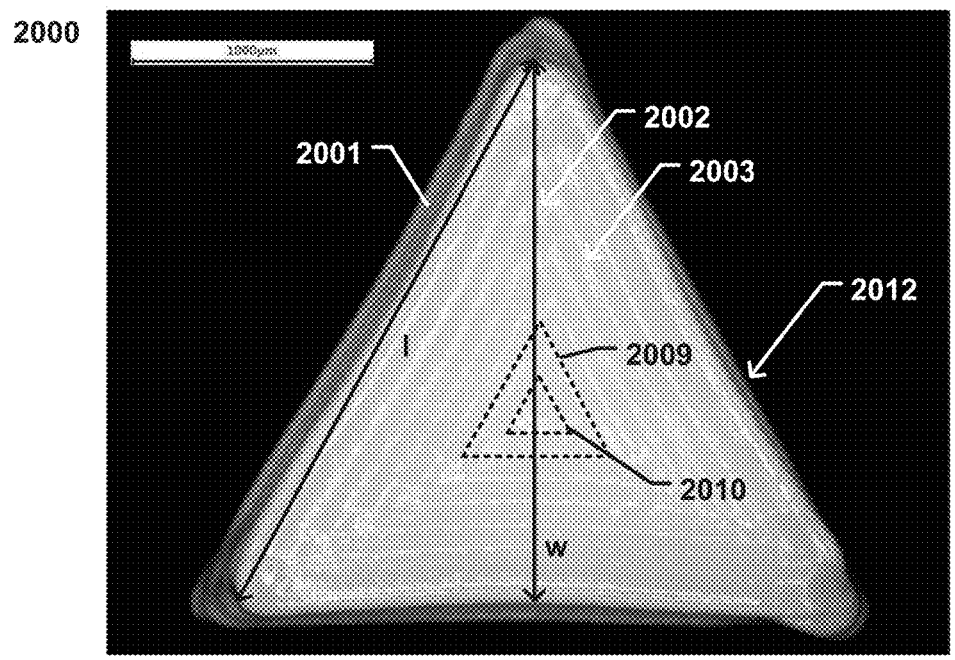
FIG. 21 includes a top view of a major surface of the shaped abrasive particle of FIG. 20.

In accordance with one aspect, the shaped abrasive particles of the embodiments herein can have bodies including various features facilitated by the additive manufacturing process. For example, in one embodiment the shaped abrasive particle may have a body having at least one major surface having a self-similar feature. FIG. 20 includes a perspective view illustration of a shaped abrasive particle according to an embodiment. As illustrated, the shaped abrasive particle 2000 can include a body 2001 having an upper major surface 2002, a lower major surface 2004, and side surfaces 2005, 2006, and 2007 extending between the major surfaces 2002 and 2004. FIG. 21 includes a top view of a major surface of the shaped abrasive particle 2000 of FIG. 20.

As illustrated, and in accordance with an embodiment, the major surface 2002 of the shaped abrasive particle 2000 can have a self-similar feature 2003. A self-similar feature 2003 can be an arrangement of features on a surface of the body of the shaped abrasive particle, such as a major surface of the body. The self-similar feature can include one or more features that can be arranged relative to each other, such as in a particular distribution, such as features arranged in a pattern relative to each other. The self-similar feature 2003 can include a plurality of shapes disposed on the major surface 2002 of the body 2001. In more particular instances, the self-similar feature 2003 can include a plurality of two-dimensional shapes nested within each other on the major surface 2002. For example, in the embodiment illustrated in FIGS. 20 and 21, the self-similar feature 2003 can include a plurality of two-dimensional triangular shapes patterned on the surface, and distributed relative to each other in a nested arrangement, including the plurality of triangles 2009 and 2010.

In another embodiment, the self-similar feature can include arrangement of two-dimensional shapes at the major surface of the body of the shaped abrasive particle wherein the arrangement of the two-dimensional shapes are substantially the same two-dimensional shape as the two-dimensional shape defined by a periphery of the major surface. For example, referring to the embodiments of FIGS. 20 and 21, the triangles 2009 and 2010 can have substantially the same two-dimensional shape as the two-dimensional shape of the periphery 2012 of the upper major surface 2002 of the shaped abrasive particle 2000. It will be appreciated that while the embodiments of FIGS. 20 and 21 illustrate a shaped abrasive particle having a generally triangular two-dimensional shape, other two-dimensional shapes may be formed using the additive manufacturing process. For example, the body of the shaped abrasive particle can include a two-dimensional shape from the group including a regular polygons, irregular regular polygons, irregular shapes, triangles, quadrilaterals, rectangles, trapezoid, pentagons, hexagons, heptagons, octagons, ellipses, Greek alphabet letters, Latin enough alphabet characters, Russian alphabet characters, Kanji characters, and a combination thereof.

Figure 22:
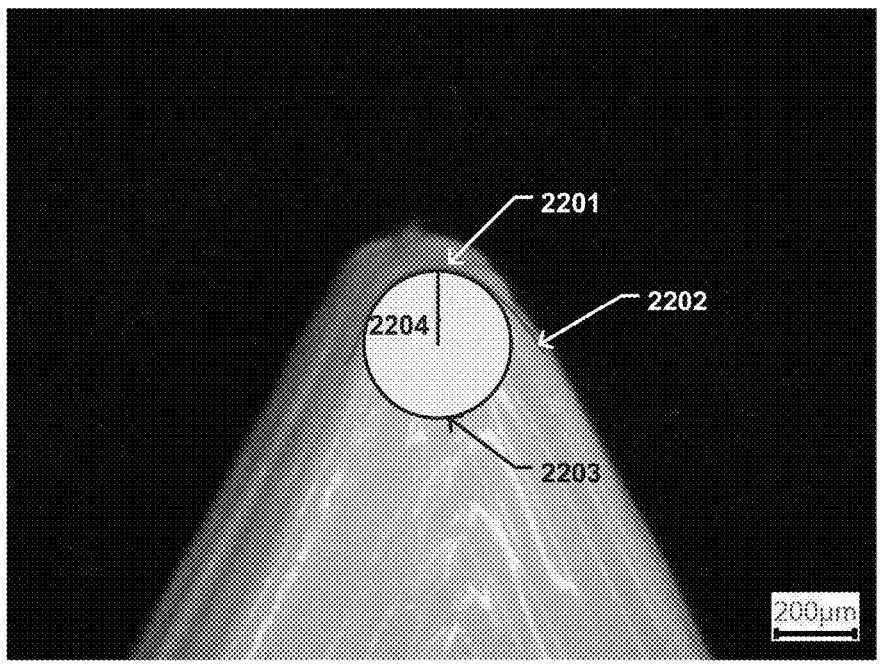
FIG. 22 includes a top view image of a portion of the shaped abrasive particle of FIG. 20.

Referring to FIG. 22, a top view image of a portion of the shaped abrasive particle of FIG. 20 is provided. The shaped abrasive particle 2000 can include a corner 2201 which when viewed top-down can define a particular radius of curvature. Notably, the corner 2201 can have an arcuate contour 2202 to which a best-fit circle 2203 may be fit. The best-fit circle 2203 may have a radius 2204 that can define the corner roundness of the corner 2201. The best fit circle may be fit and the radius evaluated using a suitable form of imaging and magnification, such as provided in FIG. 22. Suitable software, such as ImageJ may be used.

In one embodiment, the body of a shaped abrasive particle can have a particular corner roundness that may facilitate use in abrasive operations. For example, the shaped abrasive particle can have a body having a corner roundness of not greater than about 250 microns, such as not greater than about 220 microns, not greater than about 200 microns, not greater than about 180 microns, not greater than about 160 microns, not greater than about 140 microns, not greater than about 120 microns, not greater than about 100 microns, not greater than about 90 microns, not greater than about 80 microns, not greater than about 70 microns, not greater than about 60 microns, not greater than about 50 microns, not greater than about 40 microns, not greater than about 30 microns, or even not greater than about 20 microns. In one non-limiting embodiment, the body of the shaped abrasive particle can have a corner roundness of at least about 0.1 microns, such as at least about 0.5 microns. It will be appreciated that the body can have a corner roundness within a range including any of the minimum and maximum values noted above, including for example at least about 0.1 microns and not greater than about 250 microns, such as at least about 0.1 microns and not greater than about 100 microns, or even at least about 0.5 µm and not greater than about 80 microns.

Figure 23:
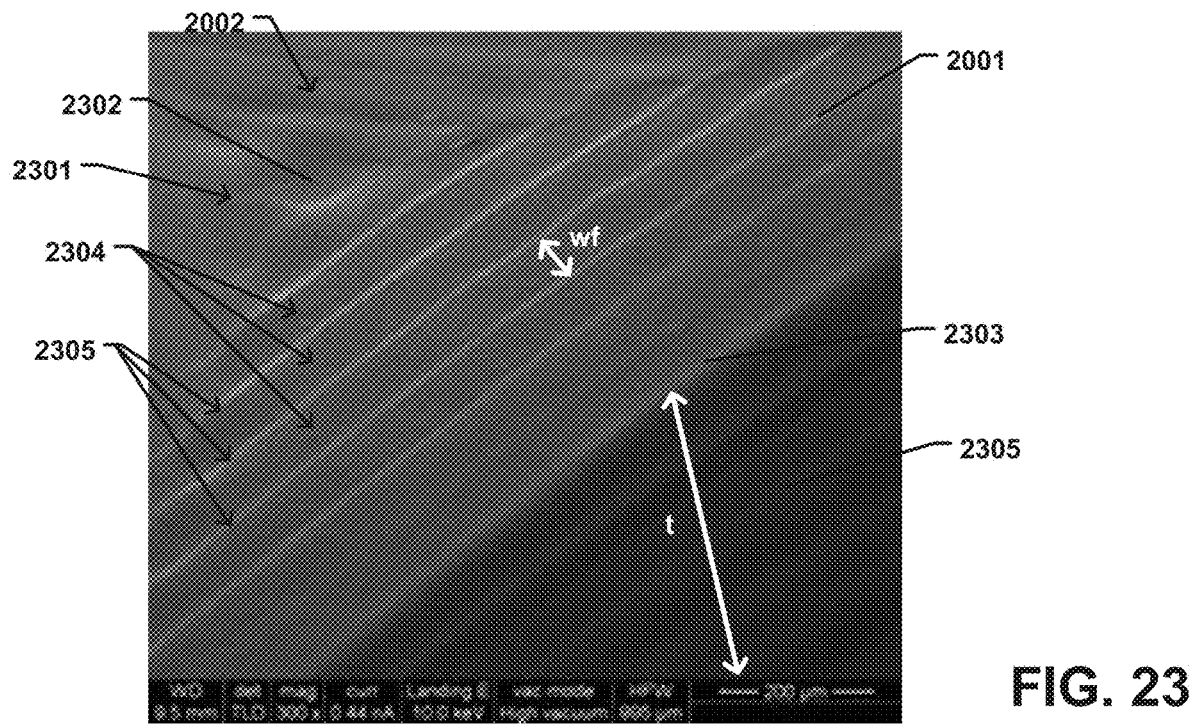
FIG. 23 includes a portion of a major surface of the shaped abrasive particle of FIG. 20.

In accordance with another embodiment, the shaped abrasive particle can have at least one major surface defining a concave, stepped surface. For example, referring to FIG. 23 a portion of a major surface of the shaped abrasive particle of FIG. 20 is provided. As provided, the major surface 2002 can have a concave, stepped surface, which may be defined by a plurality of step features 2301 extending along at least a portion of the length of the body 2001. In a particular embodiment, the concave, stepped surface can define a thickness at a midpoint 2302 that is less than a thickness (t) of the body at an edge. It will be appreciated that the thickness (t) can extend in a direction perpendicular to the major surface 2002 of the body 2001 along the side surface 2005. In accordance with a particular embodiment, the concave, stepped surface can include step features 2301 including a plurality of flats 2304 and risers 2305, were in the flats extend substantially parallel to the plane of the major surface 2002 and the risers 2305 extend substantially perpendicular to the plane of the major surface 2002. Moreover, the risers 2305 extend substantially perpendicular to the flats 2304.

In accordance with an embodiment, the step features 2301 of the concave, stepped surface, can include flats 2304 defining a particular average width relative to the length (l) of the body 2001. For example, the flats 2304 can have an average width (wf) that is not greater than about 0.8(l), wherein "l" defines the length or longest dimension of the body 2001 (see. FIG. 21) extending along one side of the major surface 2002. In another embodiment, the flats 2304 can have an average width (wt) that can be not greater than about 0.5(l), such as not greater than about 0.4(l), not greater than about 0.3(l), not greater than about 0.2(l), not greater than about 0.1(l), not greater than about 0.09(l), not greater than about 0.08(l). In still one non-limiting embodiment, the flats 2304 can have an average width (wf) that can be at least about 0.001(l), such as at least about 0.005(l), at least about 0.01(l). It will be appreciated that the flats 2304 can have an average width (wf) within a range between any of the minimum and maximum values noted above, including for example, within a range including at least about 0.001(l) and not greater than about 0.8(l), such as at least about 0.005(l) and not greater than about 0.4(l), or even at least about 0.01(l) and not greater than about 0.2(l).

In another embodiment, the risers 2305 can have an average height (hr) extending in a direction substantially perpendicular to the plane of the major surface 2002 that can be formed to have a particular relationship to the length (1) of the body 2001 of the shaped abrasive particle 2000. For example, the average height (hr) of the risers can be not great about 0.2(l), wherein "l" defines the length of the body 2001. In another embodiment, the risers 2305 can have an average height (hr) not greater than about 0.15(l), such as not greater than about 0.1(l), not greater than about 0.05(l), or even not greater than about 0.02(l). In at least one non-limiting embodiment, the risers 2305 can have an average height (hr) of at least about 0.0001(l), such as at least about 0.0005(l). It will be appreciated that the risers 2305 can have an average height (hr) that is within a range including any of the minimum and maximum values noted above, including for example, at least about 0.0001(l) and not greater than about 0.2(l), or at least about 0.0005(l) and not greater than about 0.1(l).

Still another embodiment, the step features 2301 including the flats 2304 and risers 2305 may be formed to have a certain relationship relative to each other that may facilitate improved performance of the shaped abrasive particle and associated abrasive article. For example, the flats 2304 may have a particular average width (wr) that is greater than the average height (hr) of the risers 2305. In more particular instances, the average height (hr) of the risers 2305 can be not greater than about 0.95(wf). According to another embodiment, the average height (hr) of the risers 2305 can be not greater than about 0.9(wf), such as not greater than about 0.8(wf), not greater than about 0.7(wf), not greater than about 0.5(wf), not greater than about 0.3(wf), not greater than about 0.2(wf), not greater than about 0.1(wf). In one non-limiting embodiment, the average height (hr) of the risers 2305 can be at least about 0.0001(wf), such as at least about 0.001(wf). It will be appreciated that the average height (hr) of the risers 2305 can be within a range including any of the minimum and maximum values noted above, including for example, at least about 0.0001(wf) and not greater than about 0.95(wf), or even at least about 0.001(wf) and not greater than about 0.2(wf).

Formation of the concave, stepped surface including step features 2301 can be facilitated by control of the filling pattern used to form the upper surface 2002 of the body 2001. It will be appreciated that in other instances, alternative filling patterns may be used to form alternative features in one or more major surfaces of the body 2001. For example, in one embodiment the upper surface for at least one major surface of the body 2001 can have a convex, stepped surface. A convex, stepped surface may have a thickness at a midpoint 2302 that is greater than a thickness of the body at an edge. As such, such a convex, stepped surface may include stepped features, wherein the thickness of the body decreases moving from the midpoint 2302 to the edge 2303. Such a feature may be facilitated by formation of the upper surface utilizing a particular filling pattern, including for example, an inside-out filling process, wherein the material at the midpoint 2302 is deposited before the material at the edge 2303.

Figure 24:
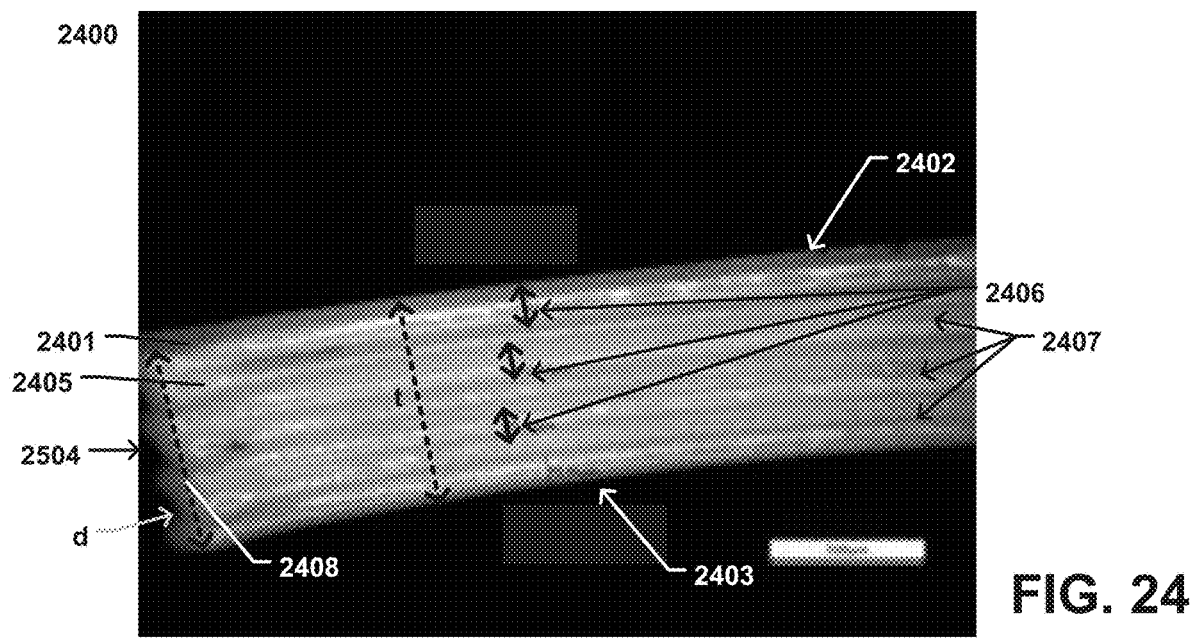
FIG. 24 includes a side view image of a portion of a shaped abrasive particle according to an embodiment.

In another embodiment, certain shaped abrasive particles formed according to the methods described herein can include a body that has at least one peripheral ridge extending around at least a portion of a side surface of the body. FIG. 24 includes a side view image of a portion of a shaped abrasive particle according to an embodiment. As provided, the shaped abrasive particle 2400 can include a body 2401 including a first major surface 2402, a second major surface 2403 opposite the first major surface 2402, and side surfaces 2404 and 2405 extending between the first major surface 2402 and second major surface 2403. As further illustrated, the side surfaces 2404 and 2405 can include at least one peripheral ridge 2407 extending around at least a portion of the side surfaces 2404 and 2405 of the body 2401. In certain instances, the one or more peripheral ridges 2407 can extend around the majority of the side surfaces 2404 and 2405 of the body 2401. For certain embodiments, the one or more peripheral ridges 2407 can extend around the entire peripheral length of the side surfaces 2404 and 2405 of the body 2401. As further illustrated, the at least one peripheral ridge 2407 can extend in a direction generally perpendicular to the thickness (t) of the body and substantially parallel to the planes defined by the first major surface 2402 and second major surface 2403.

Furthermore, in at least another embodiment at least one of the peripheral ridges 2407 can extend around the entire side surface of the body 2401 without intersecting one or more major surfaces, including for example, the first major surface 2402 and/or the second major surface 2403. As illustrated in FIG. 24, at least one of the peripheral ridges 2407 can extend along at least two side surfaces 2404 and 2405 and an adjoining edge 2408 extending between the side surfaces 2404 and 2405.

For certain shaped abrasive particles of the embodiments herein, the peripheral ridges 2407 can be separated by protrusions 2406. In particular, each pair of peripheral ridges 2407 can be separated by at least one protrusion of the group of protrusions 2406. Notably, the protrusions 2406 can each have a thickness that is less than the total thickness (t) of the body 2401.

In one embodiment, the at least one peripheral ridge 2407 can have a depth (dr) that extends from an upper surface into the body and having a particular relationship relative to the thickness (t) of the body 2401. For example, the at least one peripheral ridge 2407 can have a depth (dr) that is not greater than about 0.8(t), wherein "t" is a thickness of the body. Still, the at least one peripheral ridge 2407 can have a depth (dr) that is not greater than about 0.7(t), such as not greater than about 0.6(t), not greater than about 0.5(t), not greater than about 0.4(t), not greater than about 0.3(t), not greater than about 0.2(t), not greater than about 0.18(t), not greater than about 0.16(t), not greater than about 0.15(t), not greater than about 0.14(t), not greater than about 0.12(t), not greater than about 0.1(t), not greater than about 0.09(t), not greater than about 0.08(t), not greater than about 0.07(t), not greater than about 0.06(t), or even not greater than about 0.05(t). In one non-limiting embodiment, the at least one peripheral ridge 2407 can have a depth (dr) that is at least about 0.001(t), such as at least about 0.01(t). It will be appreciated that the depth (dr) of the at least one peripheral ridge 2407 can be within a range including any of the minimum and maximum values noted above, including for example a depth (dr) of at least about 0.001(t) and not greater than about 0.8(t), such as at least about 0.001(t) and not greater than about 0.5(t), or even at least about 0.001(t) and not greater than about 0.1(t). Furthermore, it will be appreciated that reference herein to the at least one peripheral ridge having a depth (dr) can also refer to an average depth of the plurality of peripheral ridges 2407. Moreover, the average depth of the plurality of peripheral ridges 2407 can have the same relationship relative to the average thickness (t) of the body 2401 as described above.

At least one embodiment, shaped abrasive particles of the embodiments herein can include at least one transverse ridge that can extend over at least two surfaces and an adjoining edge between the at least two surfaces. Referring again to FIG. 24, the at least one peripheral ridge 2407 can be in the form of a transverse ridge that extends over the first side surface 2404, second side surface 2405, and the adjoining edge 2408 between the first side surface 2404 and the second side surface 2405. In more particular instances, a transverse ridge can extend over at least three surfaces in at least two adjoining edges between the at least three surfaces. For example, in the instance of a shaped abrasive particle having a triangular two-dimensional shape as viewed top-down, a transverse ridge can extend around the side surfaces between the major surfaces such that the transverse ridge extends over all three sides surfaces and at least two of the adjoining edges between the at least three surfaces. It will be appreciated that the transverse ridges can extend around the entire periphery of the side surfaces of the body, which may include more than three side surfaces in the case of a body having other two-dimensional shapes as viewed top down (e.g., a rectangular two-dimensional shape with four side surfaces and four adjoining edges).

In another embodiment, the body of the shaped abrasive particle can include a plurality of transverse ridges 2407, wherein each of the transverse ridges of the plurality of transverse ridges 2407 extend parallel to each other around at least a portion of the periphery of the body 2401. In another embodiment, at least one of the transverse ridges of the plurality of transverse ridges can have a different length relative to each other. It will be appreciated that the length is a measure of the longest dimension of the transverse ridge. For example, in the embodiment of FIG. 24, the transverse ridges 2407 can have lengths extending perpendicular to the thickness "t" of the body 2401. However, it will be appreciated that some of the transverse ridges 2407 may have lengths that differ from others, such that at least one of the transverse ridges 2407 has a length that is greater than or less than a length of another transverse ridge. According to a particular embodiment, each of the transverse ridges 2407 of the plurality transverse ridges can have different lengths relative to each other.

Figure 25:
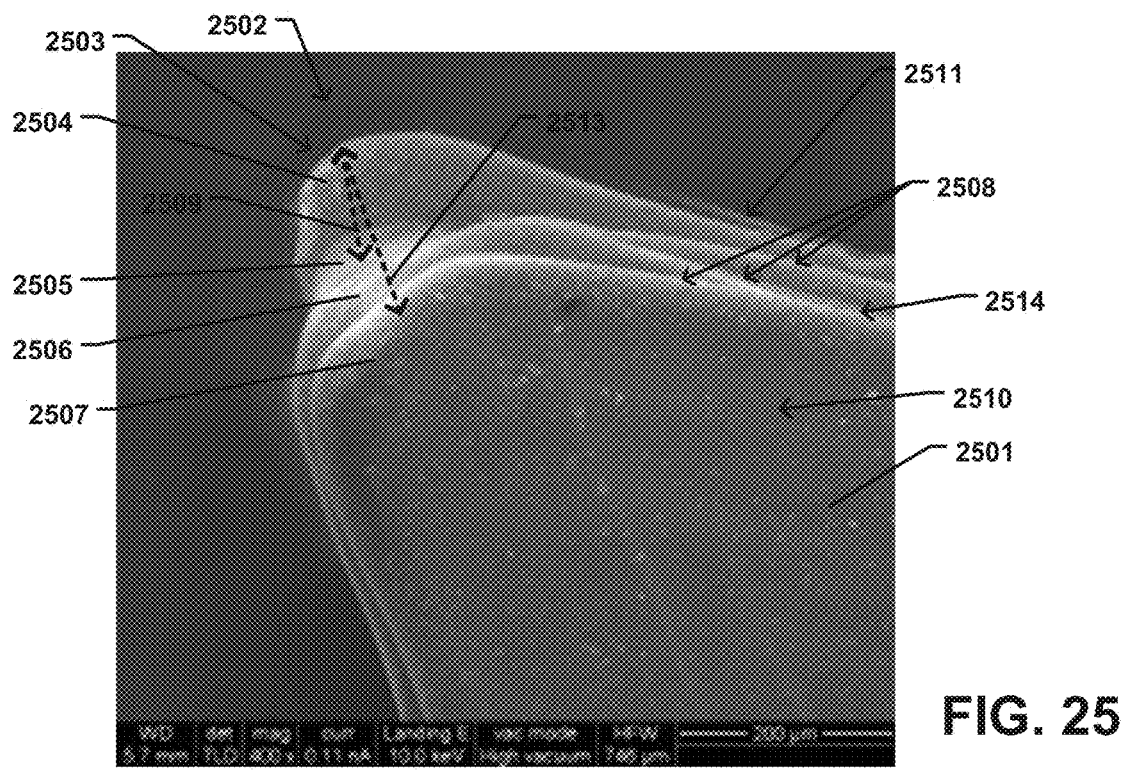
FIG. 25 includes an image of a portion of a corner of a shaped abrasive particle according to an embodiment herein.

In yet another aspect, the shaped abrasive particles of the embodiments herein may include a body having at least one corner that includes a plurality of micro-protrusions extending from the corner. The formation of a body having at least one corner with the micro-protrusions may facilitate improved abrasive performance FIG. 25 includes an image of a portion of a corner of a shaped abrasive particle according to an embodiment herein. The shaped abrasive particle 2500 can include a body 2501 having a corner 2502 that can include a plurality of micro-protrusions 2503 extending from the corner 2502. In accordance with an embodiment, the micro-protrusions 2503 can define a plurality of discrete corner protrusions 2504, 2505, 2506, and 2507 (2504-2507) separated by a plurality of ridges 2508. In accordance with one embodiment, the plurality of discrete corner protrusions 2504-24 507 can have different shapes relative to each other. For example, the discrete protrusion 2504 is extending further in a lateral direction from the corner 2502 relative to the discrete corner protrusion 2505.

Furthermore, the discrete corner protrusion 2504-2507 can have different corner contours relative to each other. For example, the discrete corner protrusion 2504 as viewed top-down can have a sharper corner roundness relative to the other discrete corner protrusion 2505, 2506 and 2507. In certain instances, each of the discrete corner protrusions 2504-2507 can have different corner roundness values relative to each other. In yet another embodiment, the micro-protrusions 2503 associate with the corner 2502 can define a plurality of discrete corner protrusion 2504 and 2507, which may have different contours relative to each other. In one particular embodiment, the corner 2502 can have a different corner roundness values at the upper surface 2510 defined by the discrete corner protrusion 2507 relative to the average corner roundness of the corner at the bottom surface 2511 defined by the discrete corner protrusion 2504.

In another embodiment, the particular feature of the micro-protrusions 2503 can include a plurality of discrete corner protrusions 2504-2507, wherein at least two of the discrete corner protrusions can define a step having a lateral shift relative to each other. For example, the discrete corner protrusion 2504 can extend further from the body 2501 relative to the discrete corner protrusion 2505 and define a lateral shift 2509 between the outermost peripheral edge of the discrete corner protrusion 2504 relative to the outermost peripheral edge of the discrete corner protrusion 2505.

In accordance with another embodiment, the corner 2502 including the micro-protrusions 2503 can define a serrated edge in accordance with one embodiment. The micro-protrusions 2503 can define a serrated contour along the edge 2513 extending between the first major surface 2510 and the second major surface 2511. More particularly, the formation of discrete corner protrusions 2504-1507 separated by ridges 2508 can give the edge 2513 a serrated contour that may facilitate improved abrasive capabilities.

In yet another aspect, the shaped abrasive particles of the embodiments herein can include a body having a scalloped topography defining a plurality of curved protrusions having ridges extending between the curve protrusions. In a one embodiment, FIG. 26 includes an image of a portion of a surface of a shaped abrasive particle having a scalloped topography. As illustrated, the body 2601 can include a portion including a scalloped topography 2602. The scalloped topography 2602 can include a plurality of curved protrusions 2603 having ridges 2604 extending between the curve protrusions 2603. In accordance with one embodiment, the scalloped topography 2602 can extend over a majority of an entire surface of the body 2601. In certain instances, the scalloped topography 2602 can extend over an entire surface of one surface (e.g., side surface or major surface) of the body of the shaped abrasive particle. In yet another design, the scalloped topography 2602 can extend over a majority of the entire side surface area of the body 2601 of the shaped abrasive particle. Still in at least one embodiment, the scalloped topography 2602 can extend over the entire surface area of the body 2601 of the shaped abrasive particle.

Figure 26:
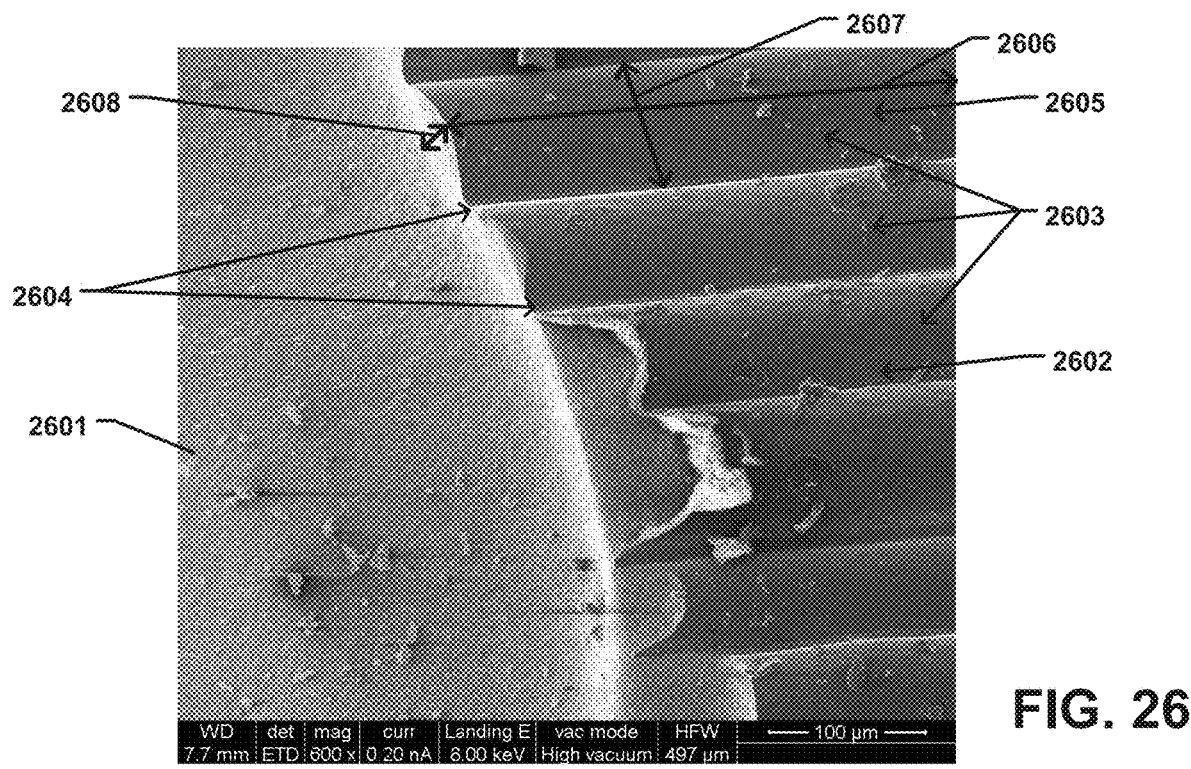
FIG. 26 includes an image of a portion of a surface of a shaped abrasive particle having a scalloped topography according to an embodiment.

The scalloped topography 2602 can include curve protrusions 2603 defining arcuate portions of the external surface of the body extending between ridges 2604. In one particular embodiment, the curve protrusions 2603 can be in the form of each elongated protrusions, wherein each protrusion has a length (l), width (w), and a height (h), wherein each protrusion can have an arcuate contour in the direction of the width and the height. For example, as illustrated in the embodiment of FIG. 26, the curve protrusions 2603 can be an elongated protrusion 2605 having a length 2606, a width of 2607, and a height 2608. As will be appreciated the length 2606 can define the longest dimension of the elongated protrusion 2605, the width 2607 can extend in a direction substantially perpendicular to the length 2606, and in particular, can extend for the distance between adjacent ridges on either side of the elongated protrusion 2605. The elongated protrusion 2605 can further include a height 2608 that can define the greatest distance the elongated protrusion 2605 extends in a direction perpendicular to the plane defined by the length 2606 and width 2607. The height 2608 may further be defined the distance between the highest point on the elongated protrusion 2605 and lowest point, which may be associated with a ridge adjacent either side of the elongated protrusion 2605.

In at least one embodiment, the elongated protrusion 2605 can have a length 2606 extending in substantially the same direction as the length of the body 2601 of the shaped abrasive particle. In accordance with one embodiment the length of at least one elongated protrusion 2605 can be at least about 0.8(l) where "l" is the length of the body 2601 of the shaped abrasive particle. In other instances, the length of the elongated protrusion 2605 can be at least 0.9(l), or even at least about 1(l), such that the length of the elongated protrusion 2605 is equivalent to the length of the body 2601. It will be appreciated that reference to the length of the elongated protrusion 2605 can include reference to an average length of a plurality of elongated protrusions, and the average length can have the same relationship relative to the length of the body as described above.

The elongated protrusions can be formed to have a particular relationship of width 2607 relative to the height 2608. For example, on one or more of the plurality of elongated protrusions, including for example, the elongated protrusion 2605 can have a height 2608 that is less than the width 2607. It will be appreciated that the body 2601 can include a plurality of elongated protrusion, which can define an average width and average height, and reference herein to a width or height can also include reference to an average width or average height for a plurality of elongated protrusions. The average height (hep) of the plurality of elongated protrusions 2603 can be not greater than about 0.9(wep), wherein "wep" represents the average width of the elongated protrusions, such as not greater than about 0.8(wep), not greater than about 0.7(wep), not greater than about 0.6(wep), not greater than about 0.5(wep), not greater than about 0.4(wep), not greater than about 0.3(wep), not greater than about 0.2(wep), or even not greater than about 0.1(wep). Still, in at least one embodiment, the plurality of elongated protrusions can have an average height (hep) that is at least about 0.001(wep), or even at least about 0.1(wep). It will be appreciated that the average height (hep) of the plurality of elongated protrusions can be within a range including any of the minimum and maximum values above, including for example, at least about 0.001(wep) and not greater than about 0.9(wep), or at least about 0.001(wep) and not greater than about 0.5(wep).

In accordance with one embodiment, the average height of the plurality of elongated protrusions 2603 can be not greater than about 500 microns, such as not greater than about 400 microns, not greater than about 300 microns, not greater than about 250 microns, not greater than about 200 microns, not greater than about 150 microns, not greater than about 100 microns, not greater than about 90 microns, not greater than about 30 microns, or even not greater than about 50 microns. Still, in one non-limiting embodiment, the average height of the plurality of elongated protrusions 2603 can be at least about 0.01 microns, at least about 0.1 microns, or even at least about 1 micron. It will be appreciated that the average height of the plurality of elongated protrusions 2603 can be within range including any of the minimum and maximum values noted above, including for example, at least about 0.1 microns and not great than about 200 microns, such as at least about 0.1 microns and not than about 100 microns.

In accordance with another embodiment, the plurality of elongated protrusions 2603 can have an average width that is less than the average length of the body. In certain instances, the plurality of elongated protrusions may have a particular relationship to the average width relative to the length of the body 2601 of the shaped abrasive particle. For example, the average width of the plurality of elongated protrusions can be not greater than about 0.9(l), such as not greater than about 0.8(l), not greater than about 0.7(l), not greater than about 0.6(l), not greater than about 0.5(l), not greater than about 0.4(l), not greater than about 0.3(l), not greater than about 0.2(l), or even not greater than about 0.1(l). Still, in at least one non-limiting embodiment, the average width of the plurality of elongate protrusions can be at least 0.001(l), or at least the 0.01(l). It will be appreciated that the average width can be within range including any of the minimum and maximum values noted above, including for example, at least about 0.001(l) and not greater than about 0.9(l), such as at least about 0.01(l) and not great than about 0.5(l).

In certain instances, the plurality of elongated protrusions can have an average width that is not greater than about 500 microns, such not greater than about 400 microns, not greater than about 300 microns, not greater than about 250 microns, or even not greater than about 200 microns. Still, in at least one non-limiting embodiment, the average width of the plurality of elongate protrusions can be at least about 0.01 microns, at least about 0.1 microns, or even at least about 1 micron. It will be appreciated that the plurality of elongated protrusions can have an average width within a range including any of the minimum and maximum values noted above, including for example, at least about 0.01 microns and not greater than about 500 microns, such as at least about 0.01 microns and not greater than about 300 microns.

As further illustrated in FIG. 26, the scalloped topography 2602 may facilitate formation of sides and edges of the shaped abrasive particle having a non-linear feature which may beneficially affect the abrasive properties of the shaped abrasive particles. For example, the scalloped topography may facilitate improved fracture mechanics of the shaped abrasive particle. In at least one particular embodiment, scalloped topography 2602 can intersect an edge defining at least one corner of the body. For example, referring again to FIG. 25, the side surface 2514 between the major surfaces 2510 and 2511 can have a scalloped topography that intersects the corner 2502 and defines a serrated contour along the length of the edge 2513. Formation of a serrated edge 2513 may facilitate improved abrasive capabilities of the shaped abrasive particle.

In accordance with an embodiment, the body of the shaped abrasive particle can include at least four major surfaces joined together at common edges. In certain instances, the four major surfaces can have substantially the same surface area relative to each other. More specifically, the body may include a tetrahedral shape.

Figure 27:
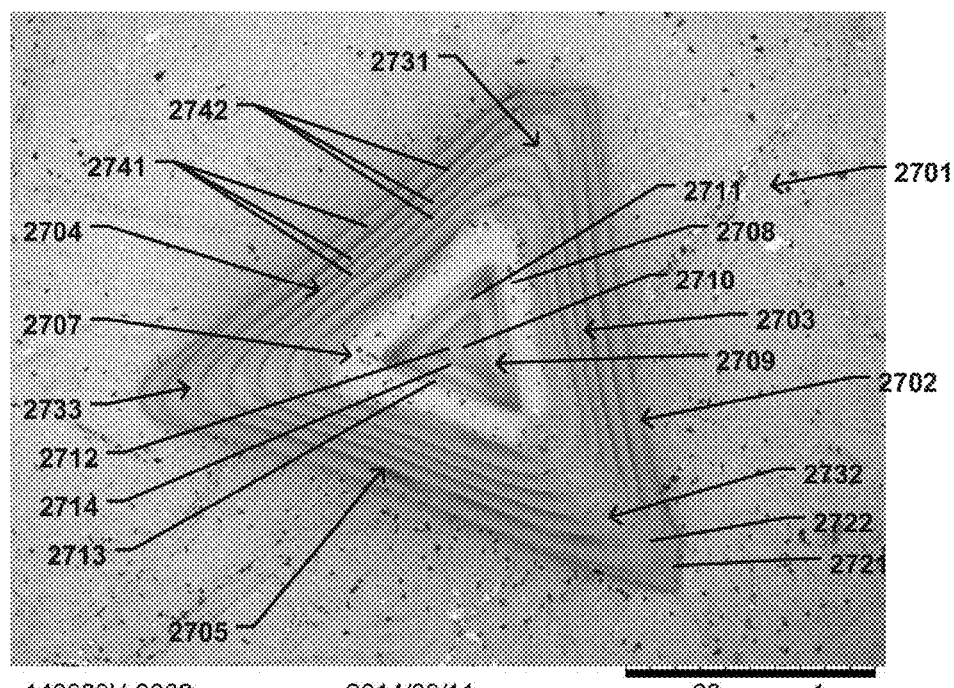
FIG. 27 includes a top-down image of a shaped abrasive particle according to an embodiment.

FIG. 27 includes a top-down image of a shaped abrasive particle according to the embodiment. FIG. 27 includes a shaped abrasive particle including a bottom surface 2702, three major side surfaces 2703, 2704, and 2705 joined to the bottom surface 2702 along common edges defined by the peripheral surface of the bottom surface 2702. As further provided in FIG. 27, the body 2701 of the shaped abrasive particle includes an upper surface 2706. The upper surface 2706 can include a peripheral surface 2708 having a generally planar contour. Accordingly, the body 2701 can represent a truncated tetrahedral shaped abrasive particle, and more specifically, a volcano shape shaped abrasive particle.

The body 2701 can include an opening 2709, which may be in the form of a blind opening or depression extending into the body at the upper surface 2706. In one particular embodiment, the upper surface 2706 can have a concave, stepped surface defined by the peripheral surface 2708 and a first stepped surface 2711 having a substantially planar region (e.g., a flat) in the form of a triangular area. The first stepped surface 2711 can define a step disposed in the opening 2709. The first stepped surface 2711 can be recessed into the opening 2709 below the peripheral surface 2708. The concave, stepped surface can also include a second stepped surface 2712 having a substantially planar region, which may be in the form of a triangular area, and recessed into the opening 2709 below the planar peripheral surface 2708 and the first stepped surface 2711. The concave, stepped surface can also include a riser 2713 between the first stepped surface 2711 and the peripheral surface 2708. The concave, stepped surface may also include a riser 2714 between the second stepped surface 2712 and the first stepped surface 2713. In particular embodiments having an opening 2709 in the upper surface 2706, the shaped abrasive particle may define a volcano shape shaped abrasive particle, wherein the midpoint 2710 of the opening 2709 is recessed into the body away from the planar peripheral surface 2708.

As also provided in FIG. 27, the body 2701 can be formed of a plurality of portions, including for example, portion 2721 defining the peripheral surface of the bottom surface 2702 and portion 2722 overlying the first portion 2721. The body can further include a plurality of overlying portions above the portions 2721 and 2722. As illustrated, the portions 2721 and 2722 can be in the form of triangular layers as viewed top-down in FIG. 27. Moreover, as illustrated, the layers can facilitate the formation of edges 2731, 2732, and 2733 between the major surface 2703, 2704, and 2705 and extending from the upper surface 2707 to the bottom surface 2702 having micro-protrusions. The micro-protrusions can define a serrated contour along the edges 2731, 2732, and 2733.

Moreover, the major surfaces 2703, 2704, and 2705 can have a plurality of elongated protrusions 2741 extending around the periphery of the surfaces. The body 2701 can also include a plurality transverse ridges 2742 extending around the major surfaces 2703, 2704, and 2705 and adjoining edges 2731, 2732, and 2733. Looking top-down as provided in FIG. 27, the major surfaces 2703, 2704, and 2705 can also have a scalloped topography defining a plurality of arcuate protrusions 241 separated by the plurality of transverse ridges 2742.

Figure 28:
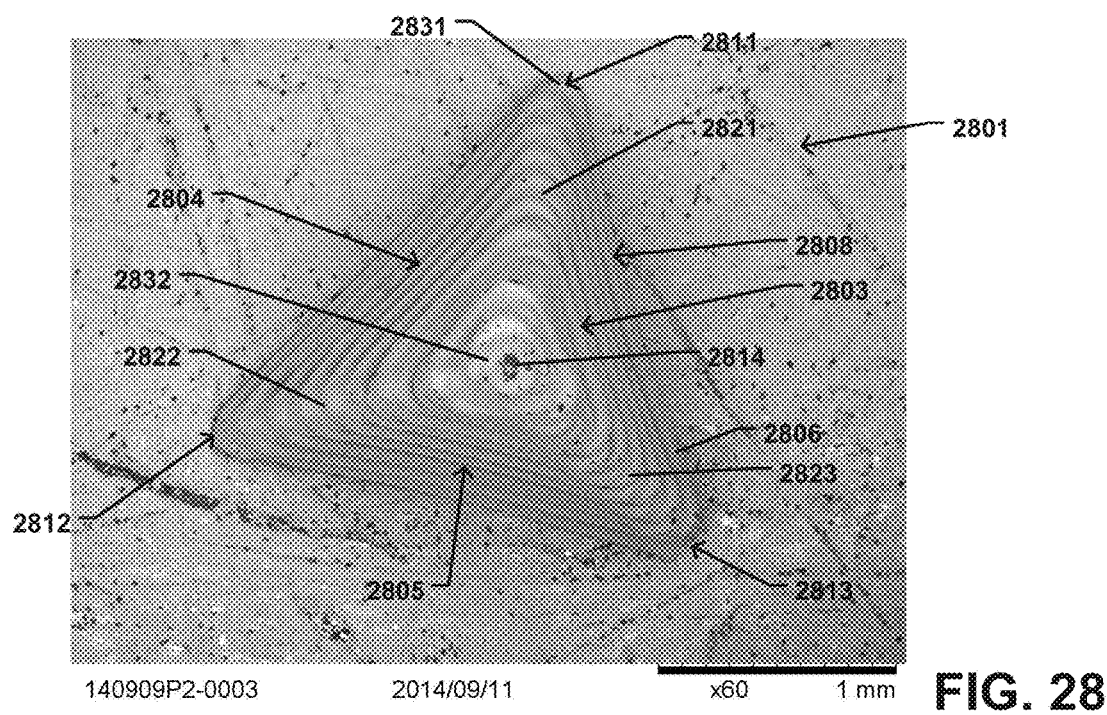
FIG. 28 includes a top-down view of a shaped abrasive particle according to an embodiment.
Figure 29:
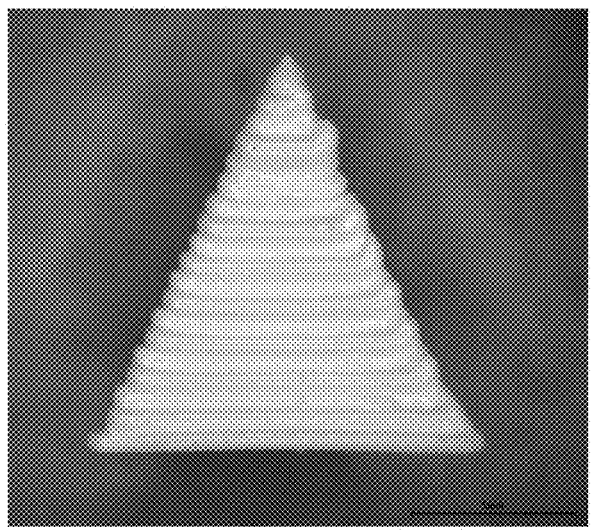
FIG. 29 includes a side-view image of the shaped abrasive particle of FIG. 28.

FIG. 28 includes a top-down view of a shaped abrasive particle according to an embodiment. As provided, the body 2801 of the shaped abrasive particle can include a bottom surface 2802 and major side surfaces 2803 2804, and 2805 joined to the bottom surface 2802 at the peripheral surface 2806 of the bottom surface 2802. The body 2801 can further include corners 2811, 2812, 2813, and 2814 joined by the edges 2821, 2822, and 2823 such that the body forms a tetrahedral shape. Unlike the shaped abrasive particle of FIG. 27, the body 2801 of the shaped abrasive particle of FIG. 28 is not a truncated pyramid, but includes the four corners 2811, 2812, 2813, and 2814. Notably, the corners 2811, 2812, and 2813 can be defined by a first portion 2831 of the body and the corner 2814 can be defined by a second portion 2832 formed at a second time and distinct from the portion 2831. In at least one embodiment, the corners 2811, 2812, and 2813 can have substantially the same corner roundness value and the corner 2814 can have a corner roundness value that is different than the corner roundness values of the corners 2811, 2812, and 2813. In at least one embodiment, the corner 2814 can have a corner roundness value that is greater than the corner roundness values of the corners 2811, 2812, and 2813. In still another embodiment, the corner 2814 can have a corner roundness value that is less than the corner roundness values of the corners 2811, 2812, and 2813. FIG. 29 includes a side-view image of the shaped abrasive particle of FIG. 28. It will be appreciated that the shaped abrasive body particles of the embodiments herein can include bodies having various three-dimensional shapes as described herein, and are not to be interpreted as limited to those embodiments illustrated or depicted.

Figure 30:
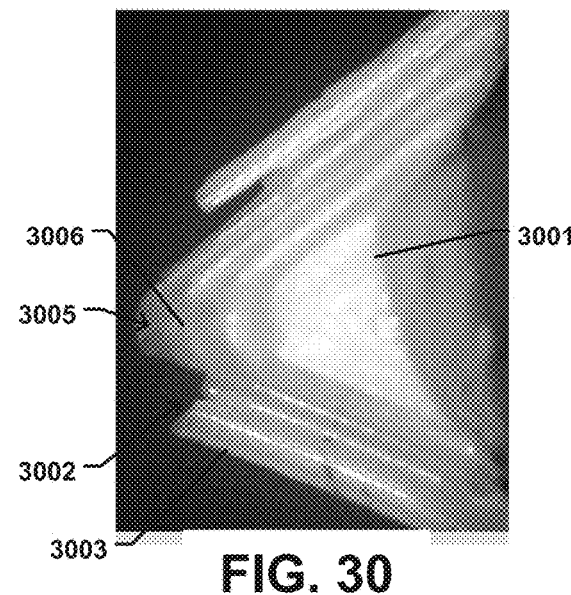
FIG. 30 includes an image of a corner of a shaped abrasive particle according to an embodiment.

Without wishing to be tied to a particular theory, it is thought that one or more features of the embodiments herein can facilitate formation of shaped abrasive particles having improved abrasive properties. In certain instances, it has been noted that the shaped abrasive particles can have unique fracturing behavior, wherein during abrasive operations regions of the portions making up the body of the shaped abrasive particle may be selectively removed, which may expose sharper portions, thus exhibiting a self-sharpening behavior. FIG. 30 includes an image of a corner of a shaped abrasive particle according to an embodiment. As provided, certain region 3002 of a portion 3003 of the body 3001 of the shaped abrasive particle have been removed during an abrasive operation to expose an unused region 3005 of another portion 3006 of the body 3001, which has a sharp corner and may facilitate continued abrasive operations.

Items

Item 1. A method of forming a shaped abrasive particle having a body formed by an additive manufacturing process.

Item 2. A method comprising forming a body of a shaped abrasive particle according to a digital model.

Item 3. The method of any one of items 1 and 2, wherein the additive manufacturing process includes forming a body of a shaped abrasive particle by shaping a raw material without use of a production tool.

Item 4. The method of any one of items 1 and 2, wherein the additive manufacturing process includes forming a body of a shaped abrasive particle by depositing a plurality of discrete portions in a controlled, non-random manner relative to each other.

Item 5. The method of item 4, wherein depositing a plurality of portions of the body in a controlled, non-random manner relative to each other includes deposition of the plurality of portions into a production tool.

Item 6. The method of any one of items 1 and 2, wherein the method comprises at least one process selected from the group consisting of layer additive method, light photopolymerization, laser powder forming, powder bed fusion, selective laser sintering, micro-laser sintering, material extrusion robocasting, material jetting, sheet lamination, and a combination thereof.

Item 7. The method of item 6, wherein light photopolymerization includes stereolithography, wherein stereolithography includes depositing at least one layer of a slurry containing a polymer material that is polymerized during the forming process to form a shaped abrasive particle.

Item 8. The method of item 6, wherein laser powder forming includes depositing a raw material on a target and impinging radiation from a laser source on the target to melt the raw material and form the raw material into a shaped abrasive particle.

Item 9. The method of item 8, wherein the shaped abrasive particle comprises a material selected from the group consisting of a metal, metal alloy, glass, ceramic, polymer, and a combination thereof.

Item 10. The method of item 9, wherein the shaped abrasive particle consists essentially of a glass material comprising an oxide.

Item 11. The method of item 6, wherein selective laser sintering includes impinging radiation from a laser source on a target including a raw material and changing at least a portion of one of the phases of the raw material into a shaped abrasive particle.

Item 12. The method of item 11, wherein selective laser sintering includes impinging radiation from a laser source on a select portion of a bed of raw material and converting a portion of the bed of raw material into a shaped abrasive particle.

Item 13. The method of item 11, wherein changing at least a portion of one of the phases of the raw material includes a change in crystalline structure of the raw material.

Item 14. The method of item 11, wherein changing at least a portion of one of the phases of the raw material includes a change from a solid phase to a liquid phase of the raw material.

Item 15. The method of item 11, wherein changing at least a portion of one of the phases of the raw material includes sintering of the raw material.

Item 16. The method of item 11, wherein the shaped abrasive particle comprises a material selected from the group consisting of a metal, metal alloy, glass, ceramic, polymer and a combination thereof.

Item 17. The method of item 6, wherein material jetting includes deposition of discrete droplets of raw material on a target and coalescence of the discrete droplets into a body to form a shaped abrasive particle.

Item 18. The method of item 6, wherein material jetting includes depositing a plurality of discrete droplets into production tool in a controlled, non-random arrangement to form a shaped abrasive particle.

Item 19. The method of any one of items 1 and 2, wherein forming the body comprises controlling at least one process parameter selected from the group consisting of: a nozzle tip length; a nozzle width; a nozzle aspect ratio; a deposition pressure; a relationship between nozzle width and deposition pressure; a deposition rate; a deposition volume, a relationship between deposition rate and deposition position; a relationship between deposition pressure and deposition position; a shutoff distance; a premove delay; a dispense gap; a filling pattern of the print material; a dynamic yield stress ($\sigma d$) of a print material; a static yield stress ($\sigma s$) of a print material; a yield stress ratio (ad/as) of a print material; a viscosity of the print material; and a combination thereof.

Item 20. The method of item 19, further comprising: depositing a first print material as a first portion of the body at a first time; and depositing a second print material as a second portion of the body distinct from the first portion at a second time.

Item 21. The method of item 20, wherein the first print material has a first composition and the second print material comprises a second composition.

Item 22. The method of item 21, wherein the first composition and the second composition are significantly different compared to each other.

Item 23. The method of item 21, wherein the second composition has a difference in porosity relative to the first composition.

Item 24. The method of item 21, wherein the first print material and second print material are deposited at different regions within the body and configured to affect the fracturing behavior of the shaped abrasive particle.

Item 25. The method of item 21, wherein the first print material and second print material are deposited in alternative layers within a region of the body forming a composite material configured to control a self-sharpening behavior of the body.

Item 26. The method of item 21, wherein the first print material and second print material are deposited in different regions of the body forming a composite material including a controlled arrangement of the regions relative to an intended orientation of the shaped abrasive particle in a fixed abrasive article.

Item 27. The method of item 20, wherein depositing the first print material comprises forming a first layer of the body at a first time and depositing the second print material comprises forming a second layer of the body overlying the first layer.

Item 28. The method of item 20, wherein the first portion can have a first characteristic selected from the group consisting of hardness, porosity, composition, and a combination thereof, and the second portion can have a second characteristic selected from the group consisting of hardness, porosity, composition, and a combination thereof, and wherein the first characteristic can be different from the second characteristic.

Item 29. The method of item 28, wherein the first portion can have a first porosity that is greater than a second porosity of the second portion, and wherein the first portion and the second portion are deposited in an arrangement relative to each other within the body forming a composite material configured to affect the fracturing behavior of the shaped abrasive particle.

Item 30. The method of item 28, wherein the first portion can have a first hardness that is greater than a second hardness of the second portion, and wherein the first portion and the second portion are deposited in an arrangement relative to each other within the body forming a composite material configured to affect the fracturing behavior of the shaped abrasive particle.

Item 31. The method of item 20, wherein the first portion can have a first volume that is greater than a second volume of the second portion.

Item 32. The method of item 31, wherein the first portion can define a central region of the body and the second portion can define an edge of the body.

Item 33. The method of item 31, wherein the first portion can define a central region of the body and the second portion can define a corner of the body.

Item 34. The method of item 19, wherein the method of forming the body further comprises depositing a print material from a nozzle onto a substrate, wherein the movement of the nozzle is controlled by a computer program.

Item 35. The method of item 34, wherein the nozzle comprises a nozzle width not greater than about 200 microns or not greater than about 100 microns or not greater than about 90 microns or not greater than about 85 microns or not greater than about 80 microns or not greater than about 75 microns or not greater than about 70 microns or not greater than about 65 microns or not greater than about 60 microns or not greater than about 55 microns or not greater than about 50 microns or not greater than about 45 microns or not greater than about 40 microns or not greater than about 35 microns or not greater than about 30 microns or not greater than about 25 microns or not greater than about 20 microns.

Item 36. The method of item 34, wherein the nozzle comprises a width of at least about 0.1 microns or at least about 1 micron or at least about 10 microns.

Item 37. The method of item 19, wherein the nozzle comprises a tip length of not greater than about 10 mm or not greater than about 8 mm or not greater than about 6 mm or not greater than about 5 mm or not greater than about 4 mm.

Item 38. The method of item 19, wherein the nozzle comprises a tip length of at least about 0.1 mm or at least about 0.2 mm or at least about 0.5 mm or at least about 1 mm.

Item 39. The method of item 19, wherein the nozzle comprises an aspect ratio value (width/tip length) of not greater than about 0.8 or not greater than about 0.6 or not greater than about 0.5 or not greater than about 0.4.

Item 40. The method of item 19, wherein the nozzle comprises an aspect ratio value (width/tip length) of at least about 0.001 or at least about 0.005 or at least about 0.008.

Item 41. The method of item 19, wherein the deposition pressure is not greater than about 5 MPa or not greater than about 4.5 MPa or not greater than about 4 MPa or not greater than about 3.5 MPa or not greater than about 3 MPa or not greater than about 2.5 MPa or not greater than about 2 MPa or not greater than about 1.8 MPa or not greater than about 1.5 MPa or not greater than about 1.3 MPa or not greater than about 1 MPa or not greater than about 0.9 MPa or not greater than about 0.8 MPa or not greater than about 0.7 MPa.

Item 42. The method of item 19, wherein the deposition pressure is at least about 0.005 MPa or at least about 0.01 MPa or at least about 0.05 MPa or at least about 0.08 MPa or at least about 0.1 MPa.

Item 43. The method of item 19, wherein the relationship between nozzle width and deposition pressure (width/pressure) defines a first forming factor having a value of at least about 0.2 microns/MPa or at least about 1 micron/MPa or at least about 2 microns/MPa or at least about 4 microns/MPa or at least about 6 microns/MPa or at least about 8 microns/

MPa or at least about 10 microns/MPa or at least about 12 microns/MPa or at least about 14 microns/MPa or at least about 16 microns/MPa.

Item 44. The method of item 19, wherein the relationship between nozzle width and deposition pressure (width/pressure) defines a first forming factor having a value of not greater than about $1 \times 10^5$ microns/MPa or not greater than about $1 \times 10^4$ microns/MPa or not greater than about 8000 microns/MPa or not greater than about 6000 microns/MPa or not greater than about 5000 microns/MPa or not greater than about 4000 microns/MPa or not greater than about 3000 microns/MPa or not greater than about 2000 microns/MPa or not greater than about 1000 microns/MPa or not greater than about 500 microns/MPa or not greater than about 200 microns/MPa or not greater than about 100 microns/MPa.

Item 45. The method of item 19, wherein forming comprises moving the nozzle at a deposition rate of at least about 0.01 mm/s or at least about 0.05 mm/s or, at least about 0.08 mm/s or at least about 0.1 mm/s or at least about 0.3 mm/s or at least about 0.5 mm/s or at least about 0.8 mm/s or at least about 1 mm/s or at least about 1.5 mm/s or at least about 2 mm/s or at least about 2.5 mm/s or at least about 3 mm/s.

Item 46. The method of item 19, wherein forming comprises moving the nozzle at a deposition rate of not greater than about 50 mm/s or not greater than about 30 mm/s or not greater than about 20 mm/s.

Item 47. The method of item 19, wherein forming comprises controlling a deposition volume of a print material to define a portion of the body.

Item 48. The method of item 47, wherein controlling the deposition volume comprises changing the depostion volume of the print material depending upon the portion of the body being formed.

Item 49. The method of item 47, wherein forming comprises depositing a smaller volume of material at a region defining a corner of the body as compared to a region defining a major surface of the body.

Item 50. The method of item 47, wherein controlling the deposition volume includes controlling a deposition pressure and deposition rate of the nozzle.

Item 51. The method of item 50, wherein controlling the deposition volume includes controlling a width, length, and height of a first portion of the body formed at a first time.

Item 52. The method of item 19, wherein forming comprises controlling the relationship between deposition rate and deposition position.

Item 53. The method of item 52, wherein controlling the relationship between deposition rate and depostion positing includes changing the deposition rate depending upon the deposition position.

Item 54. The method of item 52, wherein controlling the relationship between deposition rate and depostion position includes decreasing the depostion rate at a deposition position associated with a corner of the body of the shaped abrasive particle relative to a deposition rate associated with a deposition position at a major surface of the body.

Item 55. The method of item 52, wherein controlling the relationship between deposition rate and depostion position includes varying the deposition rate to change the size of features in the body depending on the deposition position.

Item 56. The method of item 19, wherein forming comprises controlling the relationship between the deposition pressure and the deposition position.

Item 57. The method of item 56, wherein controlling the relationship between the deposition pressure and the deposition position includes changing the deposition pressure depending upon the deposition position.

Item 58. The method of item 56, wherein controlling the relationship between the deposition pressure and the deposition position includes decreasing the depostion pressure at a deposition position associated with a corner of the body of the shaped abrasive particle relative to a deposition pressure associated with a deposition position at a major surface of the body.

Item 59. The method of item 56, wherein controlling the relationship between the deposition pressure and the deposition position includes varying the deposition pressure to change the size of features in the body depending on the deposition position.

Item 60. The method of item 19, wherein forming a body further comprises controlling a premove delay between a beginning of deposition of the print material and movement of a nozzle for depositing the print material.

Item 61. The method of item 60, wherein the premove delay is greater than 0 seconds.

Item 62. The method of item 60, wherein the premove delay is not greater than about 10 seconds.

Item 63. The method of item 19, wherein forming a body further comprises controlling a shutoff distance defining the distance a nozzle moves after turning the pressure off to the print material.

Item 64. The method of item 19, wherein the shutoff distance is less than a dispense gap.

Item 65. The method of item 19, wherein the shutoff distance is greater than a dispense gap.

Item 66. The method of item 19, wherein the shutoff distance is substantially equal to a dispense gap.

Item 67. The method of item 19, wherein forming comprises controlling a dispense gap defining a distance between the nozzle and target.

Item 68. The method of item 67, wherein the dispense gap is not greater than about 10W, wherein "W" represents the width of the nozzle, wherein the dispense gap is not greater than about 9W or not greater than about 8W or not greater than about 7W or not greater than about 6W or not greater than about 5W or not greater than about 4W or not greater than about 3W or not greater than about 2W or not greater than 1W.

Item 69. The method of item 67, wherein the dispense gap is at least about 0.001W, wherein "W" represents the width of the nozzle, wherein the dispense gap is at least about 0.005W or at least about 0.01W or at least about 0.1W.

Item 70. The method of item 67, wherein the dispense gap is not greater about 10t, wherein "t" represents the thickness of the print material, wherein the dispense gap is not greater than about 9t or not greater than about 8t or not greater than about 7t or not greater than about 6t or not greater than about 5t or not greater than about 4t or not greater than about 3t or not greater than about 2t or not greater than about 1t.

Item 71. The method of item 67, wherein the dispense gap is at least about 0.001t, wherein "t" represents the thickness of the print material, wherein the dispense gap is at least about 0.005t or at least about 0.01t.

Item 72. The method of item 67, wherein controlling the dispense gap includes varying the dispense gap such that the print material contacts the target immediately upon exiting the nozzle.

Item 73. The method of item 67, wherein controlling the dispense gap includes controlling the height of the nozzle above the target such that the print material contacts the target upon exiting the nozzle without forming a free droplet in the space between the nozzle and target.

Item 74. The method of item 67, wherein controlling the dispense gap includes varying the Z-directional distance between the nozzle and the target based upon at least one of the nozzle tip length, the nozzle width, the deposition pressure, the deposition rate, the deposition volume, the deposition position, the filling pattern of the print material, the dynamic yield stress ($\sigma d$) of the print material, the static yield stress ($\sigma s$) of the print material, the yield stress ratio (ad/as) of the print material, the viscosity of the print material, and a combination thereof.

Item 75. The method of item 67, wherein controlling the dispense gap includes varying the dispense gap based on the deposition position.

Item 76. The method of item 67, wherein controlling the dispense gap includes varying the dispense gap to alter the volume of material deposited at a deposition position.

Item 77. The method of item 19, wherein forming further comprises controlling the filling pattern that defines the order of forming a first portion of the body at a first time and a second portion of the body at a second time.

Item 78. The method of item 77, wherein the filling pattern defines an deposition process selected from the group consisting of an outside-in filling process, an inside-out filling process, a side-to-side filling process, bottom-up filling process, and a combination thereof.

Item 79. The method of item 77, wherein controlling the filling pattern includes forming a first portion of the body at a first time using a first filling pattern and a second portion of the body at a second time using a second filling pattern, wherein the first filling pattern is different from the second filling pattern.

Item 80. The method of item 77, wherein the filling pattern includes forming a first layer by an outside-in filling process and a second layer overlying the first layer by an inside-out filling process.

Item 81. The method of item 19, wherein the print material can include a mixture comprising an inorganic material in a content of at least about 25 wt % for a total weight of the mixture or at least about 35 wt % or at least about 36 wt % or and not greater than about 75 wt % or not greater than about 70 wt % or not greater than about 65 wt % or not greater than about 55 wt % or not greater than about 45 wt % or not greater than about 44 wt %.

Item 82. The method of item 81, wherein the mixture comprises a sol-gel.

Item 83. The method of item 81, wherein the inorganic material comprises a ceramic.

Item 84. The method of item 81, wherein the inorganic material comprises a material selected from the group consisting of oxides, carbides, nitrides, borides, oxycarbides, oxynitrides, oxyborides, carbon-based materials, and a combination thereof.

Item 85. The method of item 81, wherein the inorganic material comprises alumina.

Item 86. The method of item 81, wherein the inorganic material comprises boehmite.

Item 87. The method of item 81, wherein the mixture comprises nitric acid.

Item 88. The method of item 81, wherein the mixture comprises water.

Item 89. The method of item 81, wherein the mixture comprises a dynamic yield stress ($\sigma d$) of at least about 100 Pa or at least about 120 Pa or at least about 140 Pa or at least about 160 Pa or at least about 180 Pa or at least about 200 Pa.

Item 90. The method of item 81, wherein the mixture comprises a dynamic yield stress ($\sigma d$) of not greater than about 1500 Pa or not greater than about 1300 Pa or not greater than about 1200 Pa or not greater than about 1100 Pa or not greater than about 1000 Pa.

Item 91. The method of item 81, wherein forming comprises controlling at least one of the dispense gap, the nozzle tip length, the nozzle width, the deposition pressure, the deposition rate, the deposition volume, the deposition position, and the filling pattern of the print material based on the dynamic yield stress ($\sigma d$) of the print material.

Item 92. The method of item 81, wherein the mixture comprises a static yield stress ($\sigma s$) of at least about 180 Pa or at least about 200 Pa or at least about 250 Pa or at least about 300 Pa or at least about 350 Pa or at least about 400 Pa or at least about 450 Pa or at least about 500 Pa or at least about 550 Pa or at least about 600 Pa.

Item 93. The method of item 81, wherein the mixture comprises a static yield stress ($\sigma s$) of not greater than about 20000 Pa or not greater than about 18000 Pa or not greater than about 15000 Pa or not greater than about 5000 Pa or not greater than about 1000 Pa.

Item 94. The method of item 81, wherein the mixture comprises a static yield stress ($\sigma s$) different than the dynamic yield stress ($\sigma d$).

Item 95. The method of item 81, wherein the mixture comprises a static yield stress ($\sigma s$) greater than the dynamic yield stress ($\sigma d$).

Item 96. The method of item 81, wherein the mixture comprises a yield stress ratio (ad/as) of not greater than about 1 or not greater than about 0.99 or not greater than about 0.97 or not greater than about 0.95 or not greater than about 0.9 or not greater than about 0.85 or not greater than about 0.8 or not greater than about 0.75 or not greater than about 0.7 or not greater than about 0.65 or not greater than about 0.6 or not greater than about 0.55 or not greater than about 0.5.

Item 97. The method of item 81, wherein forming comprises controlling at least one of the dispense gap, the nozzle tip length, the nozzle width, the deposition pressure, the deposition rate, the deposition volume, the deposition position, and the filling pattern of the print material based on the static yield stress ($\sigma s$) of the print material.

Item 98. The method of item 81, wherein the mixture comprises a yield stress ratio (ad/as) of at least about 0.01 or at least about 0.05 or at least about 0.08 or at least about 0.1 or at least about 0.15 or at least about 0.2 or at least about 0.25 or at least about 0.3 or at least about 0.35 or at least about 0.4 or at least about 0.45 or at least about 0.5.

Item 99. The method of item 81, wherein forming comprises controlling at least one of the dispense gap, the nozzle tip length, the nozzle width, the deposition pressure, the deposition rate, the deposition volume, the deposition position, and the filling pattern of the print material based on the yield stress ratio (ad/as) of the print material.

Item 100. The method of item 81, wherein the mixture is a shear thinning material.

Item 101. The method of item 81, wherein the mixture comprises a viscosity of at least about $4 \times 10^3$ Pa s or at least about $5 \times 10^3$ Pa s or at least about $6 \times 10^3$ Pa s or at least about $7 \times 10^3$ Pa s or at least about $7.5 \times 10^3$ Pa s.

Item 102. The method of item 81, wherein the mixture comprises a viscosity of not greater than about $20 \times 10^3$ Pa s or such as not greater than about $18 \times 10^3$ Pa s or not greater than about $15 \times 10^3$ Pa s or not greater than about $12 \times 10^3$ Pa s.

Item 103. The method of item 81, wherein forming comprises controlling at least one of the dispense gap, the nozzle tip length, the nozzle width, the deposition pressure, the deposition rate, the deposition volume, the deposition position, and the filling pattern of the print material based on the viscosity of the print material.

Item 104. The method of any one of items 1 and 2, wherein forming further comprises controlling a three-dimensional movement of a nozzle configured for deposition of a print material, wherein controlling the three-dimensional movement includes control of the nozzle in an X-axis, a Y-axis, and a Z-axis.

Item 105. The method of any one of items 1 and 2, wherein forming further comprises control of a plurality of nozzles, wherein each nozzle of the plurality of nozzles can be configured to deposit a print material and control of the plurality of nozzles includes control of three-dimensional movement of each nozzle in an X-axis, a Y-axis, and a Z-axis.

Item 106. The method of any one of items 1 and 2, further comprising: depositing a first print material as a first portion of the body at a first time; and depositing a second print material as a second portion of the body distinct from the first portion at a second time.

Item 107. The method of item 106, wherein the first time is different than the second time.

Item 108. The method of item 106, wherein the first print material comprises a material selected from the group consisting of a solid, a powder, a solution, a mixture, a liquid, a slurry, a gel, a binder, and a combination thereof.

Item 109. The method of item 106, further comprising preferentially modifying one of the first portion and second portion to join the first portion and second portion and form a subsection of the body.

Item 110. The method of item 109, wherein modifying comprises changing a phase of at least one of the first print material and the second print material.

Item 111. The method of item 109, wherein modifying comprises heating at least one of the first portion and second portion.

Item 112. The method of item 111, wherein heating comprises fusing the first portion to the second portion.

Item 113. The method of item 111, wherein heating comprises joining the first portion to the second portion.

Item 114. The method of item 111, wherein heating comprises impinging electromagnetic radiation on at least a portion of the first portion.

Item 115. The method of item 111, wherein heating comprises impinging electromagnetic radiation on at least a portion of the second portion.

Item 116. The method of item 106, wherein depositing comprises depositing a plurality of discrete droplets of a predetermined volume of the first print material to form the first portion.

Item 117. The method of item 106, wherein depositing comprises depositing a plurality of discrete droplets of a predetermined volume of the second print material to form the second portion.

Item 118. The method of item 106, wherein the first portion comprises a first portion length (Lfp), a first portion width (Wfp), and a first portion thickness (Tfp), and wherein Lfp≥Wfp, Lfp≥Tfp, and Wfp≥Tfp.

Item 119. The method of item 118, wherein the first portion comprises a primary aspect ratio (Lfp:Wfp) of at least about 1:1 or at least about 2:1 or at least about 3:1 or at least about 5:1 or at least about 10:1, and not greater than about 1000:1.

Item 120. The method of item 118, wherein the first portion comprises a secondary aspect ratio (Lfp:Tfp) of at least about 1:1 or at least about 2:1 or at least about 3:1 or at least about 5:1 or at least about 10:1, and not greater than about 1000:1.

Item 121. The method of item 118, wherein the first portion comprises a tertiary aspect ratio (Wfp:Tfp) of at least about 1:1 or at least about 2:1 or at least about 3:1 or at least about 5:1 or at least about 10:1, and not greater than about 1000:1.

Item 122. The method of item 118, wherein at least one of the first portion length (Lfp), the first portion width (Wfp), and the first portion thickness (Tfp) has an average dimension of not greater than about 2 mm or such as not greater than about 1 mm or not greater than about 900 microns or not greater than about 800 microns or not greater than about 700 microns or not greater than about 600 microns or not greater than about 500 microns or not greater than about 400 microns or not greater than about 300 microns or not greater than about 200 microns or not greater than about 150 microns or not greater than about 140 microns or not greater than about 130 microns or not greater than about 120 microns or not greater than about 110 microns or not greater than about 100 microns or not greater than about 90 microns or not greater than about 80 microns or not greater than about 70 microns or not greater than about 60 microns or not greater than about 50 microns, and at least about 0.01 microns or at least about 0.1 microns or at least about 1 micron.

Item 123. The method of item 118, wherein the first portion comprises a cross-sectional shape in a plane defined by the first portion length (Lfp) and the first portion width (Wfp) selected from the group consisting of triangular, quadrilateral, rectangular, trapezoidal, pentagonal, hexagonal, heptagonal, octagonal, ellipsoidal, Greek alphabet characters, Latin alphabet characters, Russian alphabet characters, and a combination thereof.

Item 124. The method of item 118, wherein the first portion comprises a cross-sectional shape in a plane defined by the first portion length (Lfp) and the first portion thickness (Tfp) selected from the group consisting of triangular, quadrilateral, rectangular, trapezoidal, pentagonal, hexagonal, heptagonal, octagonal, ellipsoidal, Greek alphabet characters, Latin alphabet characters, Russian alphabet characters, and a combination thereof.

Item 125. The method of item 118, wherein the first portion is in the form of layer.

Item 126. The method of item 106, wherein the second portion comprises a second portion length (Lsp), a second portion width (Wsp), and a second portion thickness (Tfp), and wherein Lsp≥Wsp, Lsp≥Tsp, and Wsp≥Tsp.

Item 127. The method of item 126, wherein the second portion comprises a primary aspect ratio (Lsp:Wsp) of at least about 1:1 or at least about 2:1 or at least about 3:1 or at least about 5:1 or at least about 10:1, and not greater than about 1000:1.

Item 128. The method of item 126, wherein the second portion comprises a secondary aspect ratio (Lsp:Tsp) of at least about 1:1 or at least about 2:1 or at least about 3:1 or at least about 5:1 or at least about 10:1, and not greater than about 1000:1.

Item 129. The method of item 126, wherein the second portion comprises a tertiary aspect ratio (Wsp:Tsp) of at least about 1:1 or at least about 2:1 or at least about 3:1 or at least about 5:1 or at least about 10:1, and not greater than about 1000:1.

Item 130. The method of item 126, wherein at least one of the second portion length (Lsp), the second portion width (Wsp), and the second portion thickness (Tsp) has an average dimension of not greater than about 2 mm or such as not greater than about 1 mm or not greater than about 900 microns or not greater than about 800 microns or not greater than about 700 microns or not greater than about 600 microns or not greater than about 500 microns or not greater than about 400 microns or not greater than about 300 microns or not greater than about 200 microns or not greater than about 150 microns or not greater than about 140 microns or not greater than about 130 microns or not greater than about 120 microns or not greater than about 110 microns or not greater than about 100 microns or not greater than about 90 microns or not greater than about 80 microns or not greater than about 70 microns or not greater than about 60 microns or not greater than about 50 microns, and at least about 0.01 microns or at least about 0.1 microns or at least about 1 micron.

Item 131. The method of item 126, wherein the second portion comprises a cross-sectional shape in a plane defined by the second portion length (Lsp) and the second portion width (Wsp) selected from the group consisting of triangular, quadrilateral, rectangular, trapezoidal, pentagonal, hexagonal, heptagonal, octagonal, ellipsoidal, Greek alphabet characters, Latin alphabet characters, Russian alphabet characters, and a combination thereof.

Item 132. The method of item 126, wherein the second portion comprises a cross-sectional shape in a plane defined by the second portion length (Lsp) and the second portion thickness (Tsp) selected from the group consisting of triangular, quadrilateral, rectangular, trapezoidal, pentagonal, hexagonal, heptagonal, octagonal, ellipsoidal, Greek alphabet characters, Latin alphabet characters, Russian alphabet characters, and a combination thereof.

Item 133. The method of item 126, wherein the first portion comprises a cross-sectional shape different than a cross-sectional shape of the second portion.

Item 134. The method of item 126, wherein the first portion comprises a cross-sectional shape substantially the same as a cross-sectional shape of the second portion.

Item 135. The method of item 106, wherein the first print material comprises a first composition and the second print material comprises a second composition.

Item 136. The method of item 135, wherein the first composition and the second composition are essentially the same with respect to each other.

Item 137. The method of item 135, wherein the first composition and the second composition are significantly different with respect to each other.

Item 138. The method of item 135, wherein the first composition comprises a material selected from the group consisting of organic material, inorganic material, and a combination thereof.

Item 139. The method of item 135, wherein the first composition comprises a material selected from the group consisting of a ceramic, a glass, a metal, a polymer, and a combination thereof.

Item 140. The method of item 135, wherein the first composition comprises a material selected from the group consisting of an oxide, a carbide, a nitride, a boride, an oxycarbide, oxynitride, oxyboride, and a combination thereof.

Item 141. The method of item 135, wherein the first composition comprises alumina.

Item 142. The method of item 135, wherein the second composition comprises a material selected from the group consisting of organic material, inorganic material, and a combination thereof.

Item 143. The method of item 135, wherein the second composition comprises a material selected from the group consisting of a ceramic, a glass, a metal, a polymer, and a combination thereof.

Item 144. The method of item 135, wherein the second composition comprises a material selected from the group consisting of an oxide, a carbide, a nitride, a boride, an oxycarbide, oxynitride, oxyboride, and a combination thereof.

Item 145. The method of item 135, wherein the second composition comprises alumina.

Item 146. The method of item 106, wherein the second print material includes a solid, a powder, a solution, a mixture, a liquid, a slurry, a gel, a binder, and a combination thereof.

Item 147. The method of item 1, further comprising forming the body according to a digital model.

Item 148. The method of any one of items 2 and 147, further comprising comparing at least a portion of the body to the digital model.

Item 149. The method of item 148, wherein comparing includes measuring at least a portion of the body and comparing it to a corresponding dimension of the digital model.

Item 150. The method of item 148, wherein comparing is conducted during forming.

Item 151. The method of item 148, wherein comparing is conducted after forming.

Item 152. The method of any one of items 2 and 147, further comprising creating a plurality of digital cross-sections of the digital model.

Item 153. The method of item 152, further comprising: depositing a first portion of the body at a first time, the first portion corresponding to a first cross-section of the plurality of cross-sections of the digital model; depositing a second portion of the body distinct from the first portion at a second time different than the first time, the second portion corresponding to a second cross-section of the plurality of cross-sections of the digital model.

Item 154. The method of item 152, further comprising using the plurality of digital cross-sections as a guide for depositing a plurality of discrete portions.

Item 155. The method of item 1, wherein the additive manufacturing process defines a process of compiling discrete portions to form a sub-portion.

Item 156. The method of item 155, further comprising compiling a plurality of sub-portions to form the body of the shaped abrasive particle.

Item 157. The method of any one of items 1 and 2, further comprising a subtractive process.

Item 158. The method of item 157, wherein the subtractive process is conducted after forming a body of a precursor shaped abrasive particle.

Item 159. The method of item 157, wherein the subtractive process includes removing at least a portion of the material used to form a precursor shaped abrasive particle.

Item 160. The method of item 157, wherein the subtractive process includes forming at least one opening within a portion of the body.

Item 161. The method of item 157, wherein the subtractive process includes forming an aperture through a portion of the body.

Item 162. The method of item 157, wherein the subtractive process includes heating to remove a portion of the body.

Item 163. The method of item 162, wherein heating comprises volatilizing at least a portion of the body.

Item 164. The method of any one of items 1 and 2, further comprising at least one process of modifying a portion of the body including melting, selective laser melting, sintering, selective sintering, direct metal laser sintering, selective laser sintering, particle beam modification, electron beam melting, fused deposition modeling, curing, and a combination thereof.

Item 165. The method of any one of items 1 and 2, wherein forming comprises prototype printing of the body of the shaped abrasive particle.

Item 166. The method of any one of items 1 and 2, wherein forming comprises laminated object manufacturing.

Item 167. The method of any one of items 1 and 2, wherein the body comprises a three-dimensional shape including a body length (Lb), a body width (Wb), and a body thickness (Tb), and wherein Lb≥Wb, Lb≥Tb, and Wb≥Tb.

Item 168. The method of item 167, wherein the body comprises a primary aspect ratio (Lb:Wb) of at least about 1:1 or at least about 2:1 or at least about 3:1 or at least about 5:1 or at least about 10:1, and not greater than about 1000:1.

Item 169. The method of item 167, wherein the body comprises a secondary aspect ratio (Lb:Tb) of at least about 1:1 or at least about 2:1 or at least about 3:1 or at least about 5:1 or at least about 10:1, and not greater than about 1000:1.

Item 170. The method of item 167, wherein the body comprises a tertiary aspect ratio (Wb:Tb) of at least about 1:1 or at least about 2:1 or at least about 3:1 or at least about 5:1 or at least about 10:1, and not greater than about 1000:1.

Item 171. The method of item 167, wherein at least one of the body length (Lb), the body width (Wb), and the body thickness (Tb) has an average dimension of at least about 0.1 microns or at least about 1 micron or at least about 10 microns or at least about 50 microns or at least about 100 microns or at least about 150 microns or at least about 200 microns or at least about 400 microns or at least about 600 microns or at least about 800 microns or at least about 1 mm, and not greater than about 20 mm or not greater than about 18 mm or not greater than about 16 mm or not greater than about 14 mm or not greater than about 12 mm or not greater than about 10 mm or not greater than about 8 mm or not greater than about 6 mm or not greater than about 4 mm.

Item 172. The method of item 167, wherein the body comprises a cross-sectional shape in a plane defined by the body length and the body width selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Item 173. The method of item 167, wherein the body comprises a cross-sectional shape in a plane defined by the body length and the body thickness selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Item 174. The method of any one of items 1 and 2, wherein the body comprises a three-dimensional shape selected from the group consisting of a polyhedron, a pyramid, an ellipsoid, a sphere, a prism, a cylinder, a cone, a tetrahedron, a cube, a cuboid, a rhomohedron, a truncated pyramid, a truncated ellipsoid, a truncated sphere, a truncated cone, a pentahedron, a hexahedron, a heptahedron, an octahedron, a nonahedron, a decahedron, Greek alphabet characters, Latin alphabet characters, Russian alphabet characters, and a combination thereof.

Item 175. The method of any one of items 1 and 2, further comprising forming a plurality of shaped abrasive particles, wherein each of the shaped abrasive particles of the plurality of shaped abrasive particles have a body having a body length (Lb), a body width (Wb), and a body thickness (Tb).

Item 176. The method of item 175, wherein the plurality of shaped abrasive particles have at least one of: a body length variation of not greater than about 50%; a body width variation of not greater than about 50%; and a body thickness variation of not greater than about 50%.

Item 177. The method of any one of items 1 and 2, wherein the body has a first major surface, a second major surface, and at least one side surface extending between the first major surface and the second major surface.

Item 178. The method of any one of items 1 and 2, wherein the body comprises a percent flashing not greater than about 40% or not greater than about 20% or not greater than about 10% or not greater than about 4%, wherein the body is essentially free of flashing.

Item 179. The method of any one of items 1 and 2, wherein the body is essentially free of a binder, wherein the body is essentially free of an organic material.

Item 180. The method of any one of items 1 and 2, wherein the body comprises a polycrystalline material, wherein the polycrystalline material comprises grains, wherein the grains are selected from the group of materials consisting of nitrides, oxides, carbides, borides, oxynitrides, diamond, and a combination thereof, wherein the grains comprise an oxide selected from the group of oxides consisting of aluminum oxide, zirconium oxide, titanium oxide, yttrium oxide, chromium oxide, strontium oxide, silicon oxide, and a combination thereof, wherein the grains comprise alumina, wherein the grains consist essentially of alumina.

Item 181. The method of any one of items 1 and 2, wherein the body consists essentially of alumina.

Item 182. The method of any one of items 1 and 2, wherein the body is formed from a seeded sol gel.

Item 183. The method of any one of items 1 and 2, wherein the body comprises a polycrystalline material having an average grain size not greater than about 1 micron.

Item 184. The method of any one of items 1 and 2, wherein the body is a composite comprising at least about 2 different types of compositions.

Item 185. The method of any one of items 1 and 2, wherein the body comprises an additive, wherein the additive comprises an oxide, wherein the additive comprises a metal element, wherein the additive comprises a rare-earth element.

Item 186. The method of item 185, wherein the additive comprises a dopant material, wherein the dopant material includes an element selected from the group consisting of an alkali element, an alkaline earth element, a rare earth element, a transition metal element, and a combination thereof, wherein the dopant material comprises an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof.

Item 187. A method of forming a fixed abrasive comprising: forming a plurality of shaped abrasive particles on a substrate, wherein each of the shaped abrasive particles of the plurality of shaped abrasive particles have a body formed by an additive manufacturing process.

Item 188. The method of item 187, wherein forming is conducted directly overlying the substrate.

Item 189. The method of item 187, wherein forming is conducted directly on at least a portion of a bonding layer overlying the substrate, wherein the bonding layer comprises a material selected from the group consisting of an inorganic material, a vitreous material, a crystalline material, an organic material, a resin material, a metal material, a metal alloy, and a combination thereof.

Item 190. The method of item 187, wherein the substrate is translated through a forming zone, wherein in the forming zone at least one shaped abrasive particle of the plurality of shaped abrasive particles is formed overlying the substrate.

Item 191. The method of item 187, wherein translation includes a stepped translation process.

Item 192. The method of item 187, wherein the body of each of the shaped abrasive particles of the plurality of shaped abrasive particles is formed according to a digital model.

Item 193. The method of item 187, wherein the additive manufacturing process comprises: depositing a first print material as a first portion of the body of each of the shaped abrasive particles of the plurality of shaped abrasive particles at a first time; and depositing a second print material as a second portion of the body of each of the shaped abrasive particles of the plurality of shaped abrasive particles at a second time different than the first time.

Item 194. The method of item 193, further comprising preferentially modifying one of the first portion and second portion to join the first portion and second portion and form a subsection of the body of the shaped abrasive particle.

Item 195. The method of item 187, wherein the plurality of shaped abrasive particles are formed at a predetermined location on the substrate.

Item 196. The method of item 187, further comprising placing each of the shaped abrasive particles of the plurality of shaped abrasive particles on the substrate, wherein the placing is conducted simultaneously with forming the body of each of the shaped abrasive particles of the plurality of shaped abrasive particles.

Item 197. The method of item 187, further comprising orienting each of the shaped abrasive particles of the plurality of shaped abrasive particles relative to the substrate.

Item 198. The method of item 197, wherein orienting and forming are conducted simultaneously.

Item 199. The method of item 187, wherein at least about 55% of the plurality of shaped abrasive particles are oriented in a side orientation.

Item 200. The method of item 187, wherein the plurality of shaped abrasive particles define an open coat, wherein the plurality of shaped abrasive particles of the first portion define a closed coat, wherein the open coat comprises a coating density of not greater than about 70 particles/cm$^2$.

Item 201. The method of item 187, wherein the substrate comprises a woven material, wherein the substrate comprises a non-woven material, wherein the substrate comprises an organic material, wherein the substrate comprises a polymer, wherein the substrate comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea formaldehyde resin, polyester, polyurethane, polypropylene, polyimides, and a combination thereof.

Item 202. The method of item 187, wherein the substrate comprises an additive chosen from the group consisting of catalysts, coupling agents, curants, anti-static agents, suspending agents, anti-loading agents, lubricants, wetting agents, dyes, fillers, viscosity modifiers, dispersants, defoamers, and grinding agents.

Item 203. The method of item 187, further comprising an adhesive layer overlying the substrate, wherein the adhesive layer comprises a make coat, wherein the make coat overlies the substrate, wherein the make coat is bonded directly to a portion of the substrate, wherein the make coat comprises an organic material, wherein the make coat comprises a polymeric material, wherein the make coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 204. The method of item 203, wherein the adhesive layer comprises a size coat, wherein the size coat overlies a portion of the plurality of shaped abrasive particles, wherein the size coat overlies a make coat, wherein the size coat is bonded directly to a portion of the plurality of shaped abrasive particles, wherein the size coat comprises an organic material, wherein the size coat comprises a polymeric material, wherein the size coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 205. A shaped abrasive particle comprising a body having at least one major surface having a self-similar feature.

Item 206. A shaped abrasive particle comprising a body having at least one peripheral ridge extending around at least a portion of a side surface of the body.

Item 207. A shaped abrasive particle comprising a body having at least one major surface defining a concave stepped surface.

Item 208. A shaped abrasive particle comprising a body having at least one transverse ridge extending along at least two surfaces and an adjoining edge between the at least two surfaces.

Item 209. A shaped abrasive particle comprising a body having a corner including a plurality of microprotrusions extending from the corner.

Item 210. A shaped abrasive particle comprising a body including a surface comprising a scalloped topography.

Item 211. The shaped abrasive particle of any one of items 205, 206, 207, 208, 209, and 210 wherein body comprises a corner roundness of not greater than about 250 microns or not greater than about 220 microns or not greater than about 200 microns or not greater than about 180 microns or not greater than about 160 microns or not greater than about 140 microns or not greater than about 120 microns or not greater than about 100 microns or not greater than about 90 microns or not greater than about 80 microns or not greater than about 70 microns or not greater than about 60 microns or not greater than about 50 microns or not greater than about 40 microns or not greater than about 30 microns or not greater than about 20 microns.

Item 212. The shaped abrasive particle of any one of items 205, 206, 207, 208, 209, and 210, wherein body comprises a corner roundness of at least about 0.1 microns or at least about 0.5 microns.

Item 213. The shaped abrasive particle of any one of items 206, 207, 208, 209, and 210, wherein the body comprises a major surface including a self-similar feature.

Item 214. The shaped abrasive particle of any one of items 205 and 213, wherein the self-similar feature comprises an arrangement of two-dimensional shapes having substantially the same two-dimensional shape of the periphery of the major surface.

Item 215. The shaped abrasive particle of any one of items 205 and 213, wherein the major surface has a two-dimensional shape selected from the group consisting of regular polygons, irregular polygons, irregular shapes, triangles, quadrilaterals, rectangles, trapezoids, pentagons, hexagons, heptagons, octagons, ellipses, Greek alphabet characters, Latin alphabet characters, Russian alphabet characters, and a combination thereof.

Item 216. The shaped abrasive particle of any one of items 205 and 213, wherein the major surface comprises a triangular two-dimensional shape.

Item 217. The shaped abrasive particle of any one of items 205 and 213, wherein the self-similar feature comprises a plurality of triangular two-dimensional shapes nested within each other.

Item 218. The shaped abrasive particle of any one of items 205, 207, 208, 209, and 210, wherein the body has at least one peripheral ridge extending around at least a portion of a side surface of the body.

Item 219. The shaped abrasive particle of any one of items 206 and 218, wherein the at least one peripheral ridge extends around a majority of the side surface of the body.

Item 220. The shaped abrasive particle of any one of items 206 and 218, wherein the at least one peripheral ridge extends around an entire side surface of the body.

Item 221. The shaped abrasive particle of any one of items 206 and 218, wherein the at least one peripheral ridge extends around the side surface of the body without intersecting a major surface.

Item 222. The shaped abrasive particle of any one of items 206 and 218, wherein the at least one peripheral ridge intersects at least two surfaces and an edge of the body.

Item 223. The shaped abrasive particle of any one of items 206 and 218, wherein the body comprises a length (l), a width (w), and a thickness (t), wherein l≥w≥t, and the at least one peripheral ridge extends peripherally around a side surface of the body extending between major surfaces.

Item 224. The shaped abrasive particle of any one of items 206 and 218, wherein the at least one peripheral ridge comprises a depth that is not greater than about 0.8t, wherein "t" is a thickness of the body, not greater than about 0.7t or not greater than about 0.6t or not greater than about 0.5t or not greater than about 0.4t or not greater than about 0.3t or not greater than about 0.2t or not greater than about 0.18t or not greater than about 0.16t or not greater than about 0.15t or not greater than about 0.14t or not greater than about 0.12t or not greater than about 0.1t or not greater than about 0.09t or not greater than about 0.08t or not greater than about 0.07t or not greater than about 0.06t or not greater than about 0.05t.

Item 225. The shaped abrasive particle of any one of items 206 and 218, wherein the at least one peripheral ridge comprises a depth that is at least about 0.001t, wherein "t" is a thickness of the body, at least about 0.01t.

Item 226. The shaped abrasive particle of any one of items 205, 206, 208, 209, and 210, wherein the body has at least one major surface defining a concave, stepped surface.

Item 227. The shaped abrasive particle of any one of items 207 and 226, wherein the concave stepped surface defines a thickness at the midpoint of the major surface that is less than a thickness of the body at an edge.

Item 228. The shaped abrasive particle of any one of items 207 and 226, wherein concave stepped surface comprises a plurality of flats and risers, wherein the flats extend substantially parallel to the plane of the major surface and the risers extend substantially perpendicular to the plane of the major surface.

Item 229. The shaped abrasive particle of item 228, wherein the flats have an average width (wf) that is not greater than about 0.8(l), wherein "l" defines a length of the body, not greater than about 0.5(l) or not greater than about 0.4(l) or not greater than about 0.3(l) or not greater than about 0.2(l) or not greater than about 0.1(l) or not greater than about 0.09(l) or not greater than about 0.08(l).

Item 230. The shaped abrasive particle of item 228, wherein the flats have an average width (wf) that is at least about 0.001(l), wherein "l" defines a length of the body, at least about 0.005(l) or at least about 0.01(l).

Item 231. The shaped abrasive particle of item 228, wherein the risers have an average height (hr) that is not greater than about 0.2(l), wherein "l" defines a length of the body, not greater than about 0.15(l) or not greater than about 0.1(l) or not greater than about 0.05(l) or not greater than about 0.02(l).

Item 232. The shaped abrasive particle of item 228, wherein the risers have an average height (hr) that is at least about 0.0001(l) wherein "l" defines a length of the body, at least about 0.0005(l).

Item 233. The shaped abrasive particle of item 228, wherein the flats have an average width that is greater than an average height of the risers, wherein the average height of the risers (hr) is not greater than about 0.95(wf), wherein "wf" defines an average width of the flats, not greater than about 0.9(wf) or not greater than about 0.8(wf) or not greater than about 0.7(wf) or not greater than about 0.5(wf) or not greater than about 0.3(wf) or not greater than about 0.2(wf) or not greater than about 0.1(wf).

Item 234. The shaped abrasive particle of item 228, wherein the average height of the risers is at least about 0.0001(wf), wherein "wf" defines an average width of the flats, at least about 0.001(wf).

Item 235. The shaped abrasive particle of any one of items 205, 206, 208, 209, and 210, wherein wherein the body has at least one major surface defining a convex, stepped surface defining a thickness at the midpoint of the major surface that is greater than a thickness of the body at an edge.

Item 236. The shaped abrasive particle of any one of items 205, 206, 207, 209, and 210, wherein the body comprises at least one transverse ridge extending along at least two surfaces and an adjoining edge between the at least two surfaces.

Item 237. The shaped abrasive particle of any one of items 208 and 236, wherein the at least one transverse ridge extends over at least three surfaces and at least two adjoining edges between the at least three surfaces.

Item 238. The shaped abrasive particle of any one of items 208 and 236, wherein the body comprises a plurality of transverse ridges, each of the transverse ridges of the plurality of transverse ridges extending parallel to each other around at least a portion of the periphery of the body.

Item 239. The shaped abrasive particle of item 238, wherein at least one of the transverse ridges of the plurality of transverse ridges has a different length relative to another transverse ridge of the plurality of transverse ridges.

Item 240. The shaped abrasive particle of item 238, wherein each of the transverse ridges of the plurality of transverse ridges have different lengths relative to each other.

Item 241. The shaped abrasive particle of any one of items 205, 206, 207, 208, and 210, wherein the body comprises a corner including a plurality of microprotrusions extending from the corner.

Item 242. The shaped abrasive particle of any one of items 209 and 241, wherein the microprotrusions define a plurality of discrete corner protrusions separated by a plurality of ridges.

Item 243. The shaped abrasive particle of item 242, wherein the plurality of discrete corner protrusions have a plurality of different contours relative to each other.

Item 244. The shaped abrasive particle of item 242, wherein at least two discrete corner protrusions have a different corner radius relative to each other.

Item 245. The shaped abrasive particle of item 242, wherein at least two discrete corner protrusions define a step having a lateral shift relative to each other.

Item 246. The shaped abrasive particle of any one of items 209 and 241, wherein the corner roundness at an upper surface is different than a corner roundness at a bottom surface, and wherein the upper surface has a lower surface area than the bottom surface.

Item 247. The shaped abrasive particle of any one of items 209 and 241, wherein the microprotrusions define a serrated edge.

Item 248. The shaped abrasive particle of any one of items 205, 206, 207, 208, and 209, wherein the body has a surface comprising a scalloped topography.

Item 249. The shaped abrasive particle of any one of items 210 and 248, wherein the scalloped topography extends over a majority of a surface area of at least one surface of the body.

Item 250. The shaped abrasive particle of any one of items 210 and 248, wherein the scalloped topography extends over a majority of an entire surface area of at least one surface of the body.

Item 251. The shaped abrasive particle of any one of items 210 and 248, wherein the scalloped topography defines a plurality of curved protrusions having ridges extending between the curved protrusions.

Item 252. The shaped abrasive particle of any one of items 210 and 248, wherein the scalloped topography includes a plurality of elongated protrusions, each protrusion having a length, a width, and a height, wherein each protrusion has an arcuate contour extending in the direction of the width and the height.

Item 253. The shaped abrasive particle of item 252, wherein the length of each elongated protrusion extends substantially in the direction of a length of the body.

Item 254. The shaped abrasive particle of item 252, wherein the length of at least one elongated protrusion is at least about 0.8(l), wherein "l" is the length of the body, at least about 09(l) or at least about 1(l).

Item 255. The shaped abrasive particle of item 252, wherein the plurality of elongated protrusions have an average height that is less than the average width (wep), wherein the average height of the plurality of elongated protrusion is not greater than about 0.9(wep) or not greater than about 0.8(wep) or not greater than about 0.7(wep) or not greater than about 0.6(wep) or not greater than about 0.5(wep) or not greater than about 0.4(wep) or not greater than about 0.3(wep) or not greater than about 0.2(wep) or not greater than about 0.1(wep).

Item 256. The shaped abrasive particle of item 255, wherein the average height of the plurality of elongated protrusions is not greater than about 500 microns or not greater than about 400 microns or not greater than about 300 microns or not greater than about 250 microns or not greater than about 200 microns or not greater than about 150 microns or not greater than about 100 microns or not greater than about 90 microns or not greater than about 70 microns or not greater than about 50 microns.

Item 257. The shaped abrasive particle of item 252, wherein the plurality of elongated protrusions comprises an average width that is less than the average length.

Item 258. The shaped abrasive particle of item 252, wherein plurality of elongated protrusions have an average width that is less than the length (1) of the body, wherein the average width of the plurality of elongated protrusion is not greater than about 0.9(l) or not greater than about 0.8(l) or not greater than about 0.7(l) or not greater than about 0.6(l) or not greater than about 0.5(l) or not greater than about 0.4(l) or not greater than about 0.3(l) or not greater than about 0.2(l) or not greater than about 0.1(l).

Item 259. The shaped abrasive particle of item 252, wherein the average width of the plurality of elongated protrusion is at least about 0.001(l) or at least about 0.01(l).

Item 260. The shaped abrasive particle of item 252, wherein the average width of the plurality of elongated protrusions is not greater than about 500 microns or not greater than about 400 microns or not greater than about 300 microns or not greater than about 250 microns or not greater than about 200 microns.

Item 261. The shaped abrasive particle of any one of items 210 and 248, wherein the scalloped topography intersects an edge defining at least one corner of the body and defines an edge having a serrated contour along the length of the edge.

Item 262. The shaped abrasive particle of any one of items 205, 206, 207, 208, 209, and 210 wherein the body comprises at least 4 major surfaces joined together at common edges.

Item 263. The shaped abrasive particle of item 262, wherein the at least 4 major surfaces have substantially the same surface area.

Item 264. The shaped abrasive particle of item 262, wherein the body comprises a tetrahedral shape.

Item 265. The shaped abrasive particle of any one of items 205, 206, 207, 208, 209, and 210 wherein the body comprises a three-dimensional shape selected from the group consisting of a polyhedron, a pyramid, an ellipsoid, a sphere, a prism, a cylinder, a cone, a tetrahedron, a cube, a cuboid, a rhomohedron, a truncated pyramid, a truncated ellipsoid, a truncated sphere, a truncated cone, a pentahedron, a hexahedron, a heptahedron, an octahedron, a nonahedron, a decahedron, Greek alphabet characters, Latin alphabet characters, Russian alphabet characters, a volcano shape, monostatic shape, and a combination thereof.

Item 266. The shaped abrasive particle of any one of items 205, 206, 207, 208, 209, and 210 wherein the body comprises a three-dimensional shape including a body length (Lb), a body width (Wb), and a body thickness (Tb), and wherein Lb>Wb, Lb>Tb, and Wb>Tb.

Item 267. The shaped abrasive particle of item 266, wherein the body comprises a primary aspect ratio (Lb:Wb) of at least about 1:1 or at least about 2:1 or at least about 3:1 or at least about 5:1 or at least about 10:1, and not greater than about 1000:1.

Item 268. The shaped abrasive particle of item 266, wherein the body comprises a secondary aspect ratio (Lb:Tb) of at least about 1:1 or at least about 2:1 or at least about 3:1 or at least about 5:1 or at least about 10:1, and not greater than about 1000:1.

Item 269. The shaped abrasive particle of item 266, wherein the body comprises a tertiary aspect ratio (Wb:Tb)

of at least about 1:1 or at least about 2:1 or at least about 3:1 or at least about 5:1 or at least about 10:1, and not greater than about 1000:1.

Item 270. The shaped abrasive particle of item 266, wherein the body comprises a cross-sectional shape in a plane defined by the body length and the body width selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Item 271. The shaped abrasive particle of item 266, wherein the body comprises a cross-sectional shape in a plane defined by the body length and the body thickness selected from the group consisting of triangular, quadrilateral, rectangular, trapezoidal, pentagonal, hexagonal, heptagonal, octagonal, ellipsoids, Greek alphabet characters, Latin alphabet characters, Russian alphabet characters, and a combination thereof.

Item 272. The shaped abrasive particle of any one of items 205, 206, 207, 208, 209, and 210 wherein the body is essentially free of a binder, wherein the body is essentially free of an organic material.

Item 273. The shaped abrasive particle of any one of items 205, 206, 207, 208, 209, and 210 wherein the body comprises a polycrystalline material, wherein the polycrystalline material comprises grains, wherein the grains are selected from the group of materials consisting of nitrides, oxides, carbides, borides, oxynitrides, diamond, and a combination thereof, wherein the grains comprise an oxide selected from the group of oxides consisting of aluminum oxide, zirconium oxide, titanium oxide, yttrium oxide, chromium oxide, strontium oxide, silicon oxide, and a combination thereof, wherein the grains comprise alumina, wherein the grains consist essentially of alumina.

Item 274. The shaped abrasive particle of any one of items 205, 206, 207, 208, 209, and 210 wherein the body is formed from a seeded sol gel.

Item 275. The shaped abrasive particle of any one of items 205, 206, 207, 208, 209, and 210 wherein the body comprises a polycrystalline material having an average grain size not greater than about 1 micron.

Item 276. The shaped abrasive particle of any one of items 205, 206, 207, 208, 209, and 210 wherein the body is a composite comprising at least about 2 different types of compositions.

Item 277. The shaped abrasive particle of any one of items 205, 206, 207, 208, 209, and 210 wherein the body comprises an additive, wherein the additive comprises an oxide, wherein the additive comprises a metal element, wherein the additive comprises a rare-earth element.

Item 278. The shaped abrasive particle of item 277, wherein the additive comprises a dopant material, wherein the dopant material includes an element selected from the group consisting of an alkali element, an alkaline earth element, a rare earth element, a transition metal element, and a combination thereof, wherein the dopant material comprises an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof.

Item 279. The shaped abrasive particle of any one of items 205, 206, 207, 208, 209, and 210 wherein the body is coupled to a substrate as part of a fixed abrasive, wherein the fixed abrasive article is selected from the group consisting of a bonded abrasive article, a coated abrasive article, and a combination thereof.

Item 280. The shaped abrasive particle of item 279 wherein the substrate is a backing, wherein the backing comprises a woven material, wherein the backing comprises a non-woven material, wherein the backing comprises an organic material, wherein the backing comprises a polymer, wherein the backing comprises a material selected from the group consisting of cloth, paper, film, fabric, fleeced fabric, vulcanized fiber, woven material, non-woven material, webbing, polymer, resin, phenolic resin, phenolic-latex resin, epoxy resin, polyester resin, urea formaldehyde resin, polyester, polyurethane, polypropylene, polyimides, and a combination thereof.

Item 281. The shaped abrasive particle of item 280, wherein the backing comprises an additive selected from the group consisting of catalysts, coupling agents, curants, antistatic agents, suspending agents, anti-loading agents, lubricants, wetting agents, dyes, fillers, viscosity modifiers, dispersants, defoamers, and grinding agents.

Item 282. The shaped abrasive particle of item 280, further comprising an adhesive layer overlying the backing, wherein the adhesive layer comprises a make coat, wherein the make coat overlies the backing, wherein the make coat is bonded directly to a portion of the backing, wherein the make coat comprises an organic material, wherein the make coat comprises a polymeric material, wherein the make coat comprises a material selected from the group consisting of polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and a combination thereof.

Item 283. The shaped abrasive particle of item 282, wherein the adhesive layer comprises a size coat, wherein the size coat overlies a portion of the plurality of shaped abrasive particles, wherein the size coat overlies a make coat, wherein the size coat is bonded directly to a portion of the plurality of shaped abrasive particles, wherein the size coat comprises an organic material, wherein the size coat comprises a polymeric material, wherein the size coat comprises a material selected from the group consisting of polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and a combination thereof.

Item 284. The shaped abrasive particle of any one of items 205, 206, 207, 208, 209, and 210 wherein the shaped abrasive particle is part of a plurality of a first type of shaped abrasive particles, wherein a majority of the first type of shaped abrasive particles are coupled to a backing in an open coat, wherein the open coat comprises a coating density of not greater than about 70 particles/cm$^2$ or not greater than about 65 particles/cm$^2$ or not greater than about 60 particles/cm$^2$ or not greater than about 55 particles/cm$^2$ or not greater than about 50 particles/cm$^2$ or at least about 5 particles/cm$^2$ or at least about 10 particles/cm$^2$.

Item 285. The shaped abrasive particle of any one of items 205, 206, 207, 208, 209, and 210 wherein the shaped abrasive particle is part of a plurality of a first type of shaped abrasive particles, wherein a majority of the first type of shaped abrasive particles are coupled to a backing in a closed coat, wherein having a closed coat of the blend of shaped abrasive particles on a backing, wherein the closed coat comprises a coating density of at least about 75 particles/cm² or at least about 80 particles/cm² or at least about 85 particles/cm² or at least about 90 particles/cm² or at least about 100 particles/cm².

Item 286. The shaped abrasive particle of any one of items 205, 206, 207, 208, 209, and 210 wherein the shaped abrasive particle is part of a blend including a plurality of a first type of shaped abrasive particles and a third type of abrasive particle, wherein the third type of abrasive particle comprises a shaped abrasive particle, wherein the third type of abrasive particle comprises a diluent type of abrasive particle, wherein the diluent type of abrasive particle comprises an irregular shape.

Item 287. The shaped abrasive particle of item 286, wherein the blend of abrasive particles comprises a plurality of shaped abrasive particles, and wherein each shaped abrasive particle of the plurality of shaped abrasive particles is arranged in a controlled orientation relative to a backing, the controlled orientation including at least one of a predetermined rotational orientation, a predetermined lateral orientation, and a predetermined longitudinal orientation.

Item 288. A method of forming a shaped abrasive particle using a low pressure injection molding process.

Item 289. The method of item 288, wherein the low pressure injection molding includes filling a mold with a mold material using laminar flow conditions.

Item 290. The method of item 288, wherein the laminar flow conditions are based on at least one of a rheology of the mold material, the shape of the mold, mold material, and a combination thereof.

EXAMPLES

Example 1

A print material was made by creating a mixture including 39 wt % boehmite and alpha alumina seeds in water. Nitric acid was added to adjust the pH of the mixture to 4. The print material was then transferred to a container, de-aired using a vacuum pump, and aged at room temperature for up to 30 days or until the rheological properties were sufficient for printing. The print material was then loaded into a deposition assembly of a robocasting unit, commercially available as EFD Nordson® Ultra TT 525 having a Tungsten Palm OS® controller and EFD 1.2 software. The deposition assembly includes a nozzle having a nozzle width of 100 μm, a nozzle tip length of approximately 6.35 mm or 3 mm. The print material had a static yield stress of approximately 750 Pa, a dynamic yield stress of approximately 450 Pa. The print material was a shear thinning mixture with an apparent viscosity of 9000 Pa s at a shear rate of 100 s$^{-1}$.

The height of the nozzle and the tactile height sensor were carefully adjusted so that the height measurements used by the printer were accurate. An initial line of print material was deposited to expel air and adjust the deposition pressure, deposition rate, deposition volume, and dispense gap. Certain process parameters such as the deposition rate, deposition pressure, and dispense gap were evaluated and adjusted based on the rheological characteristics of the print material until the printed line had approximately the same width as the nozzle width. The pressure was approximately 0.5 MPa (70 psi), the deposition rate was approximately 3 mm/s, and the dispense gap was approximately 100 μm.

A program for forming a shaped abrasive particle having a triangular shape including deposition of 6 layers of the same size was loaded onto the controller. The filling pattern included deposition of a first layer having a triangular two-dimensional shape using an outside-in "escargot" process. The premove delay was 0.1 seconds. A second layer was then formed overlying the first layer. The nozzle was moved vertically upward 100 μm above the stop position of the first layer. The second layer was then formed having a triangular two-dimensional shape and was formed using a filling pattern based on an inside-out process. The premove delay was 0.3 seconds. Four additional layers were formed on top of each other using the alternating outside-in and inside-out process until 6 layers were formed.

The body was dried in ambient conditions and sintered at approximately 1250° C. for 90 minutes. The shaped abrasive particle of FIG. 20 is representative of the shaped abrasive particle formed according to Example 1.

Example 2

A tetrahedral or pyramidal shaped abrasive particle was formed using the same print material of Example 1. The robocasting parameters were the same as Example 1 except that the nozzle width was 150 microns and the nozzle length was approximately 6.35 mm. Moreover, the filling process was essentially the same as Example 1, except that the premove delay was 0.2 seconds for layers formed using an inside-out filling process, and each of the layers got successively smaller in size as the pyramidal shape was formed. The shaped abrasive particles were dried in ambient conditions and sintered at approximately 1250° C. for 90 minutes. The shaped abrasive particle of FIGS. 28 and 29 is representative of a shaped abrasive particle formed according to Example 2.

Example 3

A volcano-shape, shaped abrasive particle was formed using the same print material of Example 2, except that the filling process is changed for a final grouping of the layers, such as about the last 3 layers. The filling pattern uses an alternating outside-in and inside-out filling process as described in Example 2, except that the final group of layers were deposited around the periphery of the shape, but did not deposit the print material fully into the interior of the body to create the opening and volcano-shape. The shaped abrasive particles were dried in ambient conditions and sintered at approximately 1250° C. for 90 minutes. The shaped abrasive particle of FIG. 27 is representative of a shaped abrasive particle formed according to Example 3 including the opening 2709.

Certain references have demonstrated the formation of various objects on a centimeter scale by certain additive manufacturing techniques. However, these references are not directed to the formation of shaped abrasive particles having the features of the shaped abrasive particles of the embodiments herein making them suitable for use as abrasives. Moreover, formation of shaped abrasive particles having the features and dimensions of the embodiments herein, which makes them suitable for their intended purpose, requires knowledge that is not readily available from references disclosing formation of articles on a centimeter scale. The knowledge needed to migrate from centimeter scale technology to millimeter or micron sized technology is non-trivial and was the result of significant research. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the items.

The shaped abrasive particles of the embodiments herein are suitable for use in fixed abrasive articles, which may be used to create products in various industries including metal working and fabrication industries, the automotive industry, building and construction materials, and the like.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The foregoing description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

What is claimed is:

1. A shaped abrasive particle comprising a body having at least one major surface having a self-similar feature, wherein the at least one major surface comprises step features including a plurality of flats and risers, wherein the flats comprise an average width (wf) that is not greater than about 0.8(l), wherein l defines the longest dimension of the body, and wherein the body comprises a corner roundness of not greater than about 100 microns.

2. The shaped abrasive particle of claim 1, wherein the self-similar feature comprises an arrangement of two-dimensional shapes having substantially the same two-dimensional shape as the periphery of the major surface.

3. The shaped abrasive particle of claim 1, wherein the major surface has a two-dimensional shape selected from the group consisting of regular polygons, irregular polygons, irregular shapes, triangles, quadrilaterals, rectangles, trapezoids, pentagons, hexagons, heptagons, octagons, ellipses, Greek alphabet characters, Latin alphabet characters, Russian alphabet characters, and a combination thereof.

4. The shaped abrasive particle of claim 1, wherein the major surface comprises a triangular two-dimensional shape.

5. The shaped abrasive particle of claim 1, wherein the self-similar feature comprises a plurality of triangular two-dimensional shapes nested within each other.

6. The shaped abrasive particle of claim 1, wherein the body has at least one peripheral ridge extending around at least a portion of a side surface of the body.

7. The shaped abrasive particle of claim 6, wherein the at least one peripheral ridge extends around an entire side surface of the body.

8. The shaped abrasive particle of claim 1, wherein the body comprises a corner including a plurality of microprotrusions extending from the corner.

9. The shaped abrasive particle of claim 8, wherein the microprotrusions define a plurality of discrete corner protrusions separated by a plurality of ridges.

10. The shaped abrasive particle of claim 9, wherein the plurality of discrete corner protrusions have a plurality of different contours relative to each other.

11. The shaped abrasive particle of claim 8, wherein the microprotrusions define a serrated edge.

12. The shaped abrasive particle of claim 1, wherein the body includes a surface comprising a scalloped topography that intersects the corner and defines a serrated contour.

13. The shaped abrasive particle of claim 12, wherein the scalloped topography extends over the entire surface of the side surface.

14. The shaped abrasive particle of claim 1, wherein the body comprises a first discrete corner protrusion and a second discrete corner protrusion and wherein the first discrete corner protrusion extends further in a lateral direction from the corner relative to the second discrete corner protrusion.

15. The shaped abrasive particle of claim 1, wherein the body comprises a polycrystalline material.

16. The shaped abrasive particle of claim 15, wherein the polycrystalline material consists essentially of alumina.

17. The shaped abrasive particle of claim 15, wherein the polycrystalline material comprises an average grain size not greater than about 1 micron.

18. The shaped abrasive particle of claim 1, wherein the body is coupled to a substrate as part of a fixed abrasive, wherein the fixed abrasive article is selected from the group consisting of a bonded abrasive article, a coated abrasive article, and a combination thereof.

19. The shaped abrasive particle of claim 1, wherein the body is coupled to a backing as part of a coated abrasive article.

20. The shaped abrasive particle of claim 19, wherein the shaped abrasive particle is part of a plurality of shaped abrasive particles, and wherein each shaped abrasive particle of the plurality of shaped abrasive particles is arranged in a controlled orientation relative to a backing, the controlled orientation including at least one of a predetermined rotational orientation, a predetermined lateral orientation, and a predetermined longitudinal orientation.

* * * * *

UNITED STATES PATENT AND TRADEMARK OFFICE
CERTIFICATE OF CORRECTION

PATENT NO. : 10,563,106 B2  
APPLICATION NO. : 15/679427  
DATED : February 18, 2020  
INVENTOR(S) : Adam J. Stevenson et al.

It is certified that error appears in the above-identified patent and that said Letters Patent is hereby corrected as shown below:

In the Specification

Column 5, Line 22, please delete "$Al_2O_3.H_2O$", and insert --$Al_2O_3 \cdot H_2O$--

Column 18, Line 57, please delete "(ad/as)", and insert --($\sigma d/\sigma s$)--

Column 29, Line 21, please delete "(ad/as)", and insert --($\sigma d/\sigma s$)--

Column 29, Line 28, please delete "(ad/as)", and insert --($\sigma d/\sigma s$)--

Column 29, Line 44, please delete "(ad/as)", and insert --($\sigma d/\sigma s$)--

Column 29, Line 47, please delete "(ad/as)", and insert --($\sigma d/\sigma s$)--

Column 29, Line 48, please delete "(ad/as)", and insert --($\sigma d/\sigma s$)--

Column 30, Line 4, please delete "100 s to 2 s", and insert --100 $s^{-1}$ to 2 $s^{-1}$--

Column 51, Line 14, please delete "(ad/as)", and insert --($\sigma d/\sigma s$)--

Column 55, Line 9, please delete "(ad/as)", and insert --($\sigma d/\sigma s$)--

Column 56, Line 28, please delete "(ad/as)", and insert --($\sigma d/\sigma s$)--

Column 56, Line 43, please delete "(ad/as)", and insert --($\sigma d/\sigma s$)--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*